July 12, 1949.  C. E. MASON  2,476,104
METHOD AND APPARATUS FOR CONTROL
Filed March 27, 1941  16 Sheets-Sheet 1

INVENTOR
Clesson E. Mason
BY
Blair, Curtis & Hayward
ATTORNEYS

July 12, 1949.  C. E. MASON  2,476,104
METHOD AND APPARATUS FOR CONTROL
Filed March 27, 1941  16 Sheets-Sheet 2

INVENTOR
Clesson E. Mason
BY
Blair, Curtis + Hayward
ATTORNEYS

July 12, 1949.  C. E. MASON  2,476,104
METHOD AND APPARATUS FOR CONTROL
Filed March 27, 1941  16 Sheets-Sheet 3

INVENTOR
Clesson E. Mason
BY
Blair, Curtis + Hayward
ATTORNEYS

July 12, 1949.  C. E. MASON  2,476,104
METHOD AND APPARATUS FOR CONTROL
Filed March 27, 1941  16 Sheets-Sheet 4

INVENTOR
Clesson E. Mason
BY
Blair, Curtis + Hayward
ATTORNEYS

July 12, 1949.　　　　　C. E. MASON　　　　　2,476,104
METHOD AND APPARATUS FOR CONTROL
Filed March 27, 1941　　　　　　　　　　16 Sheets-Sheet 5
Fig. H.
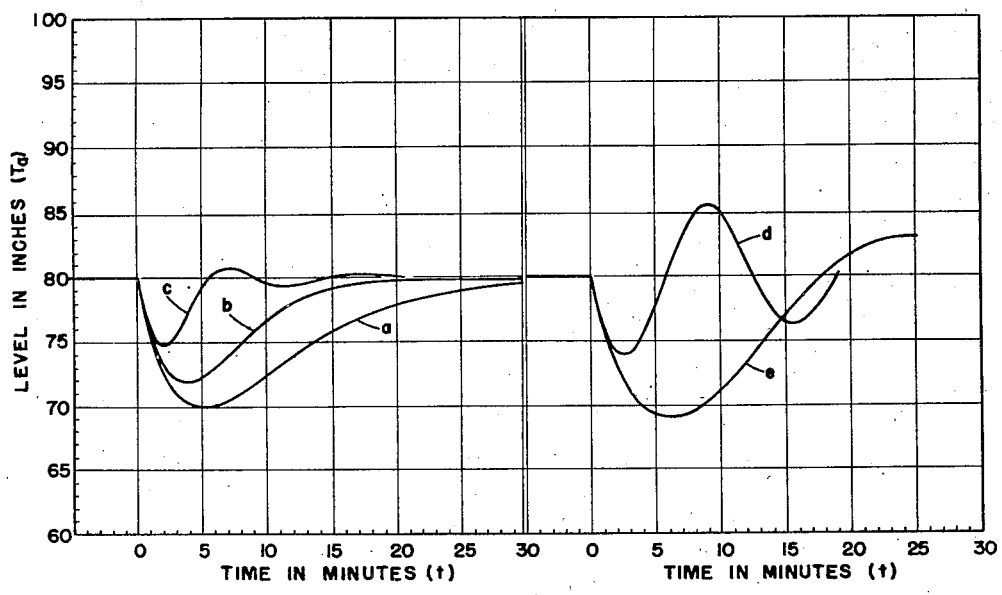
Fig. II.
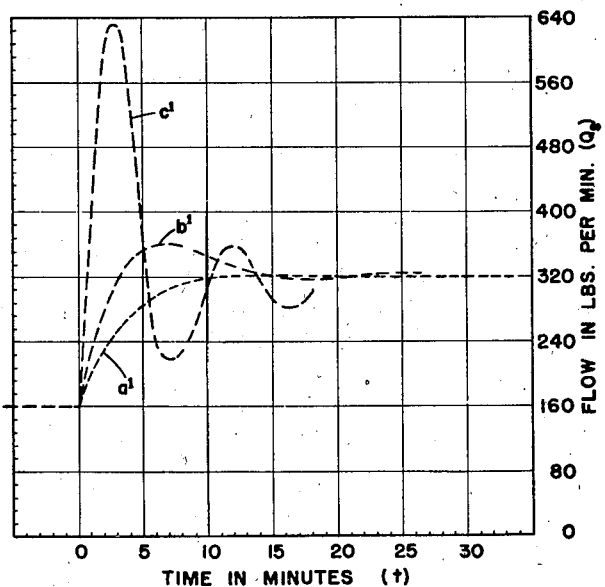
INVENTOR
Clesson E. Mason
BY
Blair, Curtis + Hayward
ATTORNEYS July 12, 1949. C. E. MASON 2,476,104
METHOD AND APPARATUS FOR CONTROL
Filed March 27, 1941 16 Sheets-Sheet 6
Fig. 1K.
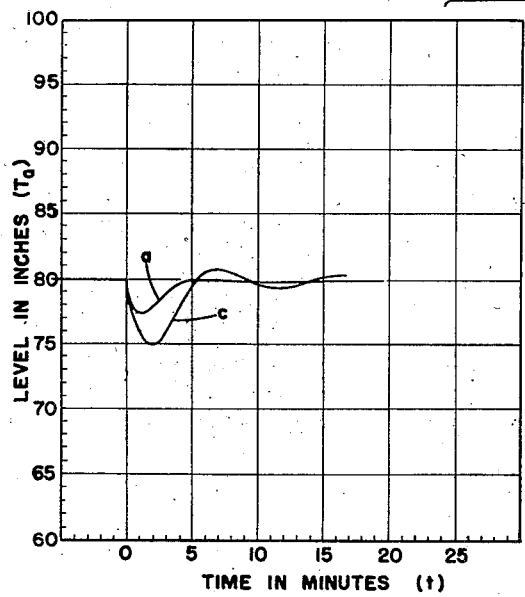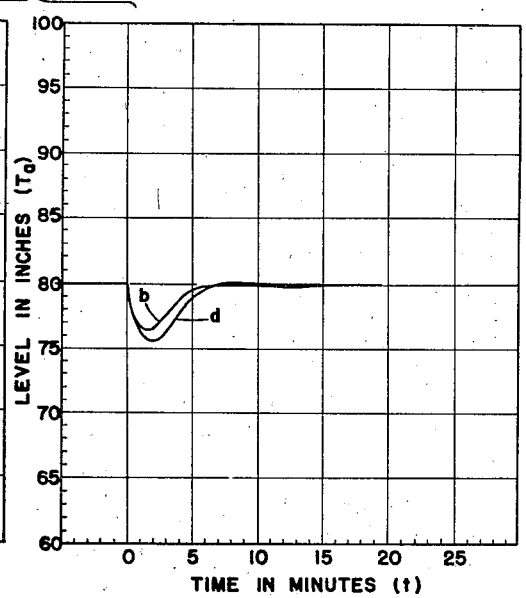
Fig. 1L
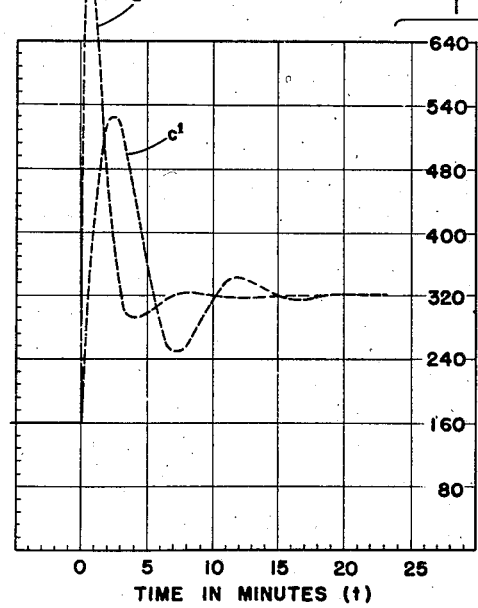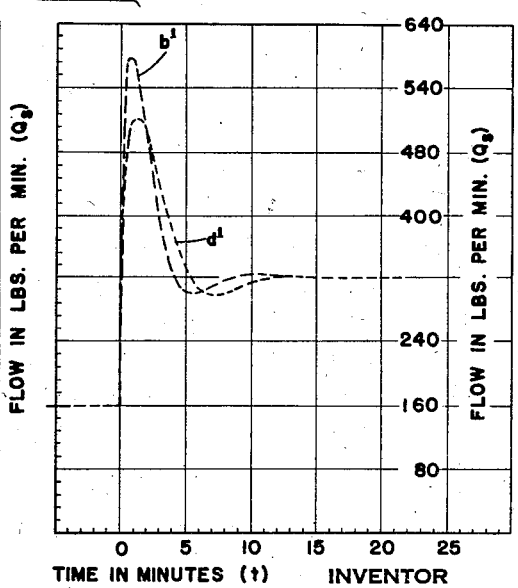
INVENTOR
Clesson E. Mason
BY
Blair, Curtis & Hayward
ATTORNEYS July 12, 1949.　　　　C. E. MASON　　　　2,476,104
METHOD AND APPARATUS FOR CONTROL
Filed March 27, 1941　　　　　　　　　　16 Sheets-Sheet 7

INVENTOR
Clesson E. Mason
BY
Blair, Curtis & Hayward
ATTORNEYS

July 12, 1949.　　　　　C. E. MASON　　　　　2,476,104
METHOD AND APPARATUS FOR CONTROL
Filed March 27, 1941　　　　　　　　　　　　　16 Sheets-Sheet 8

INVENTOR
Clesson E. Mason
BY
Blair, Curtis + Hayward
ATTORNEYS

July 12, 1949.  C. E. MASON  2,476,104
METHOD AND APPARATUS FOR CONTROL
Filed March 27, 1941  16 Sheets-Sheet 9

INVENTOR
Clesson E. Mason
BY
Blair, Curtis + Hayward
ATTORNEYS

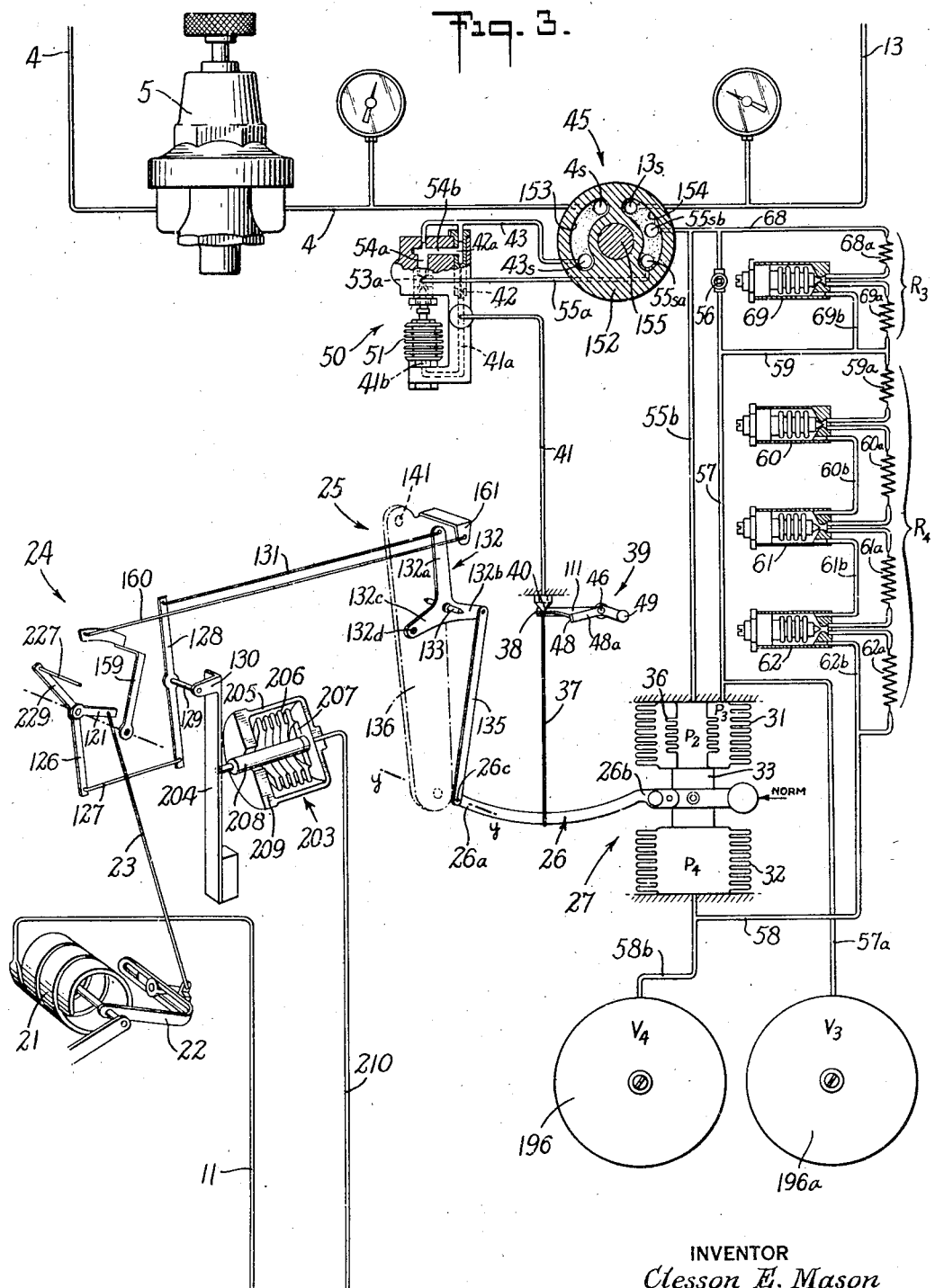

July 12, 1949.  C. E. MASON  2,476,104
METHOD AND APPARATUS FOR CONTROL
Filed March 27, 1941  16 Sheets-Sheet 11

INVENTOR
Clesson E. Mason
BY
Blair, Curtis & Hayward
ATTORNEYS

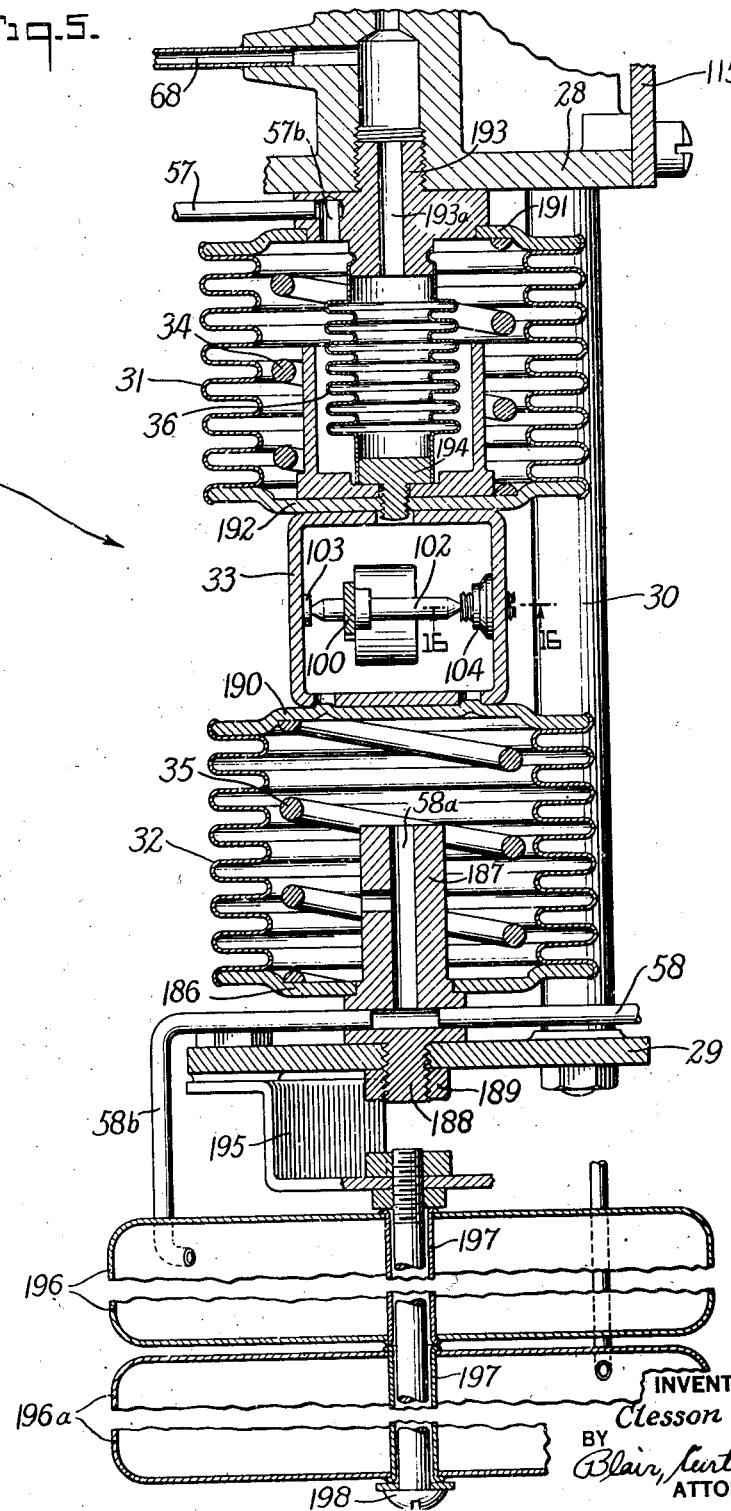

July 12, 1949.   C. E. MASON   2,476,104
METHOD AND APPARATUS FOR CONTROL
Filed March 27, 1941   16 Sheets-Sheet 13
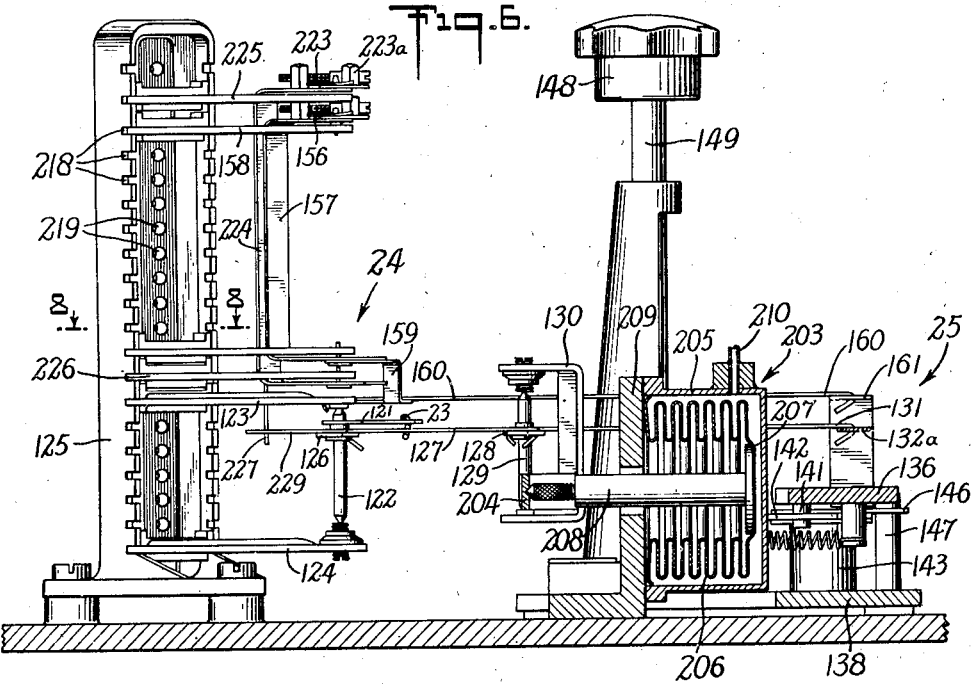

July 12, 1949. C. E. MASON 2,476,104
METHOD AND APPARATUS FOR CONTROL
Filed March 27, 1941 16 Sheets-Sheet 14
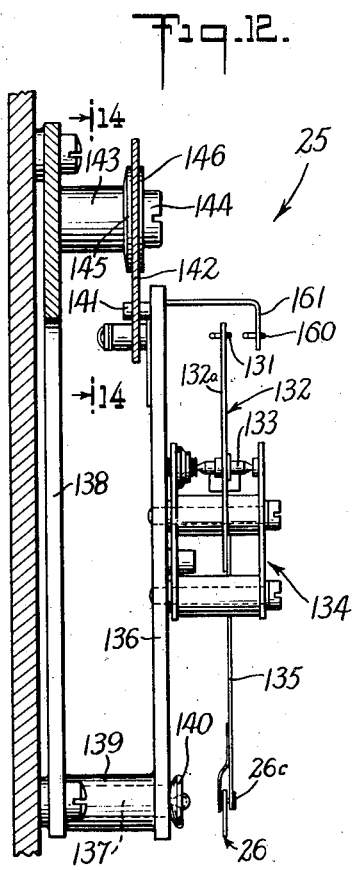
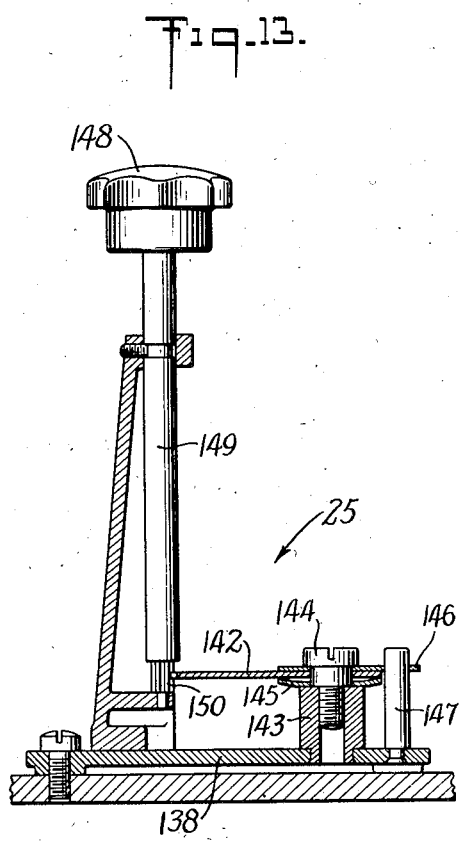
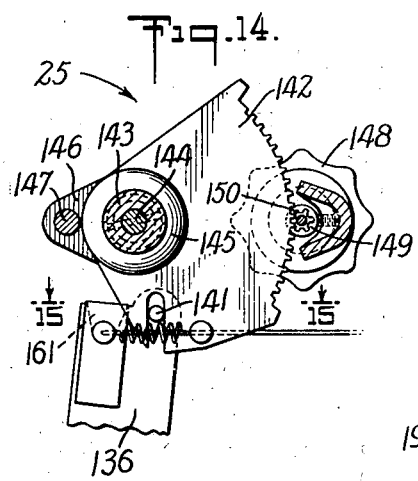
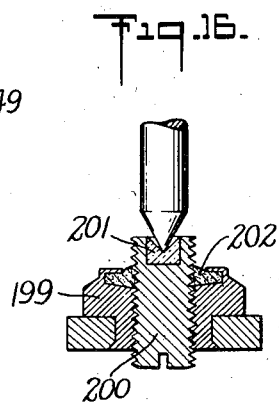
INVENTOR
Clesson E. Mason
BY
Blair, Curtis + Hayward
ATTORNEYS

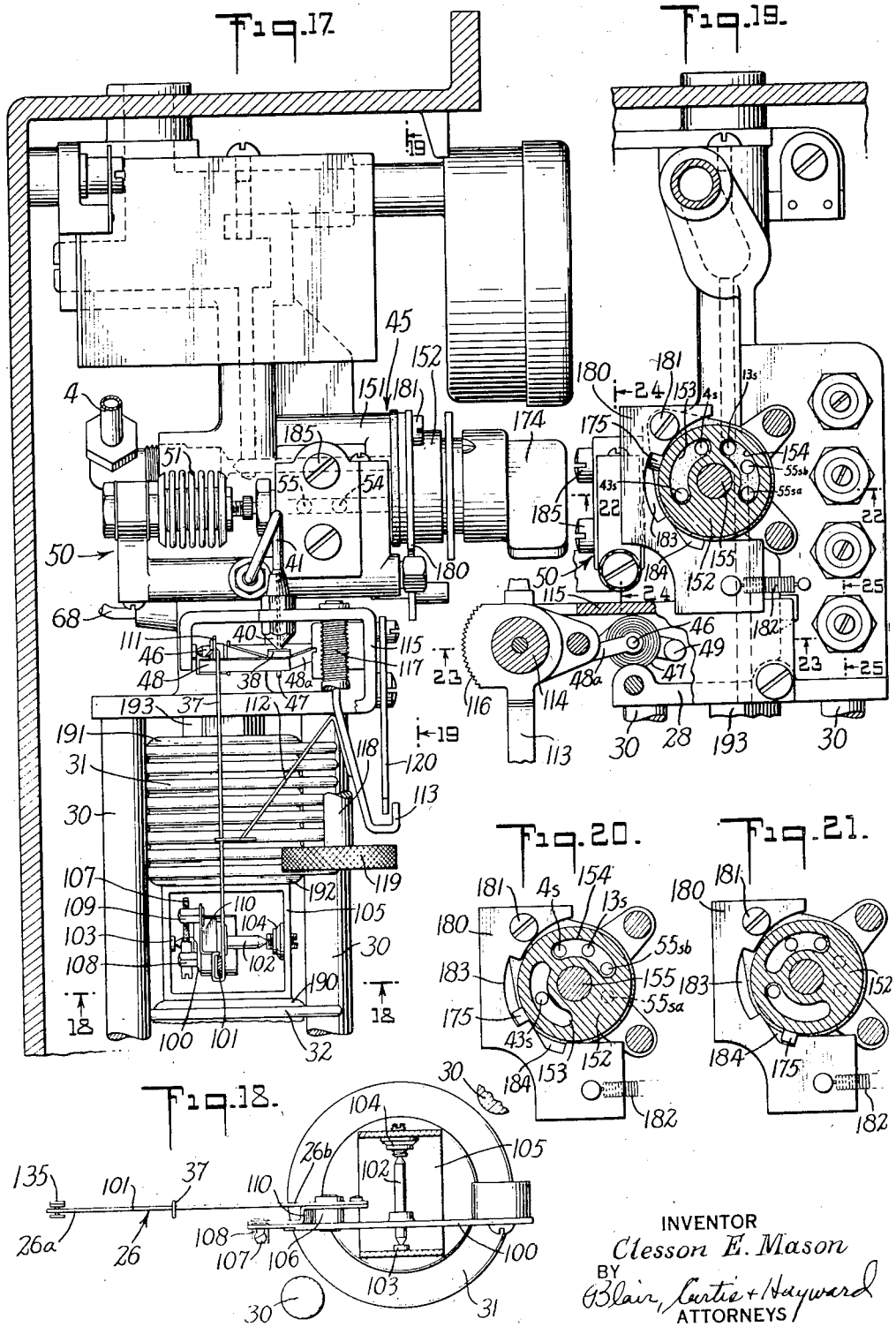

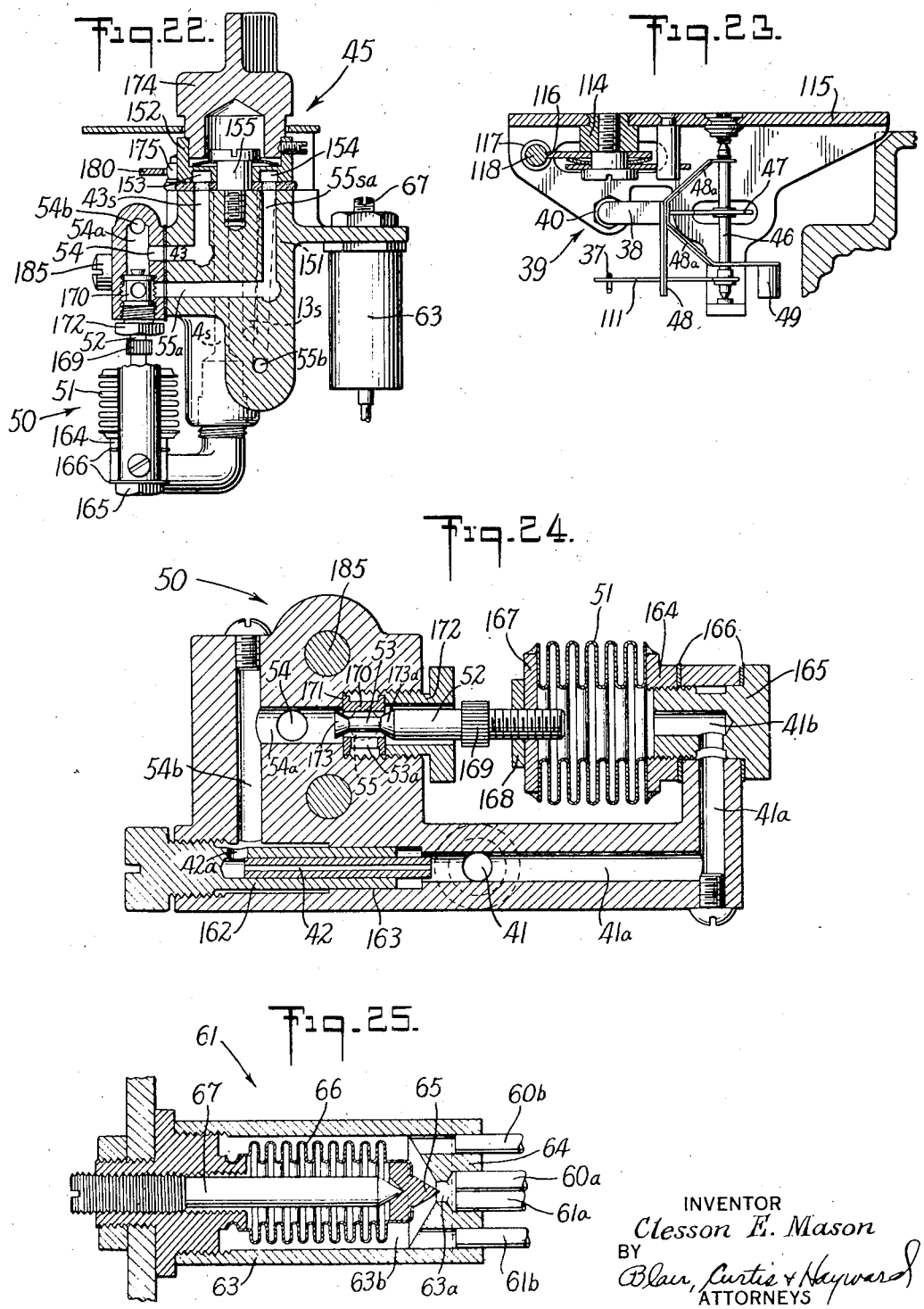

Patented July 12, 1949

2,476,104

UNITED STATES PATENT OFFICE 2,476,104

METHOD AND APPARATUS FOR CONTROL

Clesson E. Mason, Foxboro, Mass., assignor to The Foxboro Company, Foxboro, Mass., a corporation of Massachusetts Application March 27, 1941, Serial No. 385,493

37 Claims. (Cl. 137—68)

This invention pertains to the method of and apparatus for controlling a process variable, such as temperature, by regulating a variable affecting the process variable (for example fuel flow) preferably so as to tend to maintain the process variable at a desired value called the control point.

An object of the invention is to provide an improved method for controlling processes so that variable conditions upsetting the process equilibrium may be more readily and rapidly counteracted and the process carried out more nearly as desired.

Another object is to provide improved control apparatus for controlling processes and for carrying out the method of the invention.

In the drawings:

Figure 1A is a diagrammatic representation of a so-called two-capacity process wherein the process variable to be controlled is liquid level in a tank, or capacity $A_a$ and the variables affecting the liquid level are the auxiliary flow $Q_o$ flowing directly into capacity $A_a$ and the supply flow $Q_s$ flowing into capacity $A_b$. The term "flow" as used herein refers to quantity per unit of time.

Figure 1A:
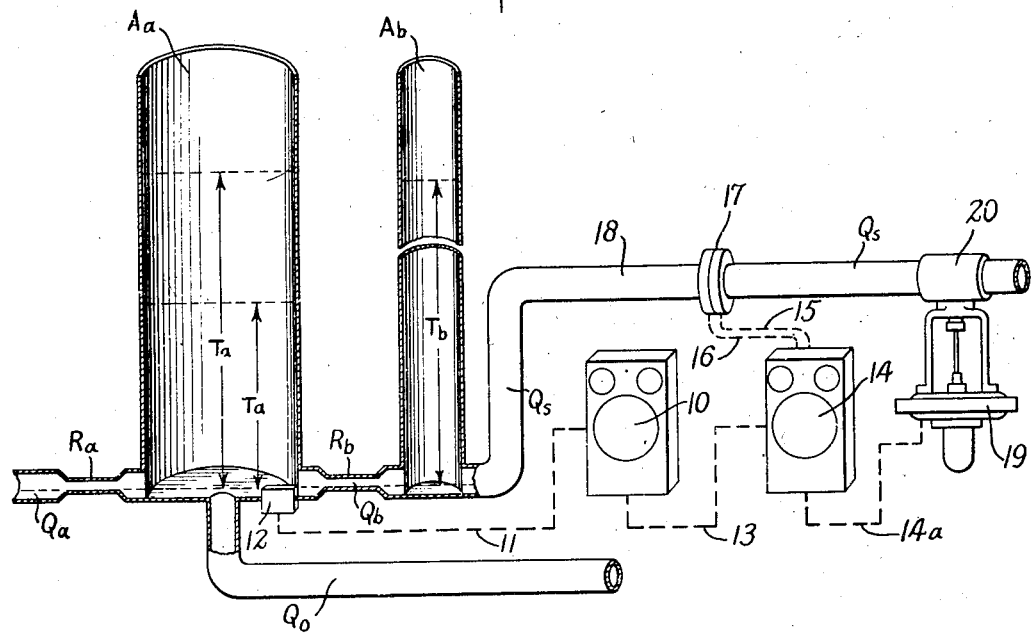
Figure 1B is a chart showing how the liquid level in capacity $A_a$ behaves after the process of Figure 1A has been upset by a change in either of the inlet flows, curve $a$ showing the result of a certain change in $Q_o$; curve $b$ the result of an equal but opposite change in $Q_s$; and curve $c$ the result of the equal and opposite changes in $Q_o$ and $Q_s$ being made simultaneously.
Figure 1C is a chart similar to the chart of Figure 1B but showing in the different curves how the level reacts when, following the same change in $Q_o$, different excess corrective effects are respectively imposed on the process by changing $Q_s$.
Figure 1B:
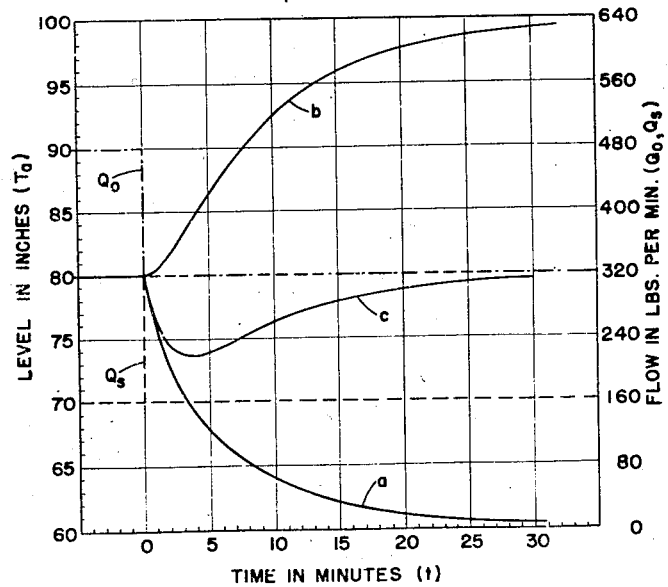
Figure 1C:
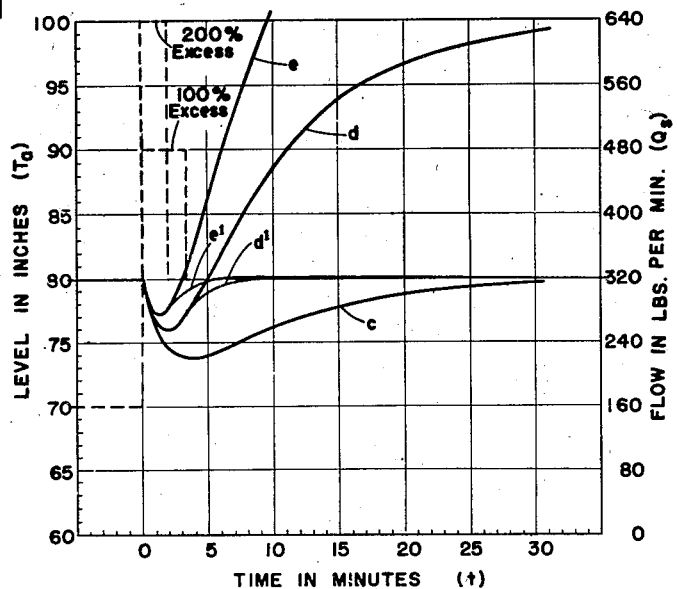
Figure 1D:
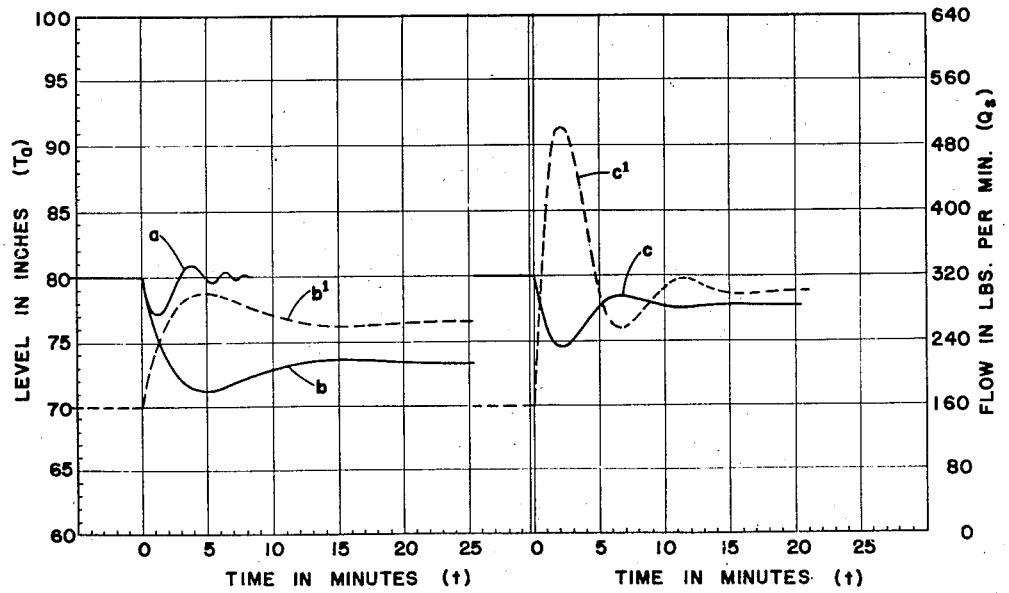

Figure 1D is a graph showing the behaviors of the liquid level following a change imposed on $Q_o$ when the inlet flow $Q_s$ to the process is made variable and is controlled in response to the behavior of the level $T_a$: Curve $a$ by a two-position controller, and curves $b$ and $c$ by a proportional controller having respectively different magnitudes of proportionality. Curves $b^1$ and $c^1$ correspond to curves $b$ and $c$ and show the behavior of the controlled flow $Q_s$ in the two instances.

Figure 1E:
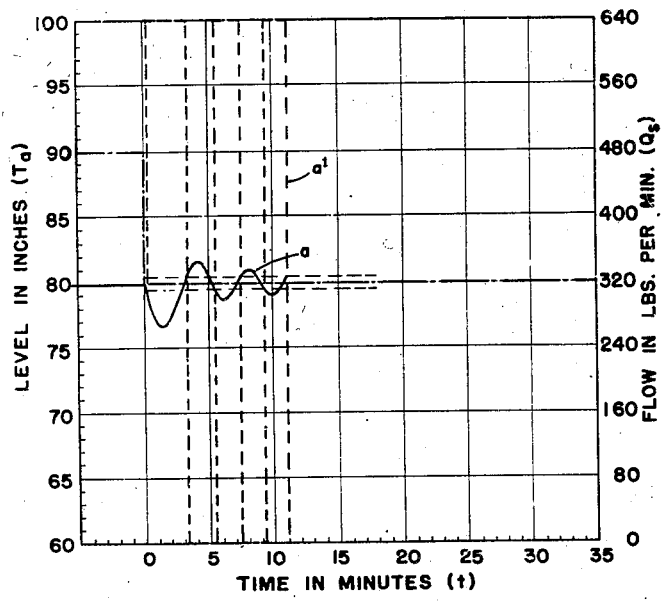

Figure 1E is a graph showing the behavior of the liquid level and the controlled flow $Q_s$ following a change imposed on $Q_o$ when the variable inlet flow $Q_s$ to the process is controlled by a two-position controller having discontinuity.

Figure 1F:
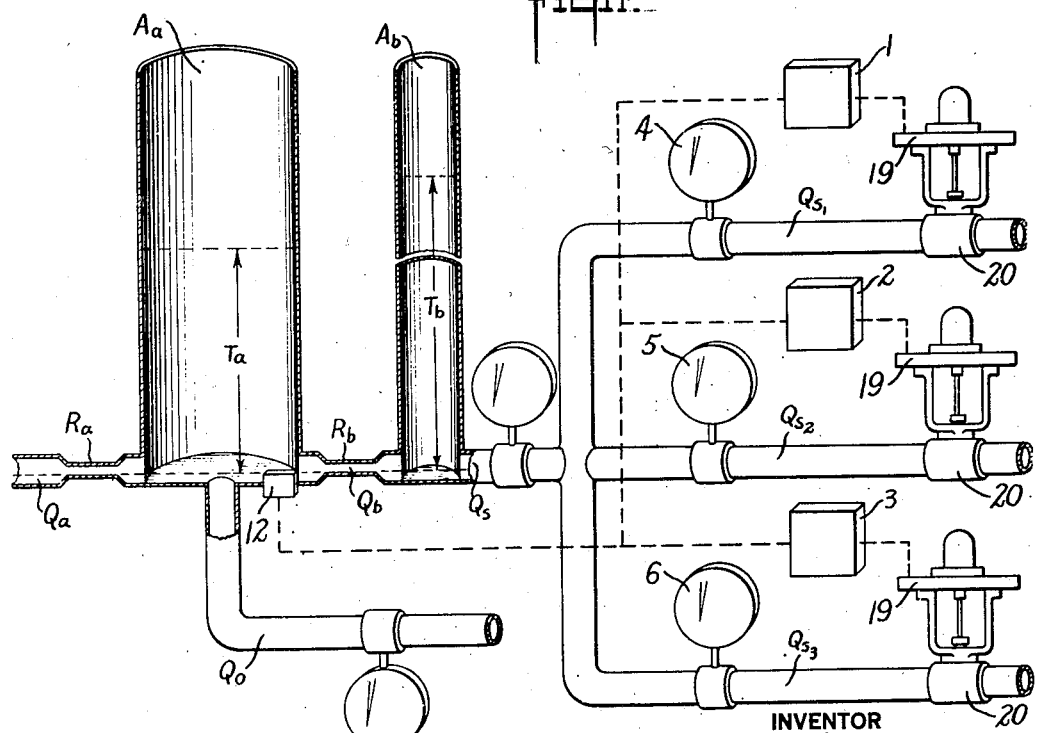

Figure 1F is a diagrammatic illustration of the two-capacity process of Figure 1A with several kinds of control instruments connected in parallel and intended to vary the inlet flow $Q_s$ to the process in response to reactions of the level resulting from changes imposed on flow $Q_o$.

Figure 1G:
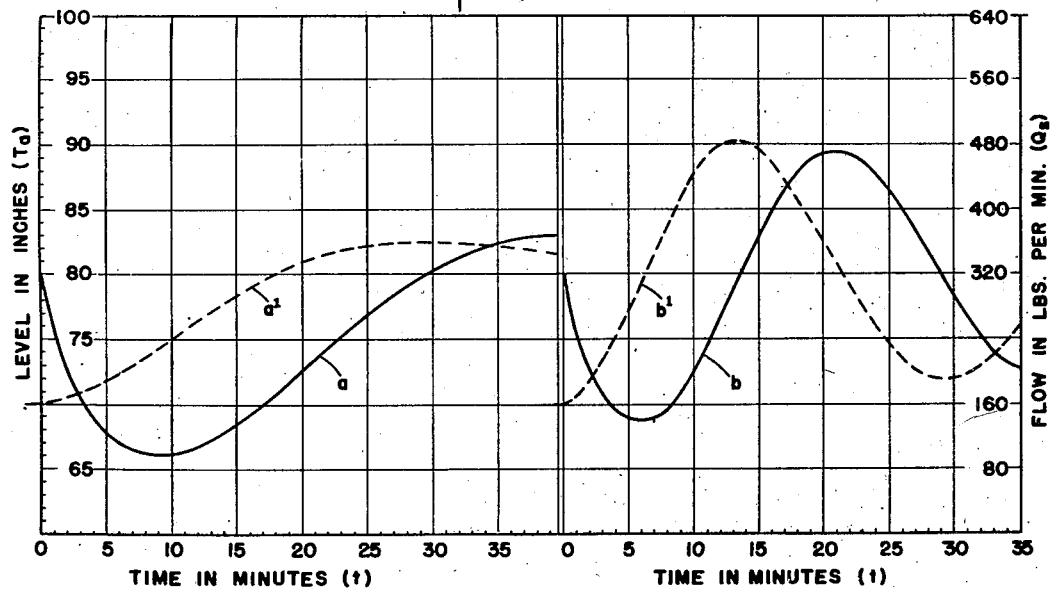

Figure 1G is a graph in curves $a$ and $b$ the behavior of the liquid level and controlled flow $Q_s$ following a change imposed on $Q_o$ when the variable inlet flow $Q_s$ to the process is varied by a so-called floating controller having different proportions of control effect.

Figure 1H is a graph showing in several curves the behavior of the liquid level following a change imposed on $Q_o$ when the variable inlet flow $Q_s$ to the process is controlled by a combination of the proportional and floating controllers.

Figure 1I is a graph showing in curves $a^1$, $b^1$ and $c^1$ the behavior of the controlled flow $Q_s$ corresponding to the curves of Figure 1H showing the liquid level behavior.

Figure 1J:
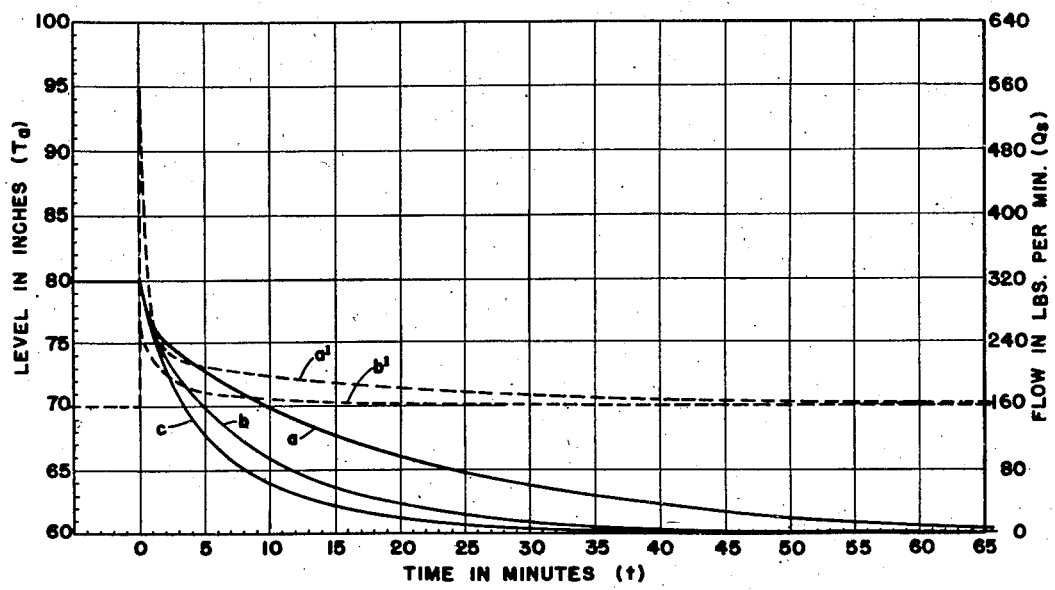

Figure 1J is a graph showing in curves $a$, $a^1$, $b$ and $b^1$ the behavior of the liquid level and controlled flow $Q_s$ following a change imposed on $Q_o$ when the variable inlet flow $Q_s$ is controlled by a mechanism which produces a quantity change in flow proportional to the rate of change in level. Curve $c$ of Figure 1J is the same as curve $a$ of Figure 1B showing the behavior of the level $T_a$ following a change imposed on flow $Q_o$ and when no control effect is imposed on the process.

Figure 1K is a graph showing in curves $a$, $b$ and $d$ the behavior of the liquid level (for different instrument adjustments) following a change imposed on $Q_o$ when the variable inlet flow $Q_s$ is controlled by the combination of the proportional and floating controllers together with the mechanism referred to in connection with Figure 1J. Curve $c$ is the same curve as curve $c$ of Figure 1H.

Figure 1L is a graph showing the behavior of the flow $Q_s$ corresponding to the conditions plotted in Figure 1K.

Figure 1M:
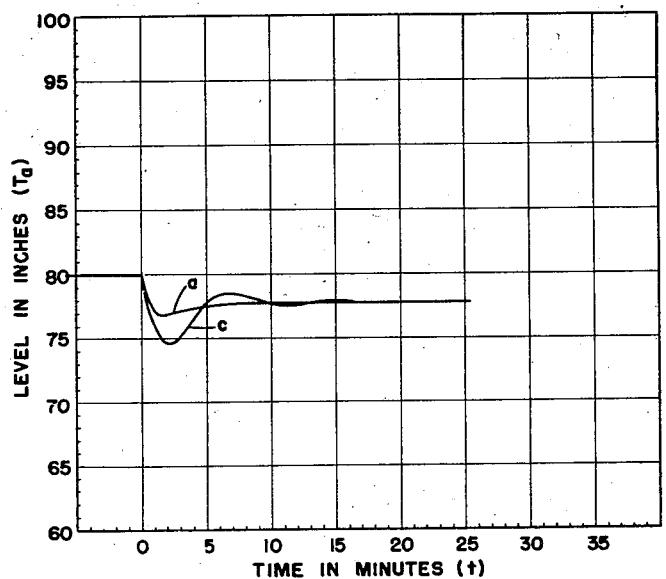
Figure 1N:
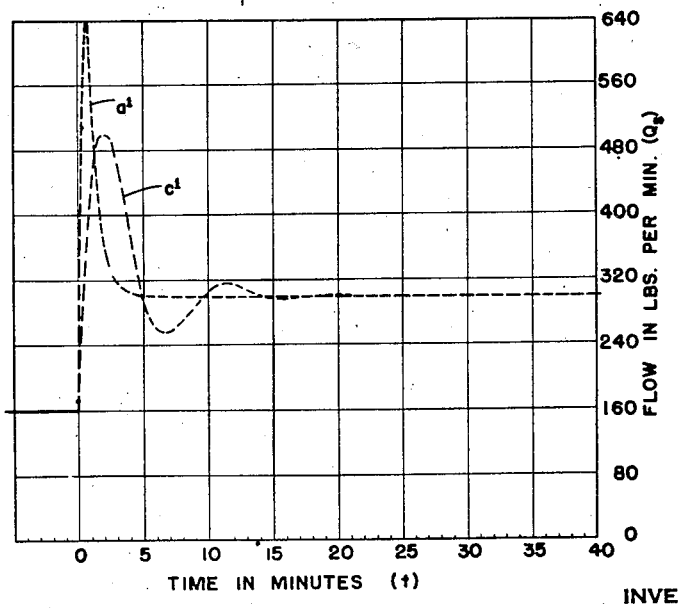

Figures 1M and 1N are graphs showing, in curves $a$ and $a^1$ respectively, the behavior of the level $T_a$ and the flow $Q_s$ (for a certain instrument adjustment) when the flow $Q_s$ is controlled by a proportioning controller together with the mechanism referred to in connection with Figure 1J. Curve $c$ is the same as curve $c$ of Figure 1D.

Figure 2:
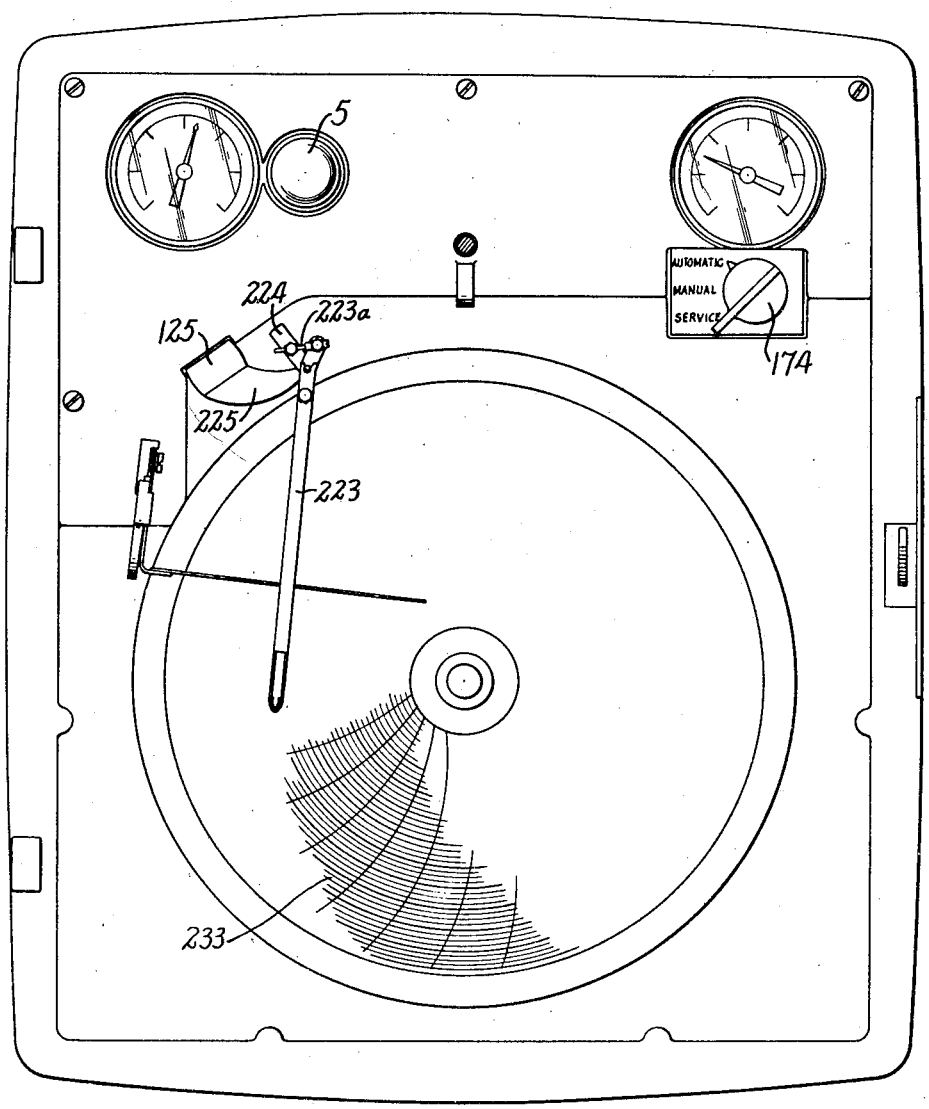

Figure 2 is a front elevation of an instrument casing for mechanism embodying the invention and showing an outer hinged cover removed.

Figure 2A:
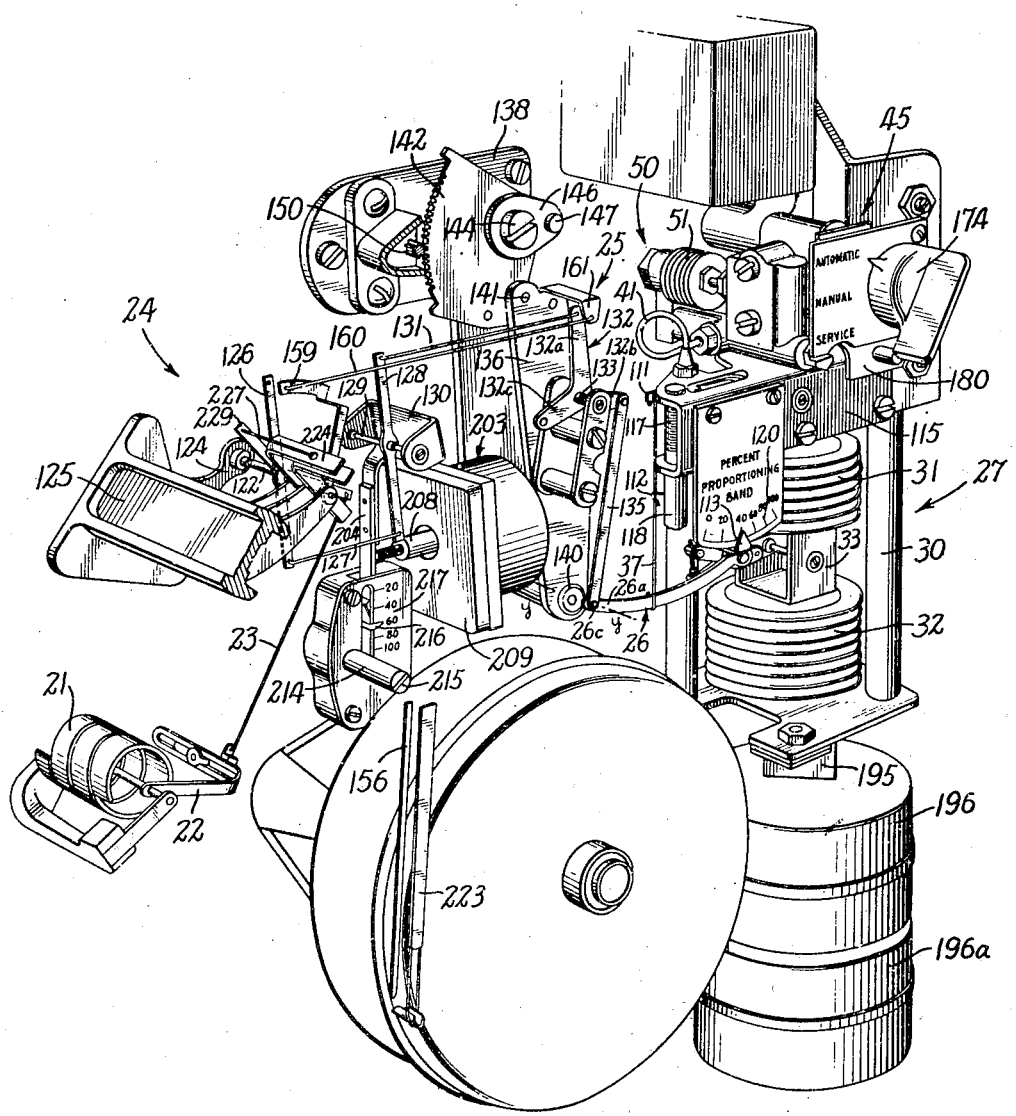

Figure 2A is a front perspective view of the instrument of Figure 2.

Figure 3 is a diagrammatic expanded view of various related parts of the instrument of Figure 2A.

Figure 4:
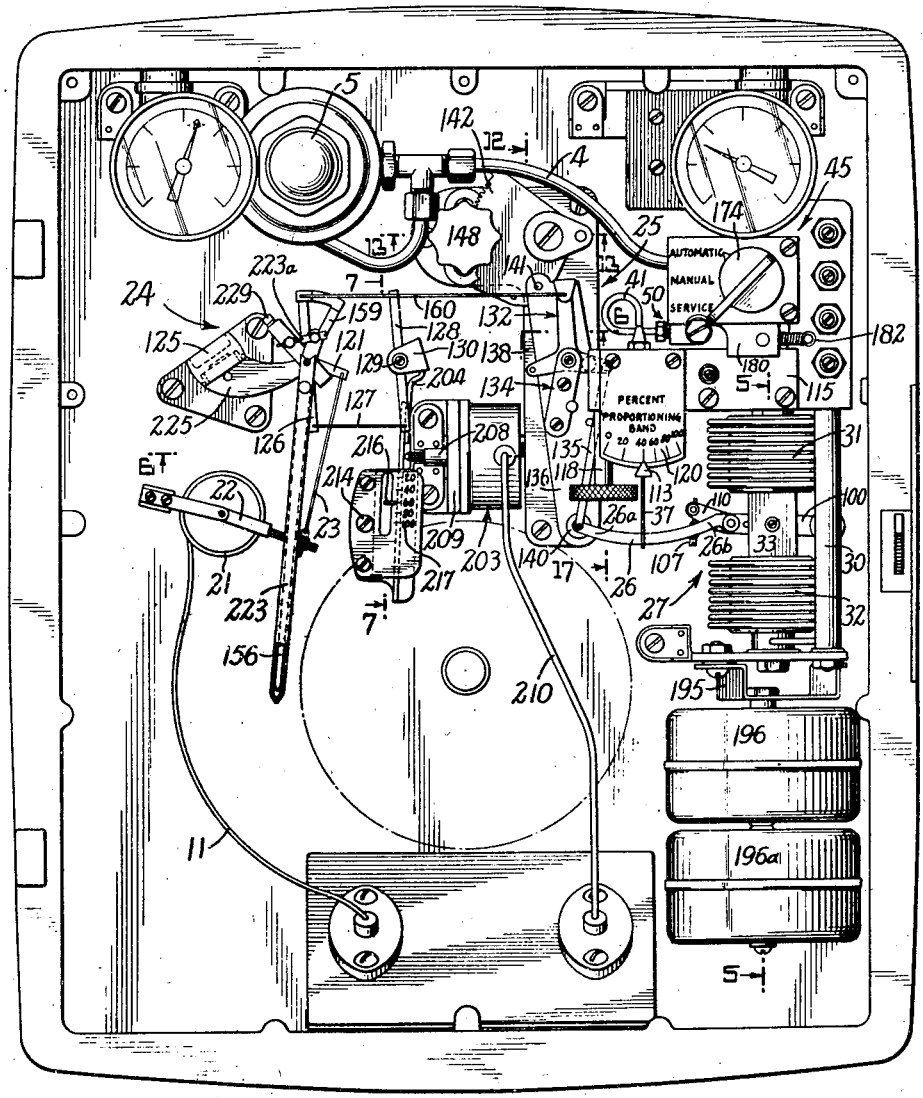

Figure 4 is a front elevation of the instrument of Figure 2 with the inner cover or chart-backing plate removed.

Figure 5 is an enlarged vertical axial section through a bellows motor assembly.

Figure 6 is a detail taken on line 6—6 of Figure 4 and showing mechanism for supporting index arms and showing also remote-control-point-setting mechanism.

Figure 7 is an enlarged view taken on line 7—7 of Figure 4 and showing details of the remote-control-point-setting mechanism.

Figure 8 is a sectional view of the bracket supporting the index arms and taken on line 8—8 of Figure 6.

Figure 9 is a detailed section taken on line 9—9 of Figure 8.

Figure 10 is another detail of the remote-control-point-setting mechanism taken on line 10—10 of Figure 7.

Figure 11 is a detail taken on line 11—11 of Figure 10.

Figure 12 is a detail of manual-control-point-setting mechanism taken on line 12—12 at the central part of Figure 4.

Figure 13 is another detail of the manual-control-point-setting mechanism taken on line 13—13 of Figure 4.

Figure 14 is a sectional view taken on line 14—14 of Figure 12.

Figure 15 is a sectional view taken on line 15—15 of Figure 14.

Figure 16 is a detail axial section of an adjustable jewel bearing support taken on line 16—16 of Figure 5.

Figure 17 is an enlarged detail of a nozzle-baffle arrangement and of a supply and waste type of valve showing also in side elevation a manually operable transfer switch. This figure is taken on line 17—17 of Figure 4.

Figure 18 is a detail of a floating arc lever taken on line 18—18 of Figure 17.

Figure 19 is a section taken on line 19—19 of Figure 17, and showing details of the transfer switch.

Figures 20 and 21 are details of the transfer switch showing it in different positions.

Figure 22 is a further detail of the switch taken on line 22—22 of Figure 19.

Figure 23 is a detail of mechanism for moving the baffle, taken on line 23—23 of Figure 19.

Figure 24 is an enlarged detail section of the supply and waste valve taken on line 24—24 of Figure 19.

Figure 25 is a detail of a sealed by-pass valve taken on line 25—25 of Figure 19.

I believe that it will be helpful in understanding the method and apparatus of the present invention to review first some of the problems confronted in controlling a process to maintain a relationship between the uncontrolled variables which create a variable demand and the manipulated energy input (the supply), said relationship being such that the controlled variable of the process tends to remain steady.

In any industrial process, whether it be a heating process, a liquid flow process, or others, parts of the process apparatus and the material being treated have the ability to absorb or store up energy. This characteristic will be referred to as "capacity." It is evident that since the parts can store up energy there must be some resistance to energy flow out of them, and thus with each capacity there must be associated a characteristic which we will call "resistance." The nature of these characteristics (capacity and resistance) can be illustrated by a process involving liquid flow and liquid level.

In the process of Figure 1A liquid flows into the system in two streams, a basic supply flow $Q_o$ into tank $A_a$ and an auxiliary supply flow $Q_s$ into tank $A_b$. Liquid flows from tank $A_b$ to tank $A_a$ through a resistance $R_b$ as flow $Q_b$ and from tank $A_a$ through outlet resistance $R_a$ as flow $Q_a$. The liquid level $T_a$ of the liquid in tank $A_a$ is the level to which the control problem is directed. It is easily seen that the cross-sectional area of the tanks $A_a$ and $A_b$ are proportional to the values of the characteristics just referred to as "capacities," i. e. the quantity of water contained in an inch of depth in the tanks is determined by the cross-sectional areas of the respective tanks. For convenience, in the following discussion, the terms "$A_a$" and "$A_b$" will be given proper units of measure and used to designate the values of the capacities of the respective tanks. The restrictions to flow $R_a$ and $R_b$ cause and so are necessarily proportional to the values of the characteristics just referred to as "resistances," and for convenience, in the following discussion the terms "$R_a$" and "$R_b$" will be given proper units of measure and used to designate the values of the resistances of the respective restrictions.

It may be observed that the presence of the capacity $A_a$ and the resistance $R_a$, for example, retards the consummation of the eventual effect that a change in flow into $A_a$ has on flow $Q_a$ and on the level $T_a$. This retardation, which results from a combination of a single capacity and resistance, is called herein a "capacity lag."

It may also be observed that the eventual effect of a change in the flow $Q_s$ into $A_b$ will be retarded in a different manner in affecting the level $T_a$ and the flow $Q_a$ because of the additional capacity $A_b$ and the resistance $R_b$ separating the two capacities. This retardation, which results from the combination of two or more capacities separated by resistance, is called herein "transfer lag." Such retardations are generally referred to in control literature as process lags and there is still a third type of process lag—not illustrated by Figure 1A—which we shall call "distance lag." This type of lag is characterized by a distinct delay or postponement of the beginning of a change in the process variable (such as level $T_a$) following a change in the supply. Thus this lag is not a retardation and it must result from some physical embodiment of the mechanics of the process which requires time to conduct the effect of the change to a part of the process whence it may affect the process variable. It might have been illustrated in Figure 1A by requiring that the flow $Q_s$ be conducted to $A_b$ by means of a long sloping open trough. Thus any change in $Q_s$ would produce a wave front which requires a lapse of time to pass along the trough before entering the tank $A_b$.

Now considering for the moment the behavior of the process illustrated in Figure 1A without automatic control: Let us first assume that a balanced condition exists, i. e. one in which the flows and levels above mentioned are constant or steady. It is obvious from Figure 1A that under such a balanced condition $Q_b$ must equal $Q_s$ and $Q_a$ must equal the sum of flows $Q_o$ and $Q_b$ or $Q_s$. Actual values of flow for a balanced condition may be as follows:

$$Q_o = 480 \#/min., \quad Q_s = 160 \#/min.$$

Under these assumptions, the flow $Q_b$ from $A_b$ to $A_a$ is equal to the flow $Q_s$ into $A_b$ and is equal to 160 lbs./min., and the total flow into $A_a$ is 640 #/min. and so the flow $Q_a$ out of $A_a$ must be 640 #/min. We may also assume that the resistances $R_a$ and $R_b$ are such that the level $T_a$ in capacity $A_a$ is 80 inches above the level which would eventually be established if the flow $Q_o + Q_s$ were made zero, and that the level $T_b$ in capacity $A_b$ is 40 inches above the level $T_a$.

Starting with the above steady state—if the flow $Q_o$ is suddenly decreased from 480 #/min. to 320 #/min., the level $T_a$ instantly starts decreasing at a maximum rate which becomes slower as time elapses and becomes zero rate of change when the level reaches 60 inches. This behavior of the level $T_a$ is plotted against time in curve $a$ of Figure 1B.

If, instead of decreasing $Q_o$ by an amount equal to 160 #/min., we increase $Q_s$ by an equal amount, or from 160 #/min. to 320 #/min., the level in $A_b$ instantly starts to rise at a maximum rate, but the level $T_a$ does not start to change until a quantity change is effected in the intermediate flow $Q_b$ by virtue of a quantity level change being effected in level $T_b$. Thus the level $T_a$ starts to change at a rate which is zero in the beginning, which increases to a maximum value and which then becomes slower as time elapses and becomes zero when the level reaches 100 inches. This behavior of the level $T_a$ is plotted against time in curve $b$ of Figure 1B.

A comparison of the two curves shows that, aside from the fact that equal changes in the flows $Q_o$ and $Q_s$ were made in opposite directions, the behavior of the level $T_a$ is quite different in the two cases. A change in the flow $Q_o$ (which flows directly into tank $A_a$) starts immediately to affect the level in $A_a$ at a certain maximum rate. However, a sudden change in the flow $Q_s$ (which flows directly into tank $A_b$ and only indirectly into tank $A_a$ through the capacity $A_b$ and resistance $R_b$) starts immediately to begin to affect the level $T_a$, but at a zero rate of change, which rate immediately begins to increase to some maximum. The existence of the intervening capacity $A_b$ and resistance $R_b$ between the source of the flow change $Q_s$ and the place of level measurement causes the behavior of the level change to have the indicated "S" characteristic. This reversal of the rate of change of level occurs, under these reactions of transfer lag, regardless of the magnitude of such change in $Q_s$.

Let us consider that a change in $Q_o$ constitutes a change in the demand and that a change in $Q_s$ constitutes a change in the supply to counteract the effects of changes in demand. For the moment we can consider that the supply $Q_s$ is under manual control so that when $Q_o$ is instantly changed from 480 lbs./min. to 320 lbs./min. $Q_s$ likewise may be instantly increased from 160 lbs./min. to 320 lbs./min. so as to offset and correct exactly for the change in demand. The behavior of the level $T_a$ following this change is shown in curve $c$ of Figure 1B, and we see that the level $T_a$ starts dropping immediately at a maximum rate of change which rate gradually approaches zero and thereafter the level starts rising and approaches a maximum rate of rise. Thereafter the rate of rise slowly becomes slower and slower until it reaches zero rate of rise simultaneously with the level $T_a$ returning to its original level. So, because of the presence of the transfer lag, i. e. the capacity $A_b$ and the resistance $R_b$ between the flow $Q_s$ and the point of level measurement, the controlled variable $T_a$ deviates from the control point even when the exact correction is made in the supply following a change in the demand.

If, however, the flow $Q_s$ were made to flow directly into $A_a$ so that $Q_s$ and $Q_o$ both flow into the same capacity, then, if $Q_o$ is instantly changed and $Q_s$ is instantly changed in opposite direction a corresponding amount, the level $T_a$ would not depart from the original level of 80 inches.

The above discussion of the behavior of the level $T_a$ between its initial and final conditions has been qualitative. The exact quantitative behavior will now be demonstrated by mathematical solution of differential equations which embody the lag characteristics of the process and which are constructed in terms of the actual values of the resistances, capacities, flows and levels of the process. The units used in these equations will be, for convenience:

Level = inches.
Quantity = pounds of water.
Time = minutes.

Therefore the capacities will be expressed as pounds of water per inch of depth, and the resistances will be assumed to be mathematically linear and will be expressed as inches of waterhead per pound per minute of water flow. In other words, the capacity is numerically equal to the number of pounds of water contained in one inch of depth. The resistance is numerically equal to the number of inches of waterhead which would produce a flow of one pound per minute through the restriction. Since the flow through the restriction is assumed to be linear this value might also be expressed by the ratio of any value of waterhead to the coincident value of water flow in pounds per minute. Assuming now the following nomenclature and values:

$T_a$ = level in inches in tank $A_a$ above zero level.
$T_b$ = level in inches in tank $A_b$ above the said zero level.
$T_p$ = a constant and is the potential level in tank $A_a$ in inches defined as the eventual value of the level $T_a$ for the instant values of flows $Q_o$ and $Q_s$.
$Q_a$ = flow of water in lbs./min. through restriction $R_a$ (Figure 1A).
$Q_b$ = flow of water in lbs./min. through restriction $R_b$ (Figure 1A).
$Q_o$ = basic flow in lbs./min. entering tank $A_a$ (Figure 1A).
$Q_s$ = auxiliary (supply) flow in lbs./min. entering tank $A_b$ (Figure 1A).
$A_a$ = capacity constant of tank $A_a$ and equals 32 lbs. of water/inch of level.
$A_b$ = capacity constant of tank $A_b$ and equals 16 lbs. of water/inch of level.
$R_a$ = resistance constant of restriction $R_a$ and equals .125 inch head per unit flow obtained by the known condition that 80 inches of head produces a flow $Q_a$ of 640 lbs./min., i. e.

$$\frac{T_a}{Q_a} = \frac{80}{640} = .125$$

$R_b$ = resistance constant of restriction $R_b$ and equals .25 inch head per unit flow obtained by the known condition that 40 inches of head between levels $T_a$ and $T_b$ produces a flow $Q_b$ of 160 lbs./min., i. e.

$$\frac{T_b - T_a}{Q_b} = \frac{40}{160} = .25$$

$t$ = time in minutes that has elapsed since a change was imposed on the process.

$(T_a - T_p)_0$ = the difference between the initial value of the level $T_a$ and its potential value level $T_p$ measured at the instant the change of flow is imposed on the process; i. e. the value of $(T_a - T_p)$ when time equals zero.

$T_a'$, $T_a''$, etc. = the first time derivative, second time derivative, etc. of $T_a$.

$Q_a'$, $Q_a''$, etc. = the first time derivative, second time derivative, etc. of $Q_a$.

$(T_a')_0$ = the initial value of the rate of change of level $T_a$ at time equals zero.

$e$ = base of natural logarithms.

Without here stopping to show its development the following equation may be written in terms of the above nomenclature, which equation embodies the lag characteristics of the system when the flows $Q_o$ and $Q_s$ are steady and have any assigned value:

(1) $A_a R_a A_b R_b Q_a'' + (A_a R_a + A_b R_a + A_b R_b) Q_a' + (Q_a - Q_o - Q_s) = 0$

Inasmuch as we are for the present primarily interested in observing the behavior of the level $T_a$ following a change in flows $Q_o$ or $Q_s$, we may convert this Equation 1 into an equation written in terms of $T_a$ instead of $Q_a$ by multiplying Equation 1 by $R_a$, and substituting (2) $\qquad T_a = R_a Q_a$ and (3) $\qquad T_p = R_a (Q_o + Q_s)$ Because $T_p$ is a constant when $Q_o$ and $Q_s$ are constant we may obtain (4) $A_a R_a A_b R_b (T_a - T_p)'' + (A_a R_a + A_b R_a + A_b R_b)(T_a - T_p)' + (T_a - T_p) = 0$ The integration of Equation 4 gives us (5) $\qquad T_a - T_p = C_b e^{k_b t} + C_a e^{k_a t}$ where $k_a$ and $k_b$ are the roots of Equation 4, and $C_b$ and $C_a$ are the constants of integration.

Representing the coefficients of Equation 4 as follows:

(6) $\qquad A_2 = (A_a R_a A_b R_b)$ (7) $\qquad A_1 = (A_a R_a + A_b R_a + A_b R_b)$ we may write equations of the roots $k_b$ and $k_a$ of the auxiliary algebraic equation corresponding to Equation 4 as:

(8) $\qquad k_b = -\frac{A_1}{2A_2} - \sqrt{\left(\frac{A_1}{2A_2}\right)^2 - \frac{1}{A_2}}$ (9) $\qquad k_a = -\frac{A_1}{2A_2} + \sqrt{\left(\frac{A_1}{2A_2}\right)^2 - \frac{1}{A_2}}$ The constants of integration $C_b$ and $C_a$ in Equation 5 are obtained by substituting $t=0$ in Equation 5 and in the first derivative of Equation 5. The resulting equations may be solved to give:

(10) $\qquad C_b = \frac{(T_a')_0 - k_a (T_a - T_p)_0}{k_b - k_a}$

(11) $\qquad C_a = \frac{(T_a')_0 - k_b (T_a - T_p)_0}{k_a - k_b} = (T_a - T_p)_0 - C_b$ If we now substitute in Equation 4 the value of the capacities and resistances above assigned, we may solve Equations 8 and 9 for the roots of Equation 4. By substituting these roots in Equations 10 and 11 and in turn substituting the results in Equation 5 this equation becomes

(12) $T_a - T_p = \left[\frac{(T_a')_0 + .125(T_a - T_p)_0}{-.375}\right] e^{-.5t} + \left[\frac{(T_a')_0 + .5(T_a - T_p)_0}{.375}\right] e^{-.125t}$ If we take the first condition of Figure 1B in which, before the assumed disturbance, $Q_o$ had a value of 480 lbs./min. and $Q_s$ had a value of 160 lbs./min., we obtain from Equation 3 $T_p = .125 \times (480 + 160) = 80$ inches. Also since a steady state is assumed for the condition, the value of time $t$ must be infinity. Therefore, substituting $t$ equals infinity in Equation 12 the exponents become zero and the equation becomes $T_a = T_p$, or $T_a = 80$ inches.

By instantly reducing the flow $Q_o$ to 320 lbs./min. without changing the flow $Q_s$ we obtain a new value for $T_p$ by substituting in Equation 3

$$T_p = .125(320 + 160) = 60 \text{ inches}$$

Therefore, $(T_a - T_p)_0 = 20$ inches.

The value $(T_a')_0$ of the rate of change of level in tank $A_a$ at time equals zero for substitution in Equation 12 is obtained from the following basic equation:

(13) $\qquad T_a' = (Q_b + Q_o - Q_a)/A_a$

For the above condition, immediately after time equals zero $Q_b = 160$ lbs./min.
$Q_o = 320$ lbs./min.
$Q_a = 640$ lbs./min.

Therefore $$(T_a')_0 = \frac{160 + 320 - 640}{32} = -5 \text{ in./min.}$$

Substituting the above values of $(T_a - T_p)_0$ and $(T_a')_0$ in Equation 12 we obtain for the condition of having changed $Q_o$ from 480 to 320 lbs./min. the following equation which is plotted as curve $a$, Figure 1B:

(14) $\qquad T_a = 60 + 6.6667 e^{-.5t} + 13.333 e^{-.125t}$

Curve $b$, Figure 1B, was obtained from similar substitution in Equation 12 of the values of $(T_a')_0$ and $(T_a - T_p)_0$ resulting from changing $Q_s$ from 160#/min. to 320 lbs./min. These values are $(T_a')_0 = 0$, and $(T_a - T_p)_0 = -20$ inches.

For the conditions of curve $c$, Figure 1B, in which the flow $Q_o$ was decreased from 480 lbs./min. to 320#/min., and the flow $Q_s$ was simultaneously increased from 160 lbs./min. to 320 #/min., we find the following values:

$$T_p = .125(320 + 320) = 80 \text{ inches}$$
$$\therefore (T_a - T_p)_0 = 0$$
$$(T_a')_0 = \frac{160 + 320 - 640}{32} = -5 \text{ in./min.}$$

Substituting these values in Equation 12 we obtain the following equation from which the curve $c$, Figure 1B, was plotted:

(15) $\qquad T_a = 80 + 13.333 e^{-.5t} - 13.333 e^{-.125t}$

The curve $c$, Figure 1B, shows that, although the exact correction was made simultaneously with the change in demand, the maximum deviation of the level $T_a$ from the original value of 80 inches amounted approximately to 7 inches, and about 35 minutes elapsed before this deviation became a negligible amount. This deviation was due to the fact that the correction had to react through the transfer lag of the process.

Excess corrections

It is possible to reduce the magnitude of the deviation and the lapse of time necessary to come to within the same degree of balance by producing an excess correction in the flow $Q_s$, but the excess correction must be removed at the proper time to avoid or reduce the extent of over-running the level $T_a$.

Referring now to Figure 1C, curves are plotted from Equation 12 for the behavior of the level $T_a$ when, following the same change of $Q_o$ (by reducing it from 480 lbs./min. to 320 lbs./min.), different excessive corrections are made in the flow $Q_s$. Curve $c$ is the curve $c$ of Figure 1B in which the exact compensating correction was made in flow $Q_s$. In curve $d$ the flow $Q_s$ is made 480 lbs./min., or a 100% excess correction. This correction allows the level $T_a$ to drop approximately 4 inches, and if left on indefinitely would cause the level $T_a$ eventually to balance out at 100 inches, crossing the original value of 80 inches after a lapse of approximately 5 minutes.

Curve $e$ shows the behavior of the level $T_a$ when the flow $Q_s$ is raised to 640 lbs./min., or a 200% excess correction. This correction allows the level $T_a$ to drop approximately only 3 inches, but if left on indefinitely would cause the level to balance out at 120 inches, crossing the original value of 80 inches after a lapse of about 3 minutes.

From the behavior of the level $T_a$, as demonstrated by these curves, it is indicated that, although the excess correction reduces the amount of the initial deviation of the level $T_a$ from the original value of the level, the excess should be removed sometime before the level reaches the desired level in order to prevent serious deviation of the level on the other side of the desired value. Furthermore, since the direction of the rate of change (i. e., direction of movement) of level $T_a$ cannot reverse itself until the difference between the levels $T_b$ and $T_a$ is sufficient to cause the flow $Q_b$ to be equal to the difference of the flows $Q_a$ and $Q_o$, it is indicated that the excess correction should be removed sometime after the direction of the rate of change of the level reverses. Curve $d^1$ shows the resulting behavior of the level $T_a$ when the 100% excess correction is removed (i. e. $Q_s$ is reduced to 320 lbs./min.) in time to prevent more than .25 inch over-run. Curve $e^1$ shows the resulting behavior of the level $T_a$ when the 200% excess correction is removed (i. e. $Q_s$ is reduced to 320 lbs./min.) in time to prevent more than the same small over-run.

The times at which the excess corrections were removed to prevent more than the .25 inch over-run were determined empirically by a cut-and-try method. Determination of the time, or the deviation, at which the excess should be removed depends on many factors and the above empirical determination was possible only because we know the exact correction necessary. However, in practical control operation by control instruments the exact correction necessary is rarely, if ever, known, and the only indication on which to base corrections is that of behavior of the controlled variable brought about by the disturbances and resulting corrections. The control instrument responds only to the results of disturbances and corrections and cannot measure the cause producing the disturbances.

The above demonstrates the need of making excess corrections in practicing the control of process but the problem exists of proportioning the magnitude of the excesses and the manner in which the excesses should be removed.

Operation of automatic controllers

One type of controller constructed to make excess corrections and which can be placed on the process of Figure 1A is a so-called two-position controller which is designed automatically to change the supply $Q_s$ either to its maximum or minimum values when the level $T_a$ crosses the control point level, which in the present process is 80 inches. Thus this controller is designed to maintain a maximum excess correction so long as the level $T_a$ remains below the control point, and to reverse the excess correction and maintain it so long as the level $T_a$ remains above the control point. Thus the flow $Q_s$ is maintained either at its maximum flow of 640 lbs./min. or at its minimum flow of zero lbs./min. The behavior of the level $T_a$, controlled by such an ideal two-position controller, is plotted in curve $a$ of Figure 1D. This curve shows the behavior of the level $T_a$ when, following a steady state of levels $T_a$ and $T_b$ and flows $Q_o$ and $Q_a$, the control action is initiated simultaneously with an abrupt change of the flow $Q_o$ from 480 lbs./min. to 320 lbs./min.

Curve $a$ shows the initial deviation of the level $T_a$ is the same as in curve $e$ of Figure 1C. Thereafter each deviation is less and the period of oscillation of the level across the control point becomes less as time elapses so that after 8 minutes have elapsed the deviation is reduced to approximately one-tenth of an inch. But results for this type of controller, as plotted in curve $a$, can be obtained only when ideal conditions prevail for instantly changing the flow $Q_s$ to its extremes at the instant the level $T_a$ passes the precise value of 80 inches.

The presence of even slight imperfections, such as dead zones, friction, etc., causes a different behavior of the level $T_a$. Thus if there is present a condition (such as friction in the measuring element) giving rise to a dead zone such that a level change of one inch is necessary to overcome the force of the friction, the level $T_a$, following the change in $Q_o$, behaves as shown in curve $a$ of Figure 1E. This plot shows that the presence of the dead zone causes the level $T_a$ to cycle continuously through a band greater than the band of the dead zone. The more complicated the process lags the greater would be the magnitude of the band as compared with the magnitude of the dead zone. The above shows the importance of accurate use of excess corrections and gives an example of what may happen when excess corrections are not handled properly. (The above plots of curve $a$, Figure 1D, and curve $a$, Figure 1E, were respectively made by substituting the proper values in Equation 12 and shifting to the new condition each time the level $T_a$ crossed the control point (Figure 1D), or passed through the dead zone (Figure 1E).)

Referring now to Figure 1F, the process of Figure 1A is shown with mechanisms 1, 2 and 3 which are intended to control the flows $Q_{s_1}$, $Q_{s_2}$ and $Q_{s_3}$, respectively, the values of which flows are indicated by meters 4, 5 and 6, respectively. These flows are respectively controlled according to different functions of the behavior of the level $T_a$ and combine to produce the flow $Q_s$. In the following discussion the mechanisms 1, 2 and 3 will be considered separately and in various combinations.

Mechanism 1 is a proportional controller, so-called because for every change of the value of the level $T_a$ within its proportioning band the controller will establish a quantity change in flow $Q_{s_1}$. The equation of this controller may be written

(16) $\quad Q_{s_1} = .5 Q_{s_1} \text{ max.} + \dfrac{Q_{s_1} \text{ max.}}{b}[T_{c_p} - T_a]$ where:

$Q_{s_1}$ max. is the maximum possible flow above zero flow and where the minimum possible flow is zero $b$ is the magnitude of the proportioning band, i. e. the amount of change in level $T_a$ required to change the flow $Q_{s_1}$ from zero to $Q_{s_1}$ max.

$T_{c_p}$ is the value of the level which would produce a flow $Q_{s_1}$ half way between zero and maximum flow and thus is in the middle of the proportioning band.

This equation applies only so long as the level $T_a$ is within the proportioning band as located by the value of $T_{c_p}$.

Considering now the mechanisms 2 and 3 to be cut out and the flows $Q_{s_2}$ and $Q_{s_3}$ to be zero so that $Q_s$ equals $Q_{s_1}$, and using the same values for the process assumed in conjunction with the process of Figure 1A, and giving $Q_{s_1}$ maximum a value of 640 lbs./min., the curves $b$, $b^1$, $c$ and $c^1$ of Figure 1D show how the level $T_a$ and the flow $Q_{s_1}$ behave when the process thus controlled is upset by changing flow $Q_o$ from 480 lbs./min. to 320 lbs./min. Curve $b$ shows the behavior of level $T_a$ when the proportioning band (also called throttling band) is 40 inches. That is, if the level $T_a$ is at the top edge of the proportioning band, the flow would be zero, and a drop in level $T_a$ of 40 inches would be required to change the flow $Q_{s_1}$ from zero to 640 lbs./min. This curve shows that this adjustment permitted a maximum deviation of the level $T_a$ of 9 inches from its original value of 80 inches, and established a new equilibrium value at 6.66 inches below its original value.

The behavior of the controlled flow $Q_{s_1}$ is shown by curve $b^1$, which is plotted against the same time scale as curve $b$ but against flow ordinates as laid out at the right side of the Figure 1D. From this curve we see that the maximum flow $Q_{s_1}$ occurred 5 minutes after the disturbance and had a maximum value of 304 lbs./min. The flow finally balanced out at 267 lbs./min. so that the final correction made to the flow $Q_{s_1}$ over the initial flow $Q_{s_1}$ is 107 lbs./min. The maximum value of the flow $Q_{s_1}$ therefore amounted to a 35% excess correction over the eventual correction.

If, however, the proportioning band is decreased to 10 inches, the behavior of the level $T_a$ following the upset is quite different as shown in curve $c$. Although the level $T_a$ with this adjustment cycles several times across its final equilibrium level value, which is only 2.22 inches below the original value of 80 inches, the maximum deviation of level $T_a$ from the original value of 80 inches is only 5.4 inches.

The behavior of the controlled flow $Q_{s_1}$ for this adjustment is shown in curve $c^1$ corresponding to curve $b^1$. From this curve we see that the ultimate balanced flow is 302 lbs./min. which required a correction to the original flow $Q_{s_1}$ of 142 lbs./min. Also the maximum corrective flow occurred in 2 minutes and attained a value of 505.9 lbs./min., which represents an excess correction of 144% more than the eventual correction. This excess was then taken off and the flow $Q_{s_1}$ was reduced below the eventual value of 302 lbs./min. to bring the level $T_a$ down to its new equilibrium value. This excess correction, made in the opposite sense, amounted to −32.4% less than the eventual correction.

From curves $b^1$ and $c^1$ we see that as the proportioning band is narrowed the excess correction to the flow $Q_s$ made by the controller is larger, occurs sooner, and is taken off sooner, with the result that the initial deviation is reduced and the control result is caused to approach closer to that ideal control result demonstrated in curves $e$ and $e^1$ of Figure 1C. It is also apparent that the narrower the proportioning band the less is the deviation of the value of the final balance from the original value. But narrowing the proportioning band has the disadvantage that the instrument becomes more and more susceptible to the influences of "dead space" or other discontinuity reactions. As above described in connection with the two-position controller, such discontinuity may arise from slight play in the instrument parts or sticking of the parts due to friction, or from the presence of distance lag in the process being controlled. In Figure 1E the curve shown shows the control results of a two-position controller which was assumed to have a dead space or discontinuity of 1 inch, which is only 1¼% of the scale 0–80 inches of level. We see that under such circumstances the two-position controller causes the process to cycle continuously back and forth across the dead space. A two-position controller may be considered as a proportioning controller with zero proportioning band, and when so considered we have already seen that the presence of any appreciable discontinuity is infinitely large with respect to the proportioning band and the effect of the dead space is maximum.

Thus in instances where there is discontinuity caused by distance lag or where there are complications caused by the presence of many capacities and resistances the proportioning band must be made wider to avoid the cycling which the presence of discontinuity would cause if the proportioning band were made narrower. But such large proportioning bands may cause objectionable changes of the balance point where large continued changes in demand $Q_o$ occur.

The mechanism 2 of Figure 1F is commonly known as a floating controller. It has the characteristic of preventing the process from balancing out at any level other than a predetermined control point. When used alone, however, it has several inherent disadvantages which distinctly limit its practicability as a controller. This controller causes a rate of change in the flow $Q_{s_2}$ proportional to the deviation of the level $T_a$ from the control point 80 inches. In other words, if there is, for example, a deviation of $T_a$ of 1 inch from the control point, this instrument might cause the flow $Q_{s_2}$ to increase its flow 2 lbs./min. every minute. Likewise, a 2 inch deviation with the same adjustment would cause the flow to increase 4 lbs./min. every minute that this deviation existed.

The equation of this controller may be written

(17) $\quad Q_{s_2}' = \dfrac{Q_{s_2} \text{ max.}}{c}(T_{c_p} - T_a)$ where $Q_{s_2}$ max. = the maximum possible flow of $Q_{s_2}$ above the minimum possible flow and where the minimum possible flow is zero.

$c$ = a proportionality constant of the instrument, which constant may be varied to vary the proportion between the rate of change of flow for a unit of deviation.

$Tc_p$ = value of level $T_a$ at the control point setting, i. e. the value of $T_a$ at which the rate of change of the flow $Q_{s_2}$ is zero.

The range through which this equation applies depends on the constructional details of the particular mechanism.

This equation shows that $Q_{s_2}'$ becomes zero only when the deviation is zero. Thus the level $T_a$ can balance out only at zero deviation and the instrument has a constant control point.

Considering now the mechanisms 1 and 3 to be cut out and the flows $Q_{s_1}$ and $Q_{s_3}$ (Figure 1F) to be zero so that $Q_s$ equals $Q_{s_2}$, and using the same values for the process assumed in conjunction with the process of Figure 1A, and giving $Q_{s_2}$ a maximum value of 640 lbs./min., the curves $a$ and $b$ of Figure 1G show how the level $T_a$ and the flow $Q_{s_2}$ behave when the process thus controlled is upset by changing $Q_o$ from 480 lbs./min. to 320 lbs./min. Curve $a$ shows the behavior of the level when the rate of change of flow $Q_{s_2}$ per inch deviation is .8 lb./min./min., i. e.

$$\frac{Q_{s2} \max.}{c} = 0.8 \left( \frac{\text{lbs.}}{\text{min./min.}} \middle/ \text{in.} \right)$$

This curve shows that this controller permitted a maximum deviation of 14 inches and that at the end of 40 minutes the process was still cycling and that a condition of negligible deviation had not yet been established. Comparing this curve with curve $c$ of Figure 1D, we see that this controller does not have the ability to cope with the immediate effects of a disturbance as does the proportioning controller. But this mechanism does have the characteristic of eliminating any permanent or residual effects of changes in demand and thus prevents the process from balancing out at any value other than the control point.

The behavior of the controlled flow $Q_{s_2}$ is shown by curve $a^1$ of Figure 1G, which curve is plotted in the same manner as is curve $b^1$ of Figure 1D. From curve $a^1$ we see that the maximum flow $Q_{s_2}$ occurred approximately 30 minutes after the disturbance, and had a maximum value of 360 lbs./min. which represents an excess correction of 25%. But this excess did not occur until the level crossed the control point (a characteristic of the floating controller) and so did not return the level $Ta$ to balance at its control point even as quickly as did making the exact correction (no excess) at the time of the disturbance, as illustrated by curve $c$ of Figure 1C.

Curve $b$ of Figure 1G shows the behavior of the level $T_a$ when the instrument has been adjusted to increase the action of the floating effect so that the value $$\frac{Q_{s_2} \max.}{c}$$

is increased to 3.2. Whereas this increase has the effect of making the control action produce greater excess corrections, reducing the initial deviation of $T_a$, and causing level $T_a$ to cross the control point more quickly, it also has the effect of causing the level $T_a$ to cycle across the control point with a magnitude greater than that which occurred under the previous adjustment. Thus, referring to Figure 1G, curve $b$, the initial deviation was about 11¼ inches and occurred about 6 minutes after the disturbance, but the level cycled across the control point to a new deviation of about 9¼ inches and at the end of 35 minutes was deviated about 6 inches below the control point and was going lower.

Referring to curve $b^1$ of Figure 1G, which shows the behavior of the flow $Q_{s_2}$ for this adjustment of the instrument, we see that the controller produced a maximum flow of 484#/min. 13 minutes after the disturbance and that this maximum flow constitutes an excess correction of 100%. But this excess did not occur until the level $T_a$ had returned to the control point of 80 inches, and because of the characteristic of this instrument the level must deviate on the other side of the control point to reduce the excess flow. Thus this instrument, so adjusted, is impractical because it has the inherent tendency to cycle the level $T_a$ across the control point. Also, although the magnitude of each cycle is less than the preceding one (for this particular more sensitive adjustment), it can be shown that many hours would be required following the single disturbance for the instrument to return the level $T_a$ to a point where the cycling produces negligible deviation. Thus the instrument, so adjusted, has no ability to combat the succession of disturbances usually present in commercial processes.

The instrument can be adjusted to make it insensitive to the extent that it produces no excess in the flow $Q_{s_2}$ following a disturbance and during the time required for the restoration of the level $T_a$ to the actual control point, and when so adjusted the instrument does not inherently cause cycling of the level $T_a$ across the control point. But because this adjustment necessarily makes the instrument insensitive, excessive time is required to return the level $T_a$ to the control point and the initial deviation would be practically as great as if no control correction had been made. Thus the instrument so adjusted is impractical as a controller to combat varying disturbances.

Further, this instrument has no ability to overcome and combat effects of discontinuity in the process or measuring element. When an instrument, obeying the law of floating control as above defined, is adjusted to make excess corrections, the presence of such discontinuity exaggerates the magnitude of the inherent cycling effect and causes it to last longer. In fact, the presence of such discontinuity makes it impossible to avoid cycling even though the sensitivity be reduced to the point where no excess correction would be made in the absence of such discontinuity. Making the instrument less and less sensitive only has the effect of lengthening the period of the inherently sustained cycle. Likewise, too, the presence of such discontinuity due to distance lag or to complications arising from the presence of a multiplicity of capacities and resistances, magnifies the cycling and requires the reduction of the sensitivity of the instrument to the point where it is impractical. Only by inserting discontinuity into the instrument itself to introduce a dead space in which the instrument does not control in response to changes in level $T_a$ could the cycling be stopped.

In spite of the shortcomings of this instrument its most desirable characteristic, that of returning the level to the control point, can be successfully utilized by combining its action with the action of a proportioning controller. In other words, the flow $Q_s$ is now made the sum of the flows $Q_{s_1} + Q_{s_2}$. The resulting control action we shall call proportional-plus-floating control, and is the type of control described in my Patent Reissue No. 20,092. This control action inherits the particular advantages of its component parts while the distinct disadvantages of the component parts may, for the most part, be cancelled by proper adjustment.

The equation expressing this law of control may be synthesized from the equations of the proportioning and floating controllers, i. e. Equations 16 and 17 respectively. (NOTE.—Since the flows $Q_{s_1}$ and $Q_{s_2}$ are now combined we shall refer only to flow $Q_s$.) Differentiating Equation 16 we obtain

(18) $$Q_s' = -\frac{(Q_s) \text{ max.}}{b}(T_a - T_{c_p})'$$

This equation may be interpreted as stating that in a proportional controller the rate of change of the flow $Q_s$ is proportional to the rate of change of the deviation of the level $T_a$ from the control point.

Now adding the right-hand sides of Equations 17 and 18 we obtain the new value of $Q_s'$ as follows:

(19)
$$Q_s' = -\frac{(Q_s) \text{ max.}}{b}(T_a - T_{c_p})' - \frac{(Q_s) \text{ max.}}{c}(T_a - T_{c_p})$$

This equation, which expresses the law of the proportioning-plus-floating controller, states that the rate of change of the flow $Q_s$ depends additively upon the effect of the deviation of the level $T_a$ from the control point and on the rate at which the level is changing.

Still assuming that the minimum flow $Q_s$ is zero this equation may be written as

(20) $$Q_s' = -\frac{(Q_s) \text{ max.}}{b}[(T_a - T_{c_p})' + r(T_a - T_{c_p})]$$

in which

(21) $$r = \frac{b}{c}$$

The constant $r$ may be called the "reset constant" of the controller, i. e. the constant that governs the effectiveness of the floating or integrating action of the controller and which, when operating on the process of Figure 1A, brings about eventual return of the level $T_a$ to the control point. It may be described as the value which expresses the rate (expressed in scale units per minute) per unit of deviation at which the proportioning band moves with respect to the control point. It is this action that prevents the process from balancing out at any value other than the control point. The values $b$, $r$ and the value $T_{c_p}$ are adjustable in the mechanism. As we shall see from demonstration later there is a value of $r$ and a value of $b$ which will give critically aperiodic return of the level $T_a$ to the control point following a disturbance; i. e. a return such that the level $T_a$ is returned to the control point as rapidly as possible without cycling. Likewise there are values of $r$ and $b$ which give cycling return of the level to the control point. Further, by proper selection of such values of $r$ and $b$ the cycling may be rapidly damped in such manner as to quickly return the level to negligible deviation. Also, values of $r$ and $b$ may be chosen to cause the cycling to damp slowly and so permit wide cycling and slow return to the control point.

Assuming now, with reference to Figure 1F, that mechanism 3 is cut out and that flow $Q_{s_3}$ is zero so that the flow $Q_s$ equals $Q_{s_1}$ plus $Q_{s_2}$, and using the same values for the process assumed in connection with the process of Figure 1A, and giving $Q_s$ the same maximum value of 640 lbs./min., curves $a$ through $d$ of Figure 1H show how the level $T_a$ behaves when the process thus controlled is upset by changing flow $Q_0$ from 480 lbs./min. to 320 lbs./min. Curves $a^1$ through $c^1$ of Figure 1I show the behavior of the corresponding controlled flows $Q_s$.

Curve $a$ of Figure 1H shows the behavior of level $T_a$ when the values $r$ and $b$ are about critical in the sense above described and are respectively 0.1335 inverse minute (the reciprocal of minutes) and 73.85 inches, in which case neither the magnitude of the proportioning band nor the reset constant are such as to cause cyclic behavior of the level $T_a$. This curve shows that this adjustment permitted a maximum deviation of the level $T_a$ from the control point of 10 inches and at the end of 25 minutes after the disturbance the level $T_a$ was still 1 inch from the control point. Compare this with the curve $c$ of Figure 1C where the exact correction was made simultaneously with the disturbance and which permitted somewhat less deviation. Curve $a^1$ of Figure 1I shows that no excess correction to the flow $Q_s$ was made and that the exact correction was reached about 11 minutes after the disturbance.

Curves $b$ and $c$ of Figure 1H, respectively, show the behavior of level $T_a$ when the instrument is adjusted so as to make $r$ have the same value 0.1335 inverse minute but to make $b$ respectively 40 inches and 10 inches. Curve $b$ shows that by reducing the proportioning band to 40 inches the initial deviation of the level was reduced from the 10 inches of curve $a$ to about 8 inches, and the level was returned to within negligible deviation in 20 minutes instead of the much longer time required for curve $a$. Further, this adjustment caused the level to return to the control point with negligible cycling effect.

As shown in curve $c$, by reducing the proportioning band to 10 inches not only was the initial deviation reduced to 5 inches, but the level was returned to within negligible deviation in less than 20 minutes. Although curve $c$ shows that this adjustment caused the level to cycle across the control point, this type of cycling may be preferable to a larger initial deviation and this adjustment of the controller is generally the best for the present condition. Comparing curve $c$ of Figure 1H with curve $c$ of Figure 1D we see the improvement made over the proportioning controller alone. Not only is the initial deviation slightly less in curve $c$ of Figure 1H but also at the end of 20 minutes (after the cycling has damped out) the deviation is negligible as compared to a deviation of 2.22 inches shown in curve $c$ of Figure 1D.

The effect on the flow $Q_s$ made by reducing the proportioning band is shown in curves $b^1$ and $c^1$ of Figure 1I, which show an excess correction of 27.5% in 7 minutes for curve $b^1$ and an excess correction of 200% in 3 minutes for curve $c^1$. Thus in this controller combination where $r$ is not above the critical value for the process being controlled, as the proportioning band $b$ is made smaller within practical limits, the level $T_a$ is returned from its initial deviation to the region of the balance point more quickly, just as in the case of the proportioning control action alone.

It is apparent that, although a periodic recovery transient of level $T_a$ results as the proportioning band is decreased below its critical value, such cycling is damped and is not objectionable.

A periodic transient recovery also results as $r$ is increased above its critical value but that such an adjustment of $r$ is undesirable appears from the following. When $r$ is increased beyond its critical value to make the floating action more forceful, undesirable cycling results, as shown in curve $d$ of Figure 1H where $r$ has a value of .4452 inverse minute (or three times more rapid than the former critical value) and $b$ has a value of 20 inches. The cycling caused by this adjustment of $r$ cannot be damped out by changing the proportioning band $b$. If the proportioning band is reduced to 10 inches, a more violent cycling results, although such has not been demonstrated by a curve. If the proportioning band is increased, a slower cycling results, as shown in curve $e$ which shows the behavior of level $T_a$ when the instrument is adjusted to make $r$ the same .4452 but $b$ is increased to 160 inches.

From the above we see that with this type of control mechanism, for successful operation the mechanism should be constructed to permit proper adjustment of the floating component characteristics, avoiding, however, the possibility of making the restorative action of the floating component too rapid, and the present invention provides for such mechanism.

But so long as $r$ is not above its critical value, decreasing the proportioning band below its critical value has an advantageous effect as is demonstrated by the improved control action (curves $b$ and $c$ of Figure 1H) obtained as the proportioning band $b$ is decreased. And curves $b^1$ and $c^1$ of Figure 1I show how the fluctuations of flow $Q_s$ increase in magnitude and decrease in period as the proportioning band is decreased.

A limitation of the proportioning-plus-floating control action is that to obtain a certain quantity change in the flow $Q_s$ to correct for disturbances the instrument must either allow a corresponding deviation of the level $T_a$ from the control point or a lesser deviation for a comparatively long period of time since it is impractical to employ a forceful floating characteristic. Further, the presence of discontinuity in the process or instrument tends to cause undesirable cycling and necessitates making the floating characteristic less effective. A discontinuity similar in character to that illustrated in Figure 1E not only prevents the excess quantity correction from being reduced with the reversal of the direction of the rate of change of level $T_a$, but it also permits an additional quantity change due to the floating component. So we see that the presence of discontinuity limits the extent to which the proportioning band can be narrowed and the degree to which reset characteristic can be utilized and necessitates an adjustment of the instrument that permits greater deviation from the control point and takes a longer time to restore the level to balance at the control point.

To assist in offsetting these and other limitations a third mechanism 3 is added to the controllers 1 and 2, as shown in Figure 1F. This mechanism is assumed to produce a quantity change in flow $Q_{s_3}$ proportional to the rate of change of the level $T_a$. Thus, when the level $T_a$ is balanced and not changing, the flow $Q_{s_3}$ has some neutral value, which in this illustration may be arbitrarily selected. When, however, the level $T_a$ is increasing, flow $Q_{s_3}$ is reduced below the neutral value an amount proportional to the rate at which $T_a$ is rising. When $T_a$ is decreasing, flow $Q_{s_3}$ is increased above the neutral value an amount proportional to the rate at which $T_a$ is decreasing. The action of mechanism 3 will hereinafter be referred to as the derivative action and its effect on the control results will be referred to as the derivative effect.

Assuming the minimum flow $Q_{s_3}$ to be zero, and the neutral flow to be one fourth of the maximum flow $Q_{s_3}$, the equation of such an assumed mechanism 3 may be expressed as follows:

(22) $\quad Q_{s_3} = \dfrac{(Q_{s_3})\ \text{max.}}{4} - \dfrac{(Q_{s_3})\ \text{max.}}{d}(T_a - T_{c_p})'$ or, differentiating

(23) $\quad Q_{s_3}' = -\dfrac{(Q_{s_3})\ \text{max.}}{d}(T_a - T_{c_p})''$ where $d$ = the proportionality constant determining the quantity change in flow $Q_{s_3}$ produced by a unit rate of change of level $T_a$. "$d$" is numericably equal to that rate of change of level $T_a$ which would produce a quantity change in the flow $Q_{s_3}$ equal to $Q_{s_3}$ maximum.

These equations show that the behavior of mechanism 3 is such that it produces a quantity change in response to a rate of change of the level $T_a$, and maintains such change only so long as the rate of change of the level persists. Thus the control effect of this instrument is merely to reduce the rate of change of the level $T_a$ regardless of the direction in which the level $T_a$ is changing, or regardless of the instantaneous value of the level $T_a$.

This characteristic of mechanism 3 is shown by curve $a$ of Figure 1J which shows the behavior of the level $T_a$ of the process of Figure 1F following a disturbance caused by changing flow $Q_0$ from 480 lbs./min. to 320 lbs./min. and when the following conditions were assumed: mechanisms 1 and 2 are cut out and flows $Q_{s_1}$ and $Q_{s_2}$ are zero; $Q_{s_3}$ maximum is 640 lbs./min.; and $d$ has a value of 8 in./min. Comparing this curve $a$ with curve $c$ of Figure 1J, which is a duplicate of curve $a$ of Figure 1B and shows the behavior of the level $T_a$ when no control was applied, we see that in both cases the level $T_a$ will eventually balance out at 60 inches, but that the mechanism 3 slows down the rate at which the level $T_a$ approaches its balance of 60 inches.

This is explained by observing curve $a^1$ of Figure 1J which shows the behavior of flow $Q_{s_3}$ and how, as the level $T_a$ started to drop following the disturbance, $Q_{s_3}$ increased to 560 lbs./min. and thereafter gradually reduced to its original or neutral value of 160 lbs./min. as the rate of change of $T_a$ gradually reduced to zero.

Curve $b$ of Figure 1J shows the behavior of level $T_a$ when the controller is adjusted so that $d$ has a value of 32 in./min., i. e. so that the level would have to have a rate of change of 32 in./min. to produce maximum change in the flow $Q_s$. With this adjustment the flow $Q_{s_3}$ was initially increased only to 260 lbs./min. and then was gradually reduced to its original flow of 160 lbs./min. as the rate of change of level $T_a$ gradually approached zero. Thus adjusted, curve $b$ shows that the controller is not as effective to slow down the rate of drop of the level $T_a$ following the disturbance.

This mechanism 3 used alone is not a controller in the sense that it has no ability to correct for any permanent change in demand, but when its control effect is combined with those of instruments 1 and 2 it may be utilized to improve the control effect over that which could have been obtained without the mechanism 3. Thus mechanism 3, when combined with mechanisms 1 and 2, improves their control operation by permitting at least in some instances the use of faster reset effects to reduce the initial deviation and returns the level $T_a$ to the control point sooner without causing undesirable cycling.

The hypothetical equation expressing the operation of a combination of the control effects of mechanisms 1, 2 and 3 may be synthesized in the same manner that the equation of the proportioning-plus-floating control equation was obtained. Thus we add the right-hand sides of Equations 20 and 23 to obtain the new value of $Q_s'$:

(24) $\quad Q_s' = -$ $$\frac{(Q_s)\max.}{b}\left[r(T_a-T_{s_p})+(T_a-T_{c_p})'+\frac{b}{d}(T_a-T_{c_p})''\right]$$

where $Q_s$ now represents the combined flows $Q_{s_1}$, $Q_{s_2}$ and $Q_{s_3}$.

Such a combination of separate instruments to obtain the combined results of their respective control effects would have definite disadvantages, such as the obvious difficulty of adjusting the constants of the different instruments to make the instruments work in harmony to control the level as desired. Since each mechanism would affect the level $T_a$, and since each would be responsive to the level $T_a$, each would be affected by the other and the problem of adjusting the control effects produced would be extremely difficult and impractical. Also the problem of selecting the maximum and minimum flows for each of the mechanisms would be difficult and impractical. In the present invention, however, this problem has been solved and other new and useful results obtained by combining in a single instrument the proportioning, floating and derivative (mechanism 3) control effects to obtain the practical desired simultaneous operation with only a few adjustments. Such an instrument will be referred to as a proportioning-plus-floating-plus-derivative controller.

Therefore, to demonstrate the improved control effects obtained by adding the three control principles together we will refer to the control results obtained by the operation of an actual instrument embodying the present invention and shown in Figure 2A. By making assumptions well within the limits of practicability the equation expressing the operation of this instrument may be written as follows:

(25) $\quad \left[\dfrac{K_2}{K_n}+\dfrac{R_3V_3+R_3V_4+R_4V_4}{R_4V_4}\right]Q_s'+R_3V_3Q_s''=$ $-\dfrac{Q_s\max.}{K_n}\left[\dfrac{1}{R_4V_4}(T_a-T_{c_p})+\dfrac{R_3V_3+R_3V_4+R_4V_4}{R_4V_4}(T_a-T_{c_p})'+R_3V_3(T_a-T_{c_p})''\right]$ Curves $a$, $b$ and $d$ of Figure 1K show the behavior of the level $T_a$ following a disturbance made by changing the flow $Q_0$ from 480 to 320 lbs./min. when the flow $Q_s$ is controlled by a controller operating in accordance with the law of Equation 25. The curves were obtained by substituting the proper values in Equation 25, i. e. the proper values of $R_3$, $R_4$, $V_3$, $V_4$ and $K_n$ and $K_2$, and with the maximum flow $Q_s$ equal to 640 lbs./min. and the minimum flow $Q_s$ equal to zero. Without defining these constants at this time we point out that the instrument just referred to in Figure 2A is provided with adjustments to make the values of these constants such as may be desired, and that changing these adjustments changes the effect of the controller on the level $T_a$ as is shown by its behavior as plotted in the three curves $a$, $b$ and $d$ which are for different adjustments of the instrument. The adjustment for curve $a$ is obviously the best. Curve $c$ of Figure 1K is the same as curve $c$ of Figure 1H (proportioning-plus-floating controller) and is reproduced for convenience as representing the type of control result given by the proportioning-plus-floating controller when adjusted so that the damping cycles of the level occur in the region of the control point. The curves $a^1$, $b^1$, $c^1$ and $d^1$ of Figure 1L show the behaviors of the corresponding flows $Q_s$.

Referring now to curve $a^1$, the derivative effect caused the flow to increase to 640 lbs./min. in only a fraction of a minute after the disturbance. If the valve 20 (Figure 1A) had been able to pass more flow, the curve shows that the flow $Q_s$ would have been raised to 720 lbs./min. in less than a minute, an excess correction of over 350%. But this excess was automatically removed two minutes after its peak, and two minutes before the level $T_a$ returned to the control point. In fact an excess correction in the opposite sense was made before the level $T_a$ returned to the control point so that it over-ran the control point only a negligible amount. (Curve $a$ was plotted on the assumption that the valve operation did not become discontinuous.)

Comparing this result with curve $c^1$ we see that the proportioning-plus-floating controller made an excess correction of only 200% and that the excess did not occur until about 2½ minutes after the disturbance. Further, the curve shows that the excess was not removed completely until about the time the level $T_a$ crossed the control point.

Thus, with reference to the instant case, one of the advantages of adding the derivative effect to the proportioning-plus-floating controller is that larger excess corrections may be made without causing undesirable cycling and with the result that the level $T_a$ is returned to the control point sooner and with less initial deviation.

As will be demonstrated, the derivative effect improves the control action of the proportioning controller alone in the instant case. Thus, by superimposing excess corrections on the proportioning effect in the instant case, the addition of the derivative effect reduces the initial deviation and narrows the value of the proportioning band which gives a critically damped balancing of the level $T_a$. The present invention also provides apparatus and method for combining mechanisms 1 and 3 in a single, simple, practical instrument.

To demonstrate the improved control effect obtained by adding these two control principles together we will refer as before to the control results obtained by the actual operation of the instrument shown in Figure 2A adjusted to operate in accordance with these two control principles alone. Also, as before, by making assumptions well within the limits of practicability the equation expressing the operation of an instrument having these combined control effects may be written as follows:

(26) $\quad Q_s+\dfrac{K_n}{K_2+K_n}R_3V_3Q_s'=.5Q_s\max.-$ $\dfrac{Q_s\max.}{K_2+K_n}[(T_a-T_{c_p})+R_3V_3(T_a-T_{c_p})']$ Curve $a$ of Figure 1M shows the behavior of the level $T_a$ following a disturbance made by changing the flow $Q_0$ from 480 to 320 lbs./min. when the flow $Q_s$ is controlled by a controller operating in accordance with the law of Equation 26. As before, the curve was obtained by substituting in Equation 26 the desired values for the constants $R_3$, $V_3$, $K_n$ and $K_2$, and with $Q_s$ maximum equal to 640 lbs./min. Curve c of Figure 1M is a reproduction of curve c of Figure 1D showing the behavior of the level $T_a$ when controlled by a proportioning controller (mechanism 1). The adjustments of the effective proportioning bands of the two controllers are such that they cause the level to balance out at the same point. A comparison of the two curves, without going into the quantities involved, shows that the initial deviation was materially reduced by the derivative effect and that the level returned to its balance point sooner and without over-run. The reason for this improved result appears from a comparison of the excess corrections of flow $Q_s$ made by the two controllers. This comparison is shown in Figure 1N which shows in curves $a^1$ and $c^1$ the behaviors of the flows $Q_s$ corresponding to the behaviors of the levels $T_a$ shown in curves a and c of Figure 1M. Not only did the proportioning-plus-derivative controller make a larger excess correction but it also put this correction on more rapidly after the initial disturbance. In the instant case, it also took off the excess correction sooner that the proportioning controller removed the excess that it put on.

*Instrument description*

Referring now to Figure 1A, the flow $Q_s$ is shown controlled by a controller 10 embodying the present invention. This controller is connected through a line 11 to a measuring element 12 which responds to the hydrostatic pressure of the liquid in tank $A_a$ and so transmits to the controller 10 a value continuously proportional to the level $T_a$. The controller 10 is connected with an air supply pressure not shown and has mechanism for translating said air supply into a pneumatic control pressure which may be considered as the output of controller 10. This output pressure $P_2$ is conducted through tubing 13 to a special flow controller 14 also embodying the invention. This controller is connected through lines 15 and 16 to the respective sides of an orifice 17 in the line 18, which orifice produces a pressure drop which is a function of the flow $Q_s$. Controller 14, like controller 10, is connected with an air supply pressure and the output of the controller 14 is an air pressure which through line 14a connects with and operates a diaphragm motor 19 operating a valve 20. In this hook-up the output of controller 10 effectively sets the control point of the flow controller 14 in such manner that the flow $Q_s$ is maintained linearly proportional to the output pressure of controller 10, i. e. the ratio of the output pressure $P_2$ to its maximum pressure is identical to the ratio of the flow $Q_s$ to its maximum flow $Q_s$.

Referring to Figures 2A and 4, controller 10 comprises generally a pressure-sensitive element 21 in the form of a hollow helical tube connected with the pressure element 12 in the tank $A_a$. This element 21 has a fixed end, and an end 22 movable to positions corresponding to the value of the level $T_a$. The free end 22 is connected by a wire link 23 through levers and links generally indicated at 24 and 25 (Figure 3) to operate and correspondingly position one end 26a of a floating arc lever 26. The other end of lever 26 is positioned by a bellows motor assembly generally indicated at 27.

We will interrupt this general description to look briefly at the bellows motor assembly in Figure 5. Upper and lower base plates 28 and 29, rigidly spaced by three rods 30, support the stationary ends of upper and lower outer opposing bellows 31 and 32, made of resilient material and corrugated to make them expansible and contractible. The opposing ends of these bellows support between them a floating rack 33, in which end 26b of the floating arc lever 26 is pivoted.

Inside the bellows 31 and 32, respectively, are coil springs 34 and 35 under compression. Inside upper bellows 31 and pneumatically sealed therefrom is a smaller bellows 36 secured at its upper end to upper base plate 28 and at its lower end to the bottom of bellows 31 which supports the floating rack 33. Since the opposition of the springs is constant the position of the rack 33 and of the end 26b of the floating arc lever is determined by the pressures in and the relative effective areas of bellows 36, 31 and 32.

The effective or working area of bellows 36, i. e. the area on which its pressure operates, is less than the working area of bellows 31, but the working areas of bellows 31 and 36 added equal the working area of bellows 32.

Referring to Figure 3, as a result of this construction, when the pneumatic pressure $P_2$ in bellows 36, $P_3$ in the bellows 31, and $P_4$ in the bellows 32 are all equal, the springs 34 and 35 always position the floating rack 33 and the supported end 26b of lever 26 at a norm or neutral position. Also when the rack 33 and the end 26b are deviated from this norm position and pressures $P_2$ and $P_3$ are equal a certain pressure difference between pressure $P_4$ and pressures $P_2$ and $P_3$ is required. But when the rack 33 is deviated from norm position the same amount and pressures $P_3$ and $P_4$ are equal, a greater pressure difference between $P_2$ and pressures $P_3$ and $P_4$ is required. The ratio of these two required pressure differences is proportional to the effective areas of bellows 32 and 36. If none of the pressures are equal to each other various pressure relationships may establish the same deviation.

Referring to Figure 3, the floating lever 26 is connected by a link 37 to operate a baffle 38 of a pneumatic control couple or detector valve generally indicated at 39 and including (see also Figures 17 and 23) a stationary nozzle 40 which provides an escape to atmosphere for a restricted stream of air supplied through tube 41 connected through a restriction 42, line 43 and a transfer switch valve generally indicated at 45 with an air supply line 4.

As shown in Figures 17 and 23 the link 37 engages a baffle lever 111 extending from a shaft or baffle arbor 46 mounted in jewel bearings which reduces frictional resistance to a minimum so that the baffle lever 111 is made highly responsive to movements of the floating arc lever 26. Arbor 46 carries a baffle support 48 freely supported from the arbor 46 by yoke arms 48a. The baffle support is counterbalanced by a counterweight 49 to turn in a counterclockwise direction and to contact lightly against the underside of the baffle lever 111. The baffle 38 is secured to the baffle support 48 as shown. A light hair spring 47 urges the baffle support 48 in counterclockwise direction with respect to the arbor 46. With this construction as the lever 111 lowers (counterclockwise movement) baffle support 48 is also given a counterclockwise movement and imparts the same movement to the baffle. But if when the baffle lever 111 is raised (clockwise rotation) to an extent to permit the baffle to contact the nozzle, further clockwise rotation of the baffle lever 111 simply leaves the baffle and baffle support without putting any strain on them.

The control couple is a delicate mechanism responding to the slightest movement of the lever 26 as dictated by the combined motions of the responsive element 21, and the bellows motor assembly 27.

Referring to Figure 3 the output of the control couple is a variable back pressure in the line 41 which, as will develop, operates a relay valve (generally indicated at 50) supplying pressure $P_2$ through the transfer switch 45 to the bellows assembly 27. For the moment we will consider the instrument adjusted by means of a switch valve 56 in a line 57 so that the pressure $P_2$ is supplied directly to both bellows 36 and 31. The switch valve 56 when open provides an unrestricted passage between bellows 36 and 31 so that the pressure $P_3$ always equals pressure $P_2$. The pressure $P_2$ thus supplied to bellows 36 and 31 causes them to operate the control couple to complete a regenerative operation in which the bellows 36 and 31 control the pressure $P_2$ by operating the baffle of the control couple. But before tracing this operation through, the sensitiveness of the control couple and its co-action with the relay valve 50 must be understood.

The output pressure of the control couple is varied by the relative movement of the baffle and nozzle. When the baffle touches the nozzle to cover its opening, a maximum back pressure starts building up in the line 41. The amount of this maximum pressure depends on the restricting action of restriction 42, the area of the nozzle, the degree to which it is covered by the baffle, the amount of the supply pressure and the effective strength and application of the hair spring. In the present embodiment when the supply pressure is maintained at about 17 lbs./sq. in. by a usual pressure regulator 5 in line 4, the maximum back pressure above mentioned may be in the neighborhood of 10 lbs./sq. in., but as will appear, the maximum operating back pressure necessary to operate the relay valve to one extreme position is in the neighborhood of 4 lbs./sq. in.

When the baffle is moved away from the nozzle beyond a certain limited distance, the back pressure in tube 41 starts decreasing to a minimum back pressure, the value of which depends on the supply pressure, the restriction 42 and the restriction of the nozzle, and in the present embodiment is in the neighborhood of 1 lb./sq. in. But as will appear, a minimum back pressure of only about 3¼ lbs./in. is necessary to operate the relay valve to the other extreme position. The limited distance just mentioned in the present embodiment is less than one one-thousandth of an inch. For relative positions of the nozzle and baffle within this one-thousandth of an inch various pressures intermediate said maximum and minimum pressures may be built up.

The operating range of the nozzle and baffle relative movement is thus less than one-thousandth of an inch and in the following discussion and in the claims, when the baffle is within this one-thousandth of an inch, the baffle will be referred to as being in juxtaposition with respect to the nozzle.

The control couple output or back pressure operates the relay valve 50 shown in detail in Figure 24. The line 41 from the nozzle enters a passageway 41a in the base of the valve supporting structure and connects with the bellows 51 supported at one of its ends on the base. The other end of the bellows is free and movable in response to variation of the control couple output pressure in the line 41. Into the movable end of the bellows 51 is threaded and locked a valve stem 52 carrying a double headed valve plunger 53 which moves with the free end of the bellows. This valve plunger controls air flow entering a small chamber 53a from the air supply line 43 through a port 54 and a passage 54a and controls the air flow leaving the small chamber 53a to atmosphere. The left plunger 173 of the double headed valve plunger controls the passage of air to the small chamber and the right plunger 173a controls the air escaping to atmosphere. The small chamber is connected through an output port 55, line 55a (Figure 3), transfer switch 45 and line 55b with the inner bellows 36, and with the present adjustment with bellows 31 through line 57.

This valve 50 is what may be termed a supply and waste valve, since it governs both the supply to and the waste from the system. The construction is such that the valve plungers never cover their respective seats simultaneously. By selection the characteristics of bellows 51 may be such as in the present embodiment to throw the valve plunger to alternate positions to produce a full variation in output pressure in the practical operating range by producing a change in pressure in the bellows 51 of approximately ¾ lb./sq. in.

Thus the initial tension on bellows 51 in the present embodiment may be made such that the relay valve will maintain minimum output pressure $P_2$ when the control couple output pressure is 3¼ lbs./sq. in. and such that a maximum output pressure $P_2$ is maintained when the control couple output pressure is 4 lbs./sq. in. And the relay valve will maintain output pressures intermediate these extremes for control couple output pressures intermediate the 3¼ and 4 lbs./sq. in. The response of the relay valve 50 to variations of the output pressure of the control couple is made substantially instantaneous by keeping the capacity of the tube 41 and bellows 51 small and by eliminating restriction in the line 41.

The reaction of the bellows 36 and 31 to pressure change in the output of valve 50 is made immediate and continuous by making transfer switch 45 and lines 55a and 55b free of restrictions and avoiding the presence of undesirable volume capacity of the parts. We have already seen that the response of the baffle 38 to the movement of bellows 36 and 31 is immediate, continuous and in exact proportion.

*Proportioning control action*

Referring to Figure 3 and assuming now a given position of the element operated end 26a of lever 26, for example, on the axis $y$—$y$ (to be described) the pressure $P_2$ in the bellows 36 and 31 (still assuming the free passage between bellows 36 and 31) operates against the pressure $P_4$ in bellows 32 (which is not freely connected with pressures $P_2$ or $P_3$) and against the combined effect of springs 34 and 35 and maintains the baffle 38 in juxtaposition to the nozzle 40. Although the action of the control couple 39 and that of the relay valve 50 are so sensitive as to be practically on and off, their counteractions to the response of bellows 31 and 36 are so immediate and positive because of small capacities and the absence of resistance that the bellows 31 and 36 maintain the baffle and nozzle in juxtaposition without perceptible oscillation. Thus the response to any change that initiates a change in thet position of either end of arc lever 26 is either aperiodic or of an extremely high frequency which damps to zero in negligible time.

Tracing this operation in more detail: If the end 26a of lever 26 starts to move upwardly due to the level $T_a$ dropping the resulting pressure change in the bellows 31 and 36 starts to lower the bellows operated end 26b of arc lever 26 to maintain the juxtaposition of the nozzle and baffle, with the result that the pressure $P_2$ in line 55b starts increasing at a rate proportional to the rate of change of level $T_a$, i. e. the quantity pressure change at any time is proportional to the quantity level change. Therefore the change in the pressure difference between the pressure $P_2$ in the bellows 31 and 36 and the pressure $P_4$ in the bellows 32 is made a proportional function of the value of the change in level $T_a$, or in other words the pressure $P_2$ and level $T_a$ have a relationship which has a proportional characteristic as described in connection with controller 1 of Figure 1F.

The output of the control instrument is the pressure $P_2$ in the line 55b which is connected through the transfer switch 45 to the output line 13 leading to the flow controller 14, Figure 1A. Thus, if we assume that the flow controller 14 maintains a flow in line 18 proportional to the output pressure $P_2$ as received from controller 10, then we see that controller 10, as mechanism 1 of Figure 1F, makes quantity changes in flow $Q_s$ within the limits of zero to maximum $Q_s$ which are proportional to quantity changes in the level $T_a$.

*Proportioning-pluo-floating control action*

So far we have considered only the static relationship between the output pressure $P_2$ and the level $T_a$, but the present instrument in addition to this proportional characteristic includes a dynamic relationship between the behavior of the output pressure $P_2$ and the level $T_a$ which has a floating control characteristic such as was disclosed in connection with mechanism 2 of Figure 1F. Thus as long as the level $T_a$ remains away from its control point value the instrument superimposes on the proportional reaction just described a rate of change proportional to the deviation of level $T_a$ from the control point. In the present embodiment, if the level $T_a$ is below the control point this rate of change is positive, and if above the control point is negative.

This action in the present embodiment is obtained by connecting bellows 31 and 32 through a restriction and utilizing the pressure difference between the pressure $P_2$ in the bellows 31 and 36 and the pressure $P_4$ in bellows 32 to give the pressure $P_4$ a rate of change which is proportional to the deviation from that value of level $T_a$ which causes $P_2$ and $P_4$ to be equal, which level value is the control point of the instrument and corresponds to the y—y axis position and the "norm" position of the ends of the arc lever 26.

The manner in which pressure $P_4$ is obtained and varied will now be described. The pressure $P_3$ in bellows 31 (which pressure has been made equal to pressure $P_2$ by opening valve 56) is connected through a restriction to a line 58 leading into bellows 32. This connection may be traced as follows: Leading from line 57 below the switch valve 56 is a line 59 which is connected through a restriction 59a (such as a length of capillary tubing) with a resistance by-pass valve 60 adapted when closed to connect line 59 and resistance 59a with line 60a containing a similar resistance. Line 60a leads to a second and similar by-pass valve 61 adapted when closed to connect line 60a with a line 61a also containing a resistance, and line 61a leads to a by-pass valve 62 adapted when closed to connect line 61a with line 62a containing a resistance. Line 62a connects directly with line 58 and bellows 32. Valves 62, 61 and 60, when opened successively, respectively successively short circuit the resistances 62a, 61a and 60a by connecting the lines 62b, 61b and 60b with line 59. Thus by manipulating these valves in the manner described different amounts of restriction may be inserted in the connection between the bellows 31 and 32. Because there must be a pressure difference between $P_2$ and $P_4$ to produce the pneumatic proportioning action it is necessary that there be some restriction to the flow of air between $P_2$ and $P_4$. Also, since flow of air between $P_2$ and $P_4$ produces the floating action the affect of which varies directly with the magnitude of the rate of flow between the two pressures $P_2$ and $P_4$ for a given pressure drop, the restriction must be sufficient to avoid the possibility of the floating action dominating the proportioning action which results in cycling as shown in Figure 1G. For this reason the arrangement is such that a practical minimum restriction is provided by restriction 59a between pressures $P_2$ and $P_4$ even when restrictions 62a, 61a and 60a are short circuited.

The by-pass valves 60, 61 and 62 are of the same construction. One of them is shown in detail in Figure 25 and comprises a casing 63 having a ported base 64. Referring to the valve as valve 61 (Figure 3), the ported base has outer ports respectively connected to lines 60b and 61b. The base has inner ports respectively connected to the restriction lines 60a and 61a. The outer ports open into a chamber 63b and so at all times have free communication, one with the other. The inner ports open into an inner chamber 63a and so at all times have free communication the one with the other. Chambers 63a and 63b are also connected but may be sealed one from the other by a valve plunger 65 to cut off the outer from the inner ports. The valve plunger 65 is carried by the free end of a bellows 66 secured at its other end to the casing 63 and pneumatically sealed with respect thereto. The plunger 65 is operated to its seated and unseated positions by a threaded rod 67 adapted to be rotated to extend and retract the bellows and plunger to close off the communication between the chambers 63a and 63b, or to open communication between them. The presence of bellows 66 serves to permit the inner and outer ports to be connected or disconnected without the possibility of leakage through a stuffing box. The by-pass valve 60 differs from the other valves in that it has only one outer port and this port connects in the line 60b.

With this construction, when the valves 60, 61 and 62 are connected as shown in Figure 3 the lines 60b, 61b and 62b are at all times connected in series one with the other through chambers 63b and the resistances 60a, 61a and 62a are at all times connected through the chambers 63a.

Assuming valves 62, 61 and 60 to be open, i. e. their respective plungers retracted, line 57 is connected with line 58 and pressures $P_2$ and $P_4$ are connected through resistance 59a, and the lines 60b, 61b and 62 b and their respective connecting chambers 63b. Thus, only restriction 59a is between the two pressures. But if the valve 60 is closed, restriction 59a is no longer directly connected to the outer chamber 63b of valve 60 and the resistance of line 60a is added to the resistance of 59a. In this same manner the other by-pass valves may be closed to add progressively the resistances under their control.

The value of the constant $R_4$ appearing in Equation 25 is determined by the amount of the resistances 59a, 60a, 61a and 62a connecting bellows 31 and 32, and hereinafter thees resistances as shown in Figure 3 will be referred to as $R_4$. The value of the constant $V_4$ is determined by the volume of bellows 32 and any volume such as a capacity tank 196 connected thereto through an unrestricted passage 58b (Figure 3). By varying the number of, or the size of, such tanks the volume $V_4$ may be adjusted. The effect of these constants on the control operation is to change the effective value of the "reset constant" of the controller, i. e. the amount of the restorative effect of the instrument on the operating pressure $P_2$.

We have already seen that the bellows motor assembly is designed so that when the pressures $P_2$, $P_3$ and $P_4$ are equal the end 26b of the lever 26 is at norm position. It is also evident that there is a position of the end 26a of arc lever 26 which permits the pressure $P_2$ in bellows 31 to hold the baffle in juxtaposition with respect to the nozzle and be equal to the pressure $P_4$. This position of end 26a corresponds to the norm position of end 26b and the level $T_a$ corresponding to this norm position of the end 26a may be considered as the control point level which the instrument is adjusted to maintain.

Assuming that the three bellows of the motor assembly 27 are connected up as described, i. e. with both bellows 31 and 36 responding directly to the pressure $P_2$ in line 55b and bellows 32 connected through restrictions to the pressure $P_3$ in bellows 31 the instrument combines the proportioning and floating control functions of the hypothetical mechanisms 1 and 2, respectively, of Figure 1F, as will now be demonstrated. If the pressure $P_2$ equals the pressure $P_4$ it is because the level $T_a$ is at the control point setting, i. e. is at 80 inches, and if the pressure $P_2$ is constant (not changing) and is equal to $P_4$ it is because the level $T_a$ is at the control point and is stationary. If $P_2$ has a rate of change but is momentarily equal to $P_4$ it is because the level $T_a$ has a rate of change and is momentarily at the control point. For these reasons, if the level $T_a$ is at the control point and stationary, the pressure $P_2$ has some finite value and is stationary. When following such a condition of equilibrium, the flow $Q_0$ is reduced from 480 lbs./min. to 320 lbs./min. (Figure 1A) and the level $T_a$ starts falling, the end 26a of the arc lever 26 starts rising correspondingly, and bellows 31 and 36 through the control couple 39 and relay valve 50 operate to keep the baffle and nozzle in juxtaposition with the result that the pressure $P_2$ starts increasing initially at a rate which is proportional to the rate of change of level $T_a$. However, as soon as there is a quantity increase in $P_2$ there is a pressure difference established between the pressure $P_2$ and the pressure $P_4$ proportional to the deviation of the level $T_a$ from the control point, and air starts flowing through the restriction to bellows 32 and increases the pressure $P_4$.

The rate of change of $P_4$ would be dependent upon the quantity of air flowing through the restriction and the value of volume capacity $V_4$ of bellows 32 and its associated tank 196 into which the air flows. Since the value of the flow coefficient for any given restriction, such as a given length of capillary tubing, is constant, and since the flow may be assumed to be linear, the quantity of air flowing to $V_4$ is proportional to the pressure difference, which pressure difference, as we have already seen, is proportional to the deviation of $T_a$ from the control point. Also, since the volume $V_4$ into which air flows may be assumed to be constant, the rate of change of $P_4$ is proportional to the deviation of $T_a$ from the control point. As we have already seen, the bellows assembly 27 is constructed so that the effective area of bellows 32 is equal to the sum of the effective area of bellows 36 and 31. Thus, as the pressure $P_4$ increases the pressure $P_2$ in the bellows 31 and 36 must increase the same amount and in the same manner to maintain the pressure difference necessary to keep the nozzle and baffle in juxtaposition. The rate, therefore, that the pressure $P_2$ increases due to the flow through the resistance is proportional to the amount $T_a$ is deviated.

The rate, therefore, at which $P_2$ is changing at any given instant, while the level $T_a$ is changing, is equal to the sum of (1) the rate of pressure change proportional to the rate of level change (the proportioning effect), and (2) the rate of pressure change proportional to the deviation of $T_a$ from the control point at that instant (the floating or integrating effect). Another way of expressing this action is to say that during a period of time in which we may consider that $T_a$ is changing and starting at time $t_0$ (zero time) the controller makes a quantity change in the pressure $P_2$ over a period of time ending at time $t_1$, which change is a function of the sum of the net quantity change in the level $T_a$ up to time $t_1$ and the integral from time $t_0$ to time $t_1$ of the deviation of the level $T_a$ from the control point.

By making assumptions well within the limits of practicability the following equation may be obtained to express the operation of the instrument thus connected up as a proportioning-plus-floating controller:

(27)
$$Q_s' = -\frac{(Q_s)\text{max.}}{K_2}\left[(T_a - T_{c_p})' + \frac{1}{R_4 V_4}(T_a - T_{c_p})\right]$$

The constants $R_4$ and $V_4$, as above described, are determined by the value of the resistances 59a, 60a, 61a and 62a when connected in series between the bellows 31 and 32 and the volume $V_4$ of the bellows 32 and such capacity tanks 196 as may be connected with the bellows 32. As will later be described, the reciprocal of the product of $R_4$ and $V_4$ determines the value of the "reset constant" heretofore referred to and appearing in Equation 20 as $r$. The constant $K_2$ determines the proportioning band $b$ of the controller which has already been referred to in Equation 20. In other words this constant $K_2$ determines the amount of change in level $T_a$ required to cause maximum change in the output pressure $P_2$ with bellows 36 and 31 connected with no restriction and acting alone. Since the effective area of the bellows 32 equals the combined effective areas of the bellows 31 and 36 this same value $K_2$ expresses the proportionality of the bellows 32. This constant $K_2$ in the present instrument is made adjustable, as will be described, with the result that the desired control effects may be obtained as described in connection with curves a, b and c of Figure 1H. If the instrument as thus connected up is considered as controller 10 of Figure 1A its output pressure $P_2$ would be connected through line 13 to the flow controller 14 which would maintain a flow $Q_5$ in the line 18 proportional to the pressure $P_2$ and the above described control results would be obtained as shown in Figure 1H.

Proportioning-plus-floating-plus-derivative control action

During the discussion of processes and the hypothetical control of processes we saw that by adding to the results of the two control efforts just described a further quantity correction proportioned to the rate of change of the level $T_a$ further improved control results may be obtained. In the present instrument the addition of the inner bellows 36 (and a resistance 68a leading to bellows 36) to the bellows 31 and 32 and their resistances makes it possible to superimpose on the control pressure $P_2$ an added quantitative change which is a function of the rate of level change $T_a$. This part of the mechanism and its control effect will be referred to hereinafter as the derivative mechanism and the derivative effect.

Returning to Figure 3, the valve 56 may be turned to close line 57 so that, although bellows 36 is still directly connected to the output pressure $P_2$, this pressure is now connected through restriction $R_3$ to bellows 31 (volume $V_3$) to establish a pressure $P_3$ in volume $V_3$, and it is this pressure $P_3$ that is now connected through resistance $R_4$ to establish the pressure $P_4$ in bellows 32. We note here that in practice, when the derivative mechanism is provided in the instrument, such a valve 56 would normally not be present, and although shown in the diagrammatic drawing of Figure 3 it is not shown in the formal drawings of the apparatus disclosed. In other words, it is impossible to remove the derivative effect entirely, even though desired, because the connection between the bellows 31 and 36 always has a minimum restriction, i. e. the capillary 68a, because experience has shown that when the action of the relay valve is rapid, unless the resistance 68a is actually reduced to or is above a critical value, a continuous undamped oscillation of $P_2$ may result. But if the resistance is above the critical minimum value (which may be determined empirically) the pressure $P_2$ either has an aperiodic or a rapidly damped oscillation following any disturbance with the practical result of a non-oscillatory balance. The permanent resistance 68a is provided to ensure a minimum amount of resistance when the instrument is adjusted for minimum derivative effect because, since bellows 36 and 31 are separated, it is impractical to try to obtain a condition of actual zero resistance between them. Thus in the controller even with the valve open there is some derivative effect present.

The connection between the three bellows may be made as follows: Leading from line 55b to a by-pass valve 69 similar to the by-pass valve 60 is a line 68 having the resistance 68a. When the valve 69 is closed the resistance 68a is connected in series with a resistance 69a which in turn is connected through line 59 to line 57 and bellows 31. When the valve 69 is opened the resistance 69a is short-circuited through line 69b and only resistance 68a is between the bellows 36 and 31. Line 58, leading to bellows 32, is connected as before to line 57 and bellows 31. Thus connected through one or more of the restrictions $R_3$ the output pressure $P_2$ of the relay valve 50 operates directly only on the bellows 36 because the pressure $P_2$ can effect the pressure $P_3$ in bellows 31 only through a restricted passage.

As before, the bellows 36 and 31 combine to hold the baffle and nozzle in juxtaposition. Now, however, when the level $T_a$ starts to change, because of the restriction between the bellows 36 and 31, the operating pressure is not immediately fully effective in the larger bellows 31 to cause the baffle to remain in juxtaposition with respect to the nozzle and consequently a larger change in operating pressure is required in the smaller bellows 36 in order for it to act immediately to hold the baffle and nozzle in juxtaposition, i. e., larger than if no restriction had been present between the bellows 36 and 31. Therefore, when the level $T_a$ now starts to and continues to change, the operating pressure acting through the smaller bellows 36 initially produces a larger corresponding rate of change in the operating pressure $P_2$ than would be the case were there no restriction present, and the faster the level changes the larger will be this initial increased rate of change of pressure $P_2$.

But because the operating area of bellows 36 is relatively small as compared with that of bellows 31, and because of the restriction between the two bellows, when the level starts to change the smaller bellows 36 must initially perform a major portion of the function of holding the baffle and nozzle in juxtaposition. Therefore, when the level $T_a$ first assumes a rate of change, the pressure $P_2$ assumes a proportionally larger initial rate of change. Since the resulting increase in pressure $P_2$ causes flow into bellows 31 through the restriction 68a the pressure $P_3$ acquires a rate of change and thus bellows 36 and 31 combine to hold the baffle and nozzle in juxtaposition with the result that if the rate of change of the level $T_a$ remains constant the initial rate of change of pressure $P_2$ materially reduces, and shortly both pressures $P_2$ and $P_3$ acquire the same rate of change. But because the only manner in which pressure $P_3$ is caused to change is by the establishing of a pressure difference ($P_2-P_3$) between the two pressures, a pressure difference is eventually established between $P_2$ and $P_3$ proportional to the rate of change of level $T_a$, and the greater the rate of change of level $T_a$ the greater the eventual pressure difference, and vice versa. Since the quantitative change imposed on the operating output pressure $P_2$ caused by the rate of change of the level $T_a$ is produced by the pressure difference ($P_2-P_3$) it becomes clear that a rate of change of the level $T_a$ now produces a quantitative change in the flow $Q_5$, which change is proportional to the value of the rate of change of the level $T_a$.

In Equation 25 the constants $R_3$ and $V_3$ appear and the values of these constants are determined respectively by the amount of the resistances 68a and 69a in series, and the value of the effective volume of the bellows 31 and any volume such as tank 196a that may be attached to bellows 31 as through an unrestricted connection 57a (Figure 3). These values will be referred to as $R_3$ and $V_3$, and the units of their dimensions and the effect of giving them different values will be discussed in a later part of the description.

The constants $K_n$ and $K_2$ appearing in Equation 25 respectively represent proportioning bands of the controller thus connected up. The constant $K_n$ is the proportioning band of the bellows 36, i. e. the amount of level change required to produce maximum change in the operating pressure $P_2$ with bellows 36 acting alone, i. e. independent of bellows 31. This depends on such factors as the spring characteristics of the system on which the bellows 36 operates, the area of the bellows, and the leverage between the movement of the bellows, and the resultant movement of the flapper. This latter value is made adjustable as will be pointed out. The operation of the bellows 36 and its relation to the proportioning band may be conveniently characterized by the ratio of the effective movement of the bellows to pressure change on the bellows. Thus, the smaller this ratio the narrower is the proportioning band. The constant $K_2$ represents the proportioning band of bellows 31, i. e. the amount of change in level $T_a$ required to produce maximum change in the operating pressure $P_2$ with the bellows 31 acting alone. The sum of the proportioning bands $K_2$ plus $K_n$ represents the amount of change in level $T_a$ that would be required to produce maximum change in the operating pressure $P_2$ with the bellows 31 and 36 acting alone and with no restriction between them. Bellows 31 may be considered as having a negative proportionality since it operates in a sense opposite to that of bellows 36 and 31. The above-mentioned sum $K_2+K_n$ is numerically equal to this negative proportionality of bellows 32. The values of these proportioning bands may have the unit dimension of inches, and, as will be described, mechanism is provided to adjust the values of these proportioning bands simultaneously so that the ratio $(K_2/K_n)$ always remains constant. The ratio is preferably made as large as is practical and in the present embodiment is about 9 and is determined by the ratio of the effective area of the bellows 31 to the bellows 36.

In the following description of the operation of the controller as a proportioning-plus-floating-plus-derivative controller, because of the difficulty of mentally following the various simultaneous reactions that take place in the apparatus thus connected we will not attempt to analyze in detail the operation of the separate parts of the instrument and the reactions they produce on the several pressures $P_2$, $P_3$ and $P_4$, in the way that the instrument operation was analyzed when the valve 56a was open so that pressures $P_2$ and $P_3$ were always equal. Instead, we will describe only generally the reactions of the changes in flow $Q_s$ caused by change of the level $T_a$ following an upset in the flow $Q_o$. Assuming that following a condition of steady state in which the level $T_a$ is at 80 inches, the flow $Q_o$ is 480 lbs./min. and the flow $Q_s$ is 160 lbs./min., the flow $Q_o$ is suddenly decreased to 320 lbs./min.

Following such a change in the flow $Q_o$ the level $T_a$ starts dropping, i. e. assumes a rate of change of $-5$ inches/min. as shown in curve $b$ of Figure 1K. As a result of the level $T_a$ having such a rate of change, the free end 26a of arc lever 26 is given a proportionate rate of change upwardly, and the pressure $P_2$ also assumes a rate of change proportional to the rate of change of the level $T_a$ to maintain the baffle and nozzle in juxtaposition by giving the end 26b of arc lever 26 a rate of change downwardly proportional to the rate at which the end 26a is rising.

As above described, a pressure difference $(P_2-P_3)$ builds up and eventually both pressures may acquire the same rate of change. Also the instantaneous value of $P_2$ is above that of $P_3$ and is above the coincident value of the pressure that would have been required to hold the lever 26 in proper position if the pressure $P_2$ and $P_3$ had been equal as is the case where there is no restriction between the two. The amount that the pressure is thus increased over the pressure that would have obtained had there been no restriction is proportional to the rate of change of level $T_a$ and, therefore, the flow $Q_s$ is given a quantitative change proportional to the rate of change of level $T_a$.

As a result of the excess corrections thus imposed on flow $Q_s$, and because the excess can be put on so rapidly, a greatly improved control action results over the best control action obtained by the proportioning-plus-floating controller alone. The behaviors of the level $T_a$ and the flow $Q_s$ following such a change when thus controlled with the instrument adjusted to give the best results have already been shown respectively in curves $a$ and $a^1$ of Figures 1K and 1L. Comparing these curves with curves $c$ and $c^1$ of Figures 1K and 1L which show the behavior of level $T_a$ and flow $Q_s$ following such a change when the level is controlled by a proportioning-plus-floating controller adjusted to give its best results (NOTE.—The proportioning band $b$ for both instruments is 10 inches), we see that the derivative effect does not allow the level $T_a$ to deviate as far from the control point of 80 inches as does the instrument without the derivative effect, and returns the level $T_a$ sooner to the control point and with negligible over-running or cycling.

The explanation of this improved control as lying in the proper application of excess corrections has already been discussed in connection with the curves of Figures 1K and 1L. But it is important to note that the controller of the present invention is so constructed as to be able to control the excess corrections to flow $Q_s$ in the manner described, and that this has been made possible by the discovery of the disturbing effects of discontinuity, lack of response, etc., and the reduction of such factors to a negligible value in the control instrument. In other words the present invention provides an instrument capable of very nearly performing in accordance with the hypothetical instrument whose operation is expressed by Equation 24. Further, the present instrument constructed to obey the law expressed by Equation 25 has the advantages of combining in a single instrument, simply adjustable, the three control effects — proportioning, floating, and derivative.

Considering the controller 10 of Figure 1A to be the proportioning-plus-floating-plus-derivative controller just described, its output pressure $P_2$ may be used automatically to set the control point of the flow controller 14 of Figure 1A and thus connected up flow $Q_s$ is made proportional to the pressure $P_2$ and is made a function of the value of level $T_a$, the rate of change of lever $T_a$, and the integral with respect to time of the deviation of level $T_a$ from the control point of 80 inches.

*Proportioning controller*

During the description of the instrument of Figure 2A it was pointed out that it would operate to make the change of output pressure $P_2$ proportional to the change of the level $T_a$ if the output pressure of the relay valve 50 went only to the bellows 36 and 31 connected with no resistance between them and with the bellows 32 disconnected from bellows 31. In practice such a controller is conveniently made by substituting (Figure 5) a single bellows for the combination of bellows 31 and 36 and substituting a single spring for the bellows 32 and its spring 35. The equation representing the instrument thus connected up as a proportioning controller may be written as follows by making assumptions well within the realm of practicability:

$$(28) \quad Q_s = .5Q_s \text{ max.} + \frac{Q_s \text{ max.}}{K_2}[T_{c_p} - T_a]$$

In this equation $K_2$ is the constant representing the value of the proportioning band and is determined by the effective area of the single bellows and, as will be described, by the adjustment of the proportioning link 37 along the arc lever 26. As before, the equation assumes that the flow $Q_s$ is proportional to the output pressure $P_2$ of the controller. Curves $b$ and $c$ of Figure 1D show the type of control action that can be obtained with such a controller.

Proportioning-plus-derivative controller

Under the discussion of the hypothetical proportioning controller, we saw that it had the disadvantage that a change in demand caused a change of control point $T_{c_p}$, and that as this change of control point was reduced by narrowing the proportioning band the level $T_a$ was caused to cycle across the balance point. We also saw that, when applied to the process described herein, the control action was improved by superimposing the derivative control action on the proportioning control action.

The present instrument may be connected up as a proportioning-plus-derivative controller (referring to Figure 3) by disconnecting bellows 32 from bellows 31, or in practice by removing bellows 32 and substituting only a spring 35. The equation setting forth the law of operation of such an instrument has already been given as Equation 26. The improved control results obtained for the process described herein by thus adding the derivative action to the proportioning action has already been shown by the comparison of curves $a$ and $c$ of Figure 1M which show, respectively, the behavior of the level $T_a$ when controlled by the proportioning-plus-derivative controller and by the proportioning controller alone. The curves $a^1$ and $c^1$ (Figure 1N) show the behaviors of the corresponding flows $Q_s$, and curve $a^1$ shows that a larger excess correction was made in a shorter period of time and was taken off more rapidly than the excess correction of curve $c^1$.

Reference has already been made to the constants $R_3$, $V_3$, $R_4$, $V_4$, $K_n$ and $K_2$ and to the fact that they may be adjusted and selected to determine the effects of the proportioning, the floating, and the derivative actions of the controller. We will now describe those parts of the instrument that determine the proportioning band $b$, the control-point-setting $T_{c_p}$, as well as those parts whose rapid and/or unobstructed action makes it possible for the instrument to operate with negligible discontinuity and with substantially immediate response, in accordance with the laws of the equations describing the operation of the controllers.

Proportioning band adjustment

As above pointed out provision is made in the present instrument for adjusting the proportioning bands $K_n$ and $K_2$ of the controller without changing the ratio established between the two proportioning bands. This same instrument is also used to adjust the proportioning band $b$ of the controller when connected up as a proportioning-plus-floating controller, and also when connected up as a proportioning or a proportioning-plus-derivative controller.

An essential part of this mechanism is the floating or proportioning arc lever 26 which, as shown in Figures 4 and 18, comprises two sections 100 and 101 adjustably secured together but normally operating as a single lever. The section 100 is supported on a shaft 102 pivoted at its ends and supported by jewel bearings 103, 104 mounted in opposite faces of a frame or rack 105 supported between opposing bellows 31 and 32. The bearing 104 is adjustable axially to permit the shaft to be introduced between the bearings and to provide a relatively frictionless pivotal support for shaft 102.

The section 101 is supported from section 100 on a stud 106 so that the two sections may be angularly adjusted with respect to each other about the stud. This adjustment is made by means of a micrometer screw 107 threaded through a block 108 mounted on the section 100 and extending through a block 109 mounted on an arm 110 extending from the section 101. The adjustment provides for bringing the center of the curvature of the top edge of the arc lever into coincidence with the connecting point between the link 37 (Figure 3) and the baffle lever 111, when the latter is holding the baffle in juxtaposition to the nozzle and when the bellows are in neutral position with equal pressures existing in all three bellows. With the bellows in said neutral position this adjustment may be accomplished by first moving the link 37 to its extreme left position 26a along the arc lever, holding the end 26a in such a position as to hold the baffle and nozzle in juxtaposition and then adjusting the micrometer screw 107 until the juxtaposition of the nozzle and baffle is not disturbed as the link 37 is swung to the right along the arc lever. This position of the arc lever will hereafter be referred to as its neutral position.

The far end of the lever section 100 is counterweighted so to balance the lever structure about the axis of shaft 102 that the arc lever 26 supports the slight downward moment of link 37 and its associated parts and does not hang on the connecting link 135, to be described.

The connecting or proportioning link 37 is made adjustable along the arc lever by looping the lower end of the link to receive the arc lever (as shown in Figure 17) and provide a free slidable connection therebetween, and it is this adjustment of the link 37 by which the proportioning bands of the instrument are changed. When the link, as shown in Figure 4, is moved to its extreme left position on arc lever 26, the movement imparted to baffle lever 111 by movement of the element-operated end 26a of arc lever 26 is maximum, and movement imparted to the baffle lever 111 by movement of the bellows assembly operated end 26b of arc lever 26 is minimum. When the link 37 occupies its extreme position at the right of the arc lever 26, the movement imparted to baffle lever 111 by movement of the element operated end 26a is minimum, and the movement imparted to baffle lever 111 by movement of the bellows assembly is maximum. When the link is in its extreme left position, the proportioning band is the smallest (approaching open and shut operation), i. e. a slight change in the level $T_a$ produces maximum change in the output pressure of the instrument. As the link is shifted to the right along the arc lever the amount of change in the level $T_a$ required to produce full maximum change in the operating pressure increases.

Referring to Figures 4 and 17, as the link is shifted along arc lever 26 it pivots about its upper connection with the baffle lever 111. As above described, when the arc lever 26 is positioned in its neutral position, which is the position of the arc lever when the level $T_a$ is at the control point and the process is in an equilibrium condition with equal pressures existing in the bellows 36, 31 and 32, shifting the link 37 along the arc lever to change the proportioning band causes no movement of the baffle and so no change of the operating pressure $P_2$ because the top edge of the arc lever which contacts link 37 is arced about the point of connection between the link 37 and the baffle lever 111. As we shall see this construction makes it possible to change the proportioning band without changing the control point $T_{c_p}$ of the instrument.

Referring to Figures 17 and 19, the link is manually adjusted along the arc lever by means of an arm 112 at its lower end loosely looped about link 37 and at its upper end secured to an index pointer 113 pivotally supported at its upper end on a stud shaft 114 mounted in a framework 115. The hub of the index pointer is threaded as indicated at 116 along an arc on its left side to mesh with a vertical worm screw 117 rotatably supported in the framework 115. A shaft 118 of the worm screw extends downwardly and is provided with a knurled operating head 119 (Figure 4). As the head 119 is manually rotated it adjusts the index pointer 113 and arm 112 which indicates on an index 120 the adjustment of the proportioning band.

When the proportioning band is adjusted, as above described, it adjusts proportionally and simultaneously the effects of the bellows 36, 32 and 31 in their reaction on the operating pressure $P_2$ because the bellows as arranged all react directly to position a single pivot point of the arc lever 26. From this construction it also follows that making this adjustment of the proportioning band makes no change between the relative effects of the bellows. In other words the areas of the bellows 31, 32 and 36, having been selected to determine the relationship of the proportioning bands, the adjustment of the link 37 along the arc lever does not change this relationship. With this construction also the proportioning band of the bellows 32 is maintained at all times equal to the sum of the proportioning bands $K_n$ plus $K_2$ of the bellows 36 and 31.

*Control point setting*

In the description, reference has repeatedly been made to the control point $T_{c_p}$ as the value at which the instrument, as a proportioning-plus-floating, or as a proportioning-plus-floating-plus-derivative controller, maintains the level $T_a$. This value is made conveniently adjustable without affecting other adjustments of the controller mechanism. Referring to Figure 2A, as we have already seen, the free end 26a of arc lever 26 is continuously positioned through linkage mechanisms 25 and 24 in accordance with the value of level $T_a$ as measured by element 21 so that a relationship exists between the position of the free end 22 of element 21 and the position of the end 26a of arc lever 26, and for every value of the level $T_a$ the end 26a assumes a corresponding position. It is this relationship that is made adjustable to change the control point setting $T_{c_p}$ of the instrument. That is, by changing the position that the end 26a of arc lever 26 occupies for a given position of the free end 22 of element 21, this relationship is changed and the control point may be changed. Thus for example, it might be that the instrument was so adjusted that when the element 21 in response to liquid level was measuring 80 inches of liquid level, it would be holding the end 26a of the arc lever 26 at its y—y position as shown in Figure 3. Or the instrument could be adjusted, for example, so that 75 inches of water level would cause the element 21 to position the end 26a in its y—y position. To accomplish this change in relationship two mechanisms are provided, as shown in Figure 3, one by means of a manual adjustment and the other by means of a remote setting adjustment. The manual adjustment is accomplished by swinging the bearing and shaft 133 of the reversing bell crank, generally indicated at 132. This is accomplished by swinging the plate 136 on which the bell crank 132 is pivoted, said plate 136 being pivoted on the axis y—y. The other remote control point setting adjustment is accomplished by swinging the axis 129 supporting a double ended arm 128. This shaft 129 is swung, as will be described, by a bellows assembly 203.

Referring to Figures 2A, 4 and 6, the element link 23 leading from the arm 22 of element 21 is connected to an arm 121 of a bell-crank formed by a shaft 122 and a double-ended arm 126. The shaft 122 is pivotally mounted in jewel bearings provided in spaced supporting brackets 123 and 124 (Figure 6) extending laterally from a main supporting post 125 projecting forwardly from the back of the instrument casing. Connected to one of the ends of the double-ended arm 126 (to the lower end, as shown) is a link 127, connected at its other end to the lower end of a second double-ended arm 128 on a shaft 129. The shaft 129 is mounted in jewel bearings supported in a laterally adjjustable yoke 130. The shafts 122 and 129 preferably lie in the same horizontal plane and the double-ended arms 126 and 128 between which link 127 extends are of the same length. Thus the motion imparted to arm 126 is exactly imparted to the arm 128. Also, since the two ends of the double-ended arms 128 are of the same length, the same motion is imparted to its upper arm to which is connected a control link 131, connected at its other end to the upper arm 132a of a reversing bell-crank generally indicated at 132 and mounted on a shaft 133 pivoted in jewel bearings between two supports of an adjustable bracket generally indicated at 134. The shafts 133 and 129 preferably lie in the same horizontal plane and the length of the crank arm 132a is the same as that of the corresponding arm 128 so that motion imparted to the arm 126 is now equally imparted to the arm 132a. To a second arm 132b of the crank 132 is connected a reversing link 135 connected at its lower end with the arc lever 26 at 26a. In this manner movement and position of the element 21 is transmitted to the end 26a of arc lever 26.

Whereas two adjustments are provided in the instrument, as shown in Figure 2A, to change the relationship between the element 21 and arc lever 26 to change the control point $T_{c_p}$, the instrument operating as controller 10 of Figure 1A would normally have only one adjustment which adjustment is manual and is accomplished by adjusting the position of the axis 133 of the reversing bell-crank 132. The controller 14, however, of Figure 1A would normally have both adjustments (as shown in Figure 2A), one the manual adjustment just mentioned and the other an automatic adjustment responsive proportionally to the output pressure $P_2$ of the controller 10. In other words the controller 10 is directly responsive to the level in the tank $A_a$, and the output pressure $P_2$ of this controller automatically sets the control point of the flow controller 14 which itself is responsive to a differential mechanism measuring the flow $Q_s$, which mechanism is of the usual type.

Referring to the manual adjustment, the axis 133 is swung about the axis $y$—$y$ by swinging a setting plate 136 about the axis $y$—$y$ (the plate 136 supports the bracket 134 in which the axis 133 is pivoted). As will be described, this setting plate 136 is thus adjustable by means of a knob 148 as shown in Figures 2a and 4. There are other features about the arrangement of the setting plate 136 and the associated mechanism which permit the proportioning band to be adjusted without changing the control point and which permit the output pressure of the instrument to be reversed without changing the control point, i. e., so that the output pressure is caused to increase as the level, for example, increases instead of decreasing. This mechanism will now be described. The axis of the setting plate 136 as just pointed out is coincident with the axis $y$—$y$ which passes through the connection point 26c between the arc lever 26 and the link 135 when the arc lever is in its above described neutral position with equal pressures existing in bellows 31, 32 and 36. Since the axis $y$—$y$ is fixed, this connection point 26c between the link 135 and the arc lever 26 is made adjustable to bring the two into coincidence by suitable means for adjusting the relationship between baffle lever 111 and the baffle supporting lever 48. In the present embodiment this adjustment is conveniently made at the factory by first swinging the proportioning link 37 to its left position on arc lever 26 with the arc lever in its neutral position and bending the supporting arm 48 until the link 37 holds the baffle and nozzle in juxtaposition with the point of connection 26c in coincidence with the axis $y$—$y$.

In addition to this latter adjustment, the length of the link 135 is so selected that its point of connection with arm 132b of the lever 132 is the same distance from the axis $y$—$y$ as is the shaft 133. With this construction movement of the reversing lever 132 and its shaft 133 about the axis $y$—$y$ to change the control point does not change the operating output pressure $P_2$ when the instrument is in equilibrium at the control point because all of the parts have the same radius as they pivot about axis $y$—$y$.

The bracket 134 is made adjustable about the axis $y$—$y$ by mounting it on a setting plate 136 pivotally supported at its lower end on a stud shaft 137 extending forwardly from a stationary plate 138 and coincident with the axis $y$—$y$. Extending rearwardly from the plate 136 is a sleeve 139 which receives the stud shaft 137 and is suitably held in place thereon by a clip 140. The setting plate is manually pivoted to adjust axis 133 by a pin 141 extending rearwardly from the upper end of the plate 136 into a vertical slot (Figure 14) in a gear segment 142 (Figures 12 and 13). The gear segment 142 is rotatably supported on a lug 143 tapped to received a stud screw 144. A spring washer 145 and a lock plate 146 (Figure 13) serve to provide friction between the gear segment 142 and its support. The friction plate 146 is prevented from rotating by a pin 147 extending forwardly through it from the base plate 138. The segment 142 is manually rotated by means of a knob 148 mounted on the end of a shaft 149 supported by the base plate 138 and carrying at its inner end a gear 150 meshing with the teeth of the gear segment 142. Thus rotated, the gear segment 142 drives the plate 136 through the pin 141 and adjusts the shaft 133 about the axis $y$—$y$.

The instrument as connected as shown in Figure 2A causes the operating pressure $P_2$ to increase when the level $T_a$ drops. But under some conditions of operation it may be desirable to have the operating pressure drop as the level $T_a$ drops, and vice versa. To this end the reversing lever 132 is provided with an arm 132c extending oppositely from arm 132b and provided with a hole 132d by which the reversing link 135 may be connected thereto. The arms 132b and 132c are symmetrically arranged with respect to arm 132a so that changing link 135 from arm 132b to arm 132c when the level $T_a$ is at the control point does not cause a change in the operating pressure $P_2$. But shifting the link to the arm 132c now causes end 26a of the arc lever 26 to move downwardly as the level $T_a$ lowers with the result that the pressure $P_2$ is reduced to cause the bellows to move the end 26b of the arc lever upwardly to hold the baffle and nozzle in juxtaposition.

Referring to Figures 2A and 6, the value at which the instrument is set to control by adjusting the axis 133 is indicated by an index pointer 156 extending from an inner U-shaft 157 supported between supporting arms 158 extending from the bracket support 125. The forward end of the shaft 157 carries the index pointer 156. The construction of the U-shaft and the manner in which it supports the index pointer is well known. To the inner end of the U-shaft 157 is secured an upwardly extending arm 159 connected by means of a link 160 to a tongue 161 extending forwardly from the control point setting plate 136. The control link 131 and the link 160 are parallel and the axes of the levers that they respectively connect are connected so that as the control point is shifted, the setting of the index pointer 156 always corresponds with the value of the level $T_a$, as indicated by a pen arm 223, when the level is at the control point.

The value of the level $T_a$ is indicated by the pen arm 223 (Figure 6) carrying a pen which moves over a rotating circular chart 233 (Figure 2). The pen arm is supported from a U-shaft 224 (Figure 6) pivoted on parallel spaced supports 225 and 226 mounted on the bracket 125. A suitable micrometer screw adjustment 223a of the usual type is provided to adjust the angular relationship between the U-shaft and the pen arm. In such a recording apparatus there is generally some friction between the pen proper and the chart on which it runs, and in the present instrument the disturbing effect that such friction would otherwise have on the operation of the controlling apparatus is eliminated by driving the U-shaft 224 and pen arm 223 from element 21 through a resilient connection. This permits the slightest movements of the linkage mechanisms 24 and 25 by element 21 even though the pen arm may be held stationary for such slight movements by the above mentioned friction. An arm 229 extends from the element-rotated jewel bearing supported shaft 122. The arm 229 and U-shaft 224 are connected by a resilient wire link 227 soldered to U-shaft 224 and extending rearwardly through a hole in the arm 229. Whereas the resilient link 227 drives the U-shaft and pen arm with sufficient accuracy to give the desired recording, it yields to permit the arc lever 26 to respond to the slightest movements of the element 21 even though such movements are too weak or small to overcome the friction between the pen and the chart or the friction of the U-shaft 224.

*Nozzle-baffle and relay valve construction*

Turning now to the air control system, the constructions of the nozzle-baffle and relay valves are such as to reduce to a minimum resistances and capacities other than those desired so that the interaction of the parts and of the air flows in the system may be carried out with negligible time function. Such operation is desirable to make the instrument obey the laws expressed bq Equations 25, 26, 27 and 28. The nozzle 40 (Figure 17) is osecured to framework 115 which also supports the baffle arbor 46 and the proportioning band adjusting mechanism. The nozzle outlet is a restricted passage (indicated by dotted lines) and is connected through a short open tube 41 to the right side of the relay valve (Figure 24) and taps a passageway 41a therein.

A restricted flow of air is supplied to passageway 41a and nozzle 40 through the following passages: Air under full pressure enters through port 54 and flows through the short horizontal passage 54a (in which the valve plunger 53 operates) to the vertical passage 54b extending downwardly to an enlarged portion of the passage 41a. Into this enlarged portion is threaded a sleeve 162 which has a tight fit as to 163 with a reduced portion of the passage 41a. The sleeve is provided with a restricted bore 42 connecting a side opening 42a and passage 54b with passage 41a. This restriction 42 between the entering air and the nozzle, and the restriction of the nozzle itself, is such that the air pressure back of the nozle is less than 1 lb./sq. in. when the nozzle is unsovered and with a supply pressure of 17 lbs./sq. in. as determined by the regulator 5 (Figure 3), but when the baffle is covering the nozzle by the action of its hair spring 47 the back pressure may build up to within a few pounds below the supply pressure of 17 lbs./sq. in. It is this back pressure that is varied by the baffle to operate the relay valve.

To accomplish this passage 41a opens directly into the valve plunger operating bellows 51 supported on a flanged internally threaded nut 164 which threads over a threaded coupling 165 having a passage 41b connecting passage 41a and the interior of the bellows 51. This connection is made tight by tightening nut 164 against gaskets 166. The short unrestricted connection between the nozzle and bellows provides for immediate and corresponding pressure changes in the bellows as the baffle varies the pressure back of the nozzle.

The valve stem 52 carrying the valve plunger 53 is secured to and carried by the free end of the bellows 51 by means of a plate 167 into which the stem is threaded and locked by a lock nut 168. A knurled portion 169 is provided on the stem to adjust it in the plate 167 so that the valve plunger 53 seats for the desired pressures in the bellows 51. The seats against which the valve plunger 53 operates are provided by a double flanged sleeve 170. The sleeve is placed between the two heads 173 and 173a of the valve plunger 53 by removing plunger head 173, placing the sleeve 170 over the valve plunger, and replacing the head 173 and suitably securing it in position. Sleeve 170 is held tight against a shoulder 171 in the passage 54a by a threaded sleeve 172 concentric with but spaced from the stem 52 to permit passage of air therebetween.

The various passages of the relay valve are bored and made large so as not to be restricted and are conveniently plugged where necessary by plugging screws as shown. The bellows 51 is preferably made with a relatively small spring characteristic so that it causes the valve plunger 53 to move to its extreme positions for a change of pressure of only about ¾ lb./sq. in. Further, by adjusting the stem 52, the range of the ¾ lb./sq. in. may be placed in the middle of the range of change of the back pressure caused by the baffle and nozzle. In the present embodiment the stem 52 is adjusted to place the bellows 51 under such initial tension that it does not start to move the plunger 53 from its extreme right position until the back pressure builds up to 3 lbs./sq. in. Then, as the back pressure builds up to 3¾ lbs./sq. in., it moves the plunger to its extreme left position. Thus, although the baffle is capable of causing a change in the back pressure of about 12 lbs./sq. in., only ¾ lb./sq. in. change is required to operate the bellows 51 to cause maximum change in the output pressure of the relay valve. This large unused excess back pressure insures sensitive and immediate changes in the output pressure of the relay valve in response to the slightest movements of the baffle.

*Bellows motor assembly*

Referring to Figure 5, the bellows assembly 27 is supported below the same frame 115 that supports the transfer switch valve 45, relay valve 50, proportioning band adjusting mechanism, etc., and is so constructed that the free ends of the bellows 36, 32 and 31 all operate on the common movable frame 33 which supports the shaft 102 on which the arc lever 26 is mounted. With this construction, therefore, there is no opportunity for adjustment between the ends of the bellows and so there is no opportunity for them to get out of adjustment.

Referring to Figure 5, the bellows assembly is supported between a lower plate 28 (secured to framework 115) and plate 29 secured to the plate 28 by the spacing rods 30. The lower bellows 32 are closed at the bottom by an end plate 186 in which a stud 187 is centrally mounted and provided with passage 58a connecting the line 58 with the interior of the bellows. The stud 187 is threaded at its outer end, as shown at 188, and extends through the spacer plate 29 and is locked into place by a suitable nut 189. The stud 187 also extends appreciably within the bellows and serves as a stop to limit the extent to which the bellows can be compressed. The upper end of the bellows 32 is closed by an end plate 190 which presses against the floating frame 33 and is aligned therewith by projections extending from the end plate into suitable holes in the frame 33.

The upper bellows 31 is provided with similar end plates 191, 192. The end plate 191 is secured to a coupling 193 which in turn threads into the frame 28. The coupling is provided with a passageway 57b which connects with the line 57. It is also centrally bored at 193a to connect with line 55b. To the lower end of the coupling 193 is secured the upper end of the bellows 36. The lower end of the bellows 36 is hermetically closed by the head of a screw 194 which threads through the end plate 192 of the bellows 31 and is hermetically sealed therewith. The lower end of the screw 194 extends through the plate 192 and into a suitable hole provided in the top of the frame 33 and serves to align the end plate 192 and the frame 33.

With the above construction the adjustment of the proportioning link 37 along the arc lever 26 equally adjusts the effects of the respective bellows on the movement of the baffle. This is advantageous for the reason, among others, that there is no opportunity for unfavorable adjustments between the operations of the various bellows due to the adjustment of the proportioning bands.

The capacity tanks 196 and 196a, heretofore referred to, are conveniently supported from a bracket 195 extending from the lower supporting plate 29. The tanks are secured to the bracket by a screw 198 passing through centrally aligned passages in the tanks formed by sleeves 197.

Jewel bearings

One of the bearings of each of the jewel bearing supports is made adjustable. Referring to Figure 16, a cross-section is shown of a type of adjustable jewel bearing that is satisfactory in the instances where such adjustable jewel bearings are needed. The bearing comprises a journal 199 adapted to be swedged in place in the supporting framework. The journal is threaded to receive a jewel bearing support 200 drilled out at its end to receive jewel 201 cupped to receive the pointed end of the shaft. Friction material, such as felt, or the like, is provided as shown at 202 to hold the bearing support 200 from getting out of adjustment. This type of locking means for the bearing support 200 has the advantage over a lock nut of not changing the adjustment after it is made, as frequently happens when lock nuts are being tightened.

Transfer-switch-valve

For convenience in putting the instrument in control of a process or for cutting it out of control without disturbing the then value of the output pressure $P_2$, the transfer switch valve 45 is provided between the output of the relay valve 50 and the motor assembly 27. Referring to the instrument of Figure 3, and considering it as operating as controller 10 of Figure 1A, this switch valve provides for the following connections:

1. "Automatic" control by which the output of the relay valve goes to the controller 14 (Figure 1A) through the line 13 and to the bellows assembly and associated resistances.
2. "Manual" control by which the output from the relay valve is cut off and the supply pressure in line 4 goes directly to the controller 14 (Figure 1A) and to the bellows assembly 27 and its associated resistances. Under this condition the pressure is adjusted by the reducing valve 5 in the supply line 4 (Figure 3).
3. "Service" control by which the relay valve is cut out and in addition the bellows assembly 27 is cut out. As under "manual" control, the pressure $P_2$ is varied by the reducing valve 5.

Referring to Figures 3 and 19, these connections are made possible by providing a stationary body 151 of the switch 45 with ports 4s, 13s, 55sb, 55sa, and 43s, respectively connected to the supply line 4, the output line 13, the bellows assembly line 55b, the relay valve output 55a and the relay valve input 43. Over these ports is a manually operable rotatable slide 152 provided with arcuate grooves 153 and 154, respectively, and mounted to turn on a stud shaft 155. A handle 174 is provided to turn the slide 152 (Figure 17). Referring to Figures 19, 20 and 21, the slide 152 is shown respectively in its three operating positions, Figure 19 showing the "automatic" position, Figure 20 showing the "manual" position, and Figure 21 showing the "service" position.

The three positions of the slide 152 are determined by means of a pin 175 cooperating with stops on a pivoted stop plate 180. This stop plate is secured by a stud screw 181 to the frame and is urged in a counterclockwise direction against the slide by a coil spring 182. The stop plate has an arcuate notch 183 whose top edge determines the slide position for "automatic," and whose bottom edge determines the position for "manual." By moving the stop plate clockwise against the action of the spring, the pin 175 may be moved into a second notch 184 in the stop plate. The edge of this notch determines the "service" position.

As shown in Figures 17 and 19, the relay valve is attached directly to the side of the switch valve body 151 and is held in place by suitable screws 185. When so held in place, the inlet and outlet ports of the relay valve meet with the corresponding ports of the switch body and unrestricted connections are provided.

Adjustments

The various features of the control instrument that directly affect its quality of operation having been described, attention is now called to a consideration of the effect of various possible adjustments on the operation of the instrument.

During the discussion of the hypothetical proportioning-plus-floating controller the reset or rsetorative effect of the controller was defined as an integrating effect, the characteristic of which could be expressed by a constant $r$. It was also pointed out that a critical value existed for this reset constant for the process described, and probably for processes in general having transfer lag, and that if the reset constant were increased above this critical value in an effort to cause the level to return toward the control point faster the controller caused the process to cycle undesirably, even though the proportioning band was increased. When the control instrument, as described in the present embodiment, is connected up with no restriction between the bellows 36 and 31, it behaves as a proportioning-plus-floating controller, and such a controller performs satisfactorily on many processes to give the desired control action. The reset constant $r$ of the instrument operating as a proportioning-plus-floating controller is determined by the values of the resistance $R_4$ and the volume $V_4$. A unit value of the resistance $R_4$ may be conveniently defined as the amount of resistance required to cause an increase in pressure in a unit volume $V$ of 1 lb./sq. in./min. for a pressure drop across the resistance of 1 lb./sq. in. and for a mean pressure in the tubing. Likewise, the unit volume V may be conveniently defined as that volume required to cause an increase of pressure therein of 1 lb./sq. in./min. by a pressure drop of 1 lb./sq. in. across a unit resistance. In the present embodiment, a unit resistance is considered as a length of capillary tubing one foot long and having a bore of approximately seventeen-thousandths inches, and on this basis a unit volume is that volume which would cause the pressure therein to increase at a rate of 1 lb./sq. in./min. for a pressure drop of 1 lb./sq. in. across one foot of tubing and with a mean pressure in the tubing of 8 lbs./sq. in.

Using the above assumption, if the resistance $R_4$ is made 37½ feet, i. e., 37½ feet of capillary tubing, as just defined, and the tank 196 is given the value of .2 of a unit volume, the value of the reset constant $r$ is the reciprocal of the product of $R_4$ and $V_4$ and equals 0.1335, which is the value of this constant of the controller of curves $a$ and $b$ of Figure 1H. The effect of increasing the value $r$ above its critical value has already been discussed in connection with curve $d$ of Figure 1H which shows the behavior of the level $T_a$ when the reset constant is increased to .4452 inverse minute. Such a change could be made in the instrument by decreasing the resistance $R_4$ to about 11 feet.

The effective proportioning band $b$ of the instrument thus connected up is adjustable, as above described, and appears as the constant $K_2$ in Equation 27. The proportioning band has already been defined in connection with the Equation 16 as the amount of change in level $T_a$ required to change the output pressure $P_2$ from its minimum value to its maximum value and accordingly the units of this band may be expressed in terms of inches in connection with the present process. In the proportioning-plus-floating controller the above described change in level $T_a$ which determines the effective proportioning band would have to be considered an instantaneous change. Referring to Figure 1H again, curves $a$, $b$ and $c$ show the behavior of the level $T_a$ when controlled by the present controller operating as a proportioning-plus-floating controller, having respectively effective proportioning bands of 73.85 inches, 40 inches and 10 inches, the other constants remaining the same. Referring to Figure 2A, these proportioning bands $K_2$ are obtained by setting the proportioning band indicating pointer 113 to the proper positions on its scale 120.

Referring now to the proportioning-plus-floating-plus-derivative controller and to Equation 25, the resistance $R_3$ and volume $V_3$ have the same unit dimensions as the resistance $R_4$ and the volume $V_4$. On this basis the instrument operating with the derivative effect, i. e. with the resistance $R_3$ between bellows 36 and 31, was adjusted to give the constants $R_3$, $V_3$, $R_4$ and $V_4$ the following values to obtain the control results as demonstrated by curves $a$ and $a^1$ of Figures 1K and 1L:

$R_3 = 10$ feet
$R_4 = 14$ feet
$V_3 = .2$ of a unit volume
$V_4 = .2$ of a unit volume The proportioning band pointer was so positioned on its scale as to give a value of 10 inches for the sum of the proportioning bands $(K_2+K_n)$ and because the effective areas of the bellows 31 and 36 are such that their ratio is 9, this adjustment gave the proportioning bands $K_2$ and $K_n$ the values of 9 inches and 1 inch, respectively.

The effect of changing the adjustment of the proportioning bands of this controller is shown by the behavior of the level in curves $b$ and $d$ of Figure 1K. The controller with the other constants the same was adjusted to give the sum of the proportioning bands $(K_2+K_n)$ a value of 15 inches for curve $b$, which gave the proportioning band $K_2$ a value of 13.5 and the proportioning band $K_n$ a value of 1.5 inches. For curve $d$ the proportioning band pointer was adjusted to give the sum of the proportioning bands $K_2$ and $K_n$ a value of 20 inches, which gave the proportioning band $K_2$ a value of 18 inches, and the proportioning band $K_n$ a value of 2 inches. The results of these adjustments show, in curves $b$ and $d$, that as the proportioning bands are thus increased larger initial deviation of the level $T_a$ is permitted and it is not returned to the control point as rapidly. Curves $b^1$ and $d^1$ of Figure 1L show that the amounts of the excess corrections are reduced and that they occur at later times as the proportioning bands are thus increased.

Advantages of adding the derivative effect to the proportioning-plus-floating controller have already been discussed in some detail. For convenience we will summarize several of them again: The derivative effect, in trying always to resist a rate of change in the condition (the level $T_a$), makes it possible to increase the effect of the restorative action of the controller over that which is obtained with the critical adjustment of the proportioning-plus-floating controller. In other words, the effectiveness of the restorative action may be made much faster without causing undesirable cycling. Because, however, of the resistance between the bellows 31 and 32 the restorative action of the controller can no longer be considered as having a value which can be expressed as a constant.

Another advantage is that when the controller is applied to a process such as that described herein the value of the proportioning band, which gives a critical damping of level for the proportioning-plus-floating controller, is materially reduced by adding the derivative effect. Whereas in the proportioning-plus-floating controller alone this critical proportioning band is 73.85 inches for the process described, when the derivative effect is added an effective proportioning band represented by 9 inches for $K_2$ and 1 inch for $K_n$ gave substantially aperiodic control results, as is shown by the fact that curve $a$ of Figure 1K shows that the level $T_a$ has practically no cycle after its return to the control point. As above pointed out, the advantage of making the restorative action that produces substantially non-cyclic control results as fast as possible is that the process, following a disturbance such as herein discussed, is returned more rapidly to negligible deviation.

In this connection the satisfactory combination of proportioning, floating and derivative effects in a single instrument requires rapid and accurate response to the level changes. Therefore, the motor parts of the instrument should be made positive in their actions and powerful with respect to the masses they operate. The present instrument provides for such a construction.

The construction of the present instrument also provides a highly accurate, narrow, pneumatically operated proportioning band $K_n$ so that the derivative effect which produces relatively large excess corrections keeps such corrections in accurate proportion to the significant rate of change of level.

The constants $K_2/K_n$, $R_3$ and $R_4$

In the instrument as described the resistance $R_4$ is placed between the bellows 31 and 32, and the resistance $R_3$ between the bellows 36 and 31. With this arrangement of the resistances and their associated volumes or capacities it is not possible to obtain control effects opposite to those desired by changing the relative values of $R_3$ and $R_4$ as would be possible if the resistance $R_4$ were placed between the bellows 36 and the bellows 32. This is advantageous because it prevents such accidental adjustment of the instrument in the field by the selection of improper relative values of the resistances.

Further, with the controller connected up as described, the narrow proportioning band $K_n$ is accurately adjustable with the controller in use to obtain the desired control results without changing the ratio of $K_2/K_n$. Increasing value $K_n$ by adjusting the proportioning band indicator 113 to the right of the scale reduces the amount of correction caused by the derivative effect but does not change the manner in which the derivative action is applied. Thus, if it appears that with the controller in operation controlling a process the derivative corrections are too radical due to small changes of level which have no real significance, they may be conveniently reduced by increasing the proportioning band. Increasing $K_n$ in this manner, however, also changes in the same proportion the amount of correction made by the proportioning effect and the floating effect, so that by this adjustment the proportioning, derivative and floating effects are not caused to get out of a desired relation with respect to each other.

The value of the ratio $K_2/K_n$ affects the amount of derivative effect and the manner in which the derivative correction is applied. The design of the present controller permits a large value of $K_2/K_n$ without sacrificing accuracy of the small proportioning band $K_n$.

The effective reset value of the controller is dominated by adjusting the resistance $R_4$ and, therefore, this resistance is made readily adjustable in steps, the values of which steps are selected in accordance with the particular process on which the controller is applied.

Other features

As above described, the controller 10 of Figure 1A is responsive to the level $T_a$ and its output pressure $P_2$ proportionally varies the control point of the flow controller 14. Controller 14 is responsive to the flow $Q_s$ and its output pressure $P_2$ operates the valve motor 19 to maintain the flow $Q_s$ at the value demanded by the pressure $P_2$ coming from the controller 10. Considering the present instrument (Figure 2A) as operating as controller 14 element 21 as replaced by a pressure differential responsive mechanism, the control point of the controller is automtically adjusted by the automatic control point setting mechanism before referred to as determining the position of the shaft 129 and its adjustable fulcrum support 130. Referring to Figures 2A, 6, 7, 10 and 11, this apparatus comprises a bellows assembly generally indicated at 203 arranged to flex a leaf spring 204 on which the yoke 130 is supported. The bellows assembly 203 (Figure 6) comprises a casing 205 enclosing a bellows 206 having a free end 207 on which is mounted a rod 208 adapted to push against the leaf spring 204. This assembly is mounted on a vertical plate 209 provided with a hole through which the rod 208 extends. The space between the casing 205 and the bellows 206 is sealed and is connected through a line 210 with the output pressure $P_2$ of the primary controller 10 so that, as the pressure $P_2$ varies, the bellows moves the leaf spring amounts proportioned to the changes in the pressure $P_2$. Movement of the yoke 130 and its shaft 129 has the same effect on the control point as does movement of the shaft 133 by the manual adjustment of the setting plate 136. Thus, referring to Figure 3, if the element 21 is replaced in the controller 14 (as it would be in practice) by an element responsive to the differential pressure across the orifice 17, and with the controller 10 adjusted as described, an increase in the operating pressure $P_2$ from the controller 10 will set up the control point of the controller 14. This will cause the controller 14 to control the flow $Q_s$ at a higher value.

The amount of change of the control point produced by a unit change in the operating output pressure $P_2$ from the controller 10 by the bellows 206 is made adjustable in the following manner: Referring to Figures 7, 10 and 11, an adjustable fulcrum 211 is provided for spring 204 to pivot about. As the fulcrum is raised, the amount of movement of the leaf spring for a unit change of pressure on the bellows 206 is reduced, and vice versa. The fulcrum 211 is manually adjustable by means of a gear 212 meshing with a rack 213 on the fulcrum block 211. The gear is manually operated by means of an extension 214 notched at 215 to receive a screw driver. A pointer 216 extending from the fulcrum block indicates on a scale 217 the adjustment of the fulcrum.

With this construction the control point is automatically adjusted without frictional resistance because the yoke is mounted on the leaf spring and the rod operated by the bellows 206 passes through no bearings.

The automatic control point setting mechanism may be removed entirely from the instrument when it is operating as the primary controller 10 where it is not needed by removing the assembly 203 and its associatd parts. When they are removed a control link is directly connected between the upper end of the lever arm 126 and the upper arm 132a of of the reversing bell-crank 132. This substitution does not change the operation other than to remove the remote control point setting mechanism.

Referring to Figures 6, 8 and 9, a bracket is shown for the supporting plates for the U-shafts. This bracket 125 is provided with spaced aligned notches 218 and aligned holes 219. Each supporting plate is provided at its supported end with ears 220 adapted to enter the notches 218. Each supporting plate is also provided with a base 221 threaded to receive a screw 222 passing through hole 219 to secure the base and supporting plate to the bracket 125. With this construction the supporting plates may be spaced as desired to take care of different lengths of U-shafts and different numbers of U-shafts and different spacings of the U-shafts from the back of the case.

I claim:

1. In control apparatus for establishing a pneumatic control pressure, in combination, responsive means freely movable without opposing force in continuous and proportional response to the valve of a variable, valve means for controlling supply of air to establish said control pressure, first motor means having a relatively small effective operating area immediately and proportionally movable in response to change of said control pressure and freely movable differential lever mechanism for interconnecting said first motor means, said responsive means, and said valve means, whereby said first motor means in conjunction with said responsive means operates said valve means in accordance with a first proportioning band, second motor means having a relatively larger effective operating area proportionally responsive in the same sense through resistance and capacity to said control pressure, said freely movable differential mechanism also interconnecting said second motor means, said responsive means, and said valve means, whereby said second motor means in conjunction with said responsive means operates said valve means in accordance with a second proportioning band whereby said valve means is immediately and continuously responsive to the combined action of said responsive means and said first and second motor means to change quantitively said control pressure in proportion to changes in the value of said variable and to the rate of change of the value of said variable.

2. In control apparatus for establishing a pneumatic control pressure, in combination, responsive means continuously and proportionally responsive to the value of a variable condition, valve means for controlling the supply of air to establish said control pressure, first motor means immediately and proportionally responsive to said control pressure and in conjunction with said responsive means operating said valve means in accordance with a first proportioning band, second motor means proportionally responsive through resistance and capacity to said control pressure and in conjunction with said responsive means operating said valve means in accordance with a second proportioning band, third motor means proportionally and continuously responsive through resistance and capacity to the control pressure and in conjunction with said responsive means operating said valve means in accordance with a third proportioning band, one of said motor means acting in opposite sense to the other two, and said valve means being thus made immediately and continuously responsive to the combined action of said responsive means and said first, second and third motor means to change quantitively said control pressure in proportion to changes in the value of said variable, the rate of change of said variable and the integral with respect to time of the deviation of the value of said variable from an equilibrium value within a predetermined band of variation of the value of said variable determined by the relationships of said proportioning bands.

3. In control apparatus for establishing a pneumatic control pressure, in combination, responsive means continuously and proportionally responsive to the value of a variable condition, valve means for controlling the supply of air to establish said control pressure, first motor means immediately and proportionally responsive to said control pressure and in conjunction with said responsive means operating said valve means in accordance with a first proportioning band, second motor means proportionally responsive through resistance and capacity to said control pressure and in conjunction with said responsive means operating said valve means in accordance with a second proportioning band, third motor means proportionally and continuously responsive through resistance and capacity to the control pressure and in conjunction with said responsive means operating said valve means in accordance with a third proportioning band, one of said motor means acting in opposite sense to the other two, said valve means being thus made immediately and continuously responsive to the combined action of said responsive means and said first, second and third motor means to change quantitively said control pressure in proportion to changes in the value of said variable, the rate of change of said variable and the integral with respect to time of the deviation of the value of said variable from an equilibrium value within a predetermined band of variation of the value of said variable determined by the relationships of said proportioning bands, and means for adjusting the values of the proportioning bands without changing the ratios thereof.

4. In control apparatus for establishing a pneumatic control pressure, in combination, responsive means continuously and proportionally responsive to the value of a variable condition, valve means for controlling the supply of air to establish said control pressure, first motor means immediately and proportionally responsive to said control pressure and in conjunction with said responsive means operating said valve means in accordance with a first proportioning band, second motor means proportionally responsive through resistance and capacity to said control pressure and in conjunction with said responsive means operating said valve means in accordance with a second proportioning band, third motor means proportionally and continuously responsive through said first resistance and capacity and through a second resistance and capacity to the control pressure and in conjunction with said responsive means operating said valve means in accordance with a third proportioning band, one of said motor means acting in opposite sense to the other two, and said valve means being thus made immediately and continuously responsive to the combined action of said responsive means and said first, second and third motor means to change quantitively said control pressure in proportion to changes in the value of said variable, the rate of change of said variable and the integral with respect to time of the deviation of the value of said variable from an equilibrium value within a predetermined band of variation of the value of said variable determined by the relationships of said proportioning bands.

5. In control apparatus for establishing a pneumatic control pressure, in combination, responsive means continuously and proportionally responsive to the value of a variable condition, valve means for controlling the supply of air to establish said control pressure, first motor means immediately and proportionally responsive to said control pressure and in conjunction with said responsive means operating said valve means in accordance with a first proportioning band, second motor means proportionally responsive through resistance and capacity to said control pressure and in conjunction with said responsive means operating said valve means in accordance with a second proportioning band, third motor means proportionally responsive through resistance and capacity to the control pressure and in conjunction with said responsive means operating said valve means in accordance with a third proportioning band, one of said motor means acting in opposite sense to the other two, the movable parts of said motor means being mechanically connected and all acting on said valve means from a single movable point whereby said valve means is made immediately and continuously responsive to the combined action of said responsive mens and said first, second and third motor means to change quantitively said control pressure in proportion to changes in the value of said variable, the rate of change of said variable and the integral with respect to time of the deviation of the value of said variable from an equilibrium value within a predetermined band of variation of the value of said variable determined by the relationships of said porportioning bands.

6. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through resistance and capacity to the control pressure and in conjunction with said responsive means operating said valve means in accordance with a second proportioning band, third motor means proportionally and continuously responsive in opposite sense through resistance and capacity to said control pressure and in conjunction with said responsive means operating said valve means in accordance with a third proportioning band, whereby said valve means is immediately and continuously responsive to the combined action of said responsive means and said first, second and third motor means to cause said control pressure to change quantitively in proportion to changes in the value of said variable, to the rate of change of the value of said variable, and to the integral with respect to time of the deviation of the value of said variable from an equilibrium value within a predetermined band of variation of said variable determined by the relationships of said proportioning bands.

7. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through resistance and capacity to the control pressure and in conjunction with said responsive means operating said valve means in accordance with a second proportioning band, third motor means proportionally responsive in opposite sense through resistance and capacity to said control pressure and in conjunction with said responsive means operating said valve means in accordance with a third proportioning band whereby said valve means is immediately and continuously responsive to the combined action of said responsive means and said first, second and third motor means to cause said control pressure to change quantitively in proportion to changes in the value of said variable, to the rate of change of the value of said variable and to the integral with respect to time of the deviation of the value of said variable from an equilibrium value within a predetermined band of variation of said variable determined by the relationships of said proportioning bands, and means for adjusting the values of said first and second proportioning bands while maintaining the ratio thereof constant.

8. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through resistance and capacity to the control pressure and in conjunction with said responsive means operating said valve means in accordance with a second proportioning band, third motor means proportionally and continuously responsive in opposite sense through said first resistance and capacity and through a second resistance and capacity to said control pressure and in conjunction with said responsive means operating said valve means in accordance with a third proportioning band, whereby said valve means is immediately and continuously responsive to the combined action of said responsive means and said first, second and third motor means to cause said control pressure to change quantitively in proportion to changes in the value of said variable, to the rate of change of the value of said variable and to the integral with respect to time of the deviation of the value of said variable from an equilibrium value within a predetermined band of variation of said variable determined by the relationships of said proportioning bands.

9. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through a resistance and capacity to the control pressure and in conjunction with said responsive means operating said valve means in accordance with a second proportioning band, third motor means proportionally responsive in opposite sense through a resistance and capacity to the control pressure and in conjunction with said responsive means operating said valve means in accordance with a proportioning band equal to the sum of the first and second proportioning bands and said valve means being immediately and continuously responsive to the combined action of said responsive means and said first, second and third motor means to change said control pressure quantitively in proportion to changes in the value of the variable, the rate of change of the value of said variable and the integral with respect to time of the deviation of the value of said variable from a predetermined value.

10. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through a resistance and capacity to the control pressure and in conjunction with said responsive means operating said valve means in accordance with a second proportioning band, third motor means proportionally responsive in opposite sense through a resistance and capacity to the control pressure and in conjunction with said responsive means operating said valve means in accordance with a proportioning band equal to the sum of the first and second proportioning bands, said valve means being immediately and continuously responsive to the combined action of said responsive means and said first, second and third motor means to change said control pressure quantitively in proportion to changes in the value of the variable, the rate of change of the value of said variable and the integral with respect to time of the deviation of the value of said variable from a predetermined value, and means for adjusting the value of the first proportioning band.

11. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through a resistance and capacity to the control pressure and in conjunction with said responsive means operating said valve means in accordance with a second proportioning band, third motor means proportionally responsive in opposite sense through resistance and capacity to the control pressure and in conjunction with said responsive means operating said valve means in accordance with a proportioning band equal to the sum of the first and second proportioning bands, said valve means being immediately and continuously responsive to the combined action of said responsive means and said first, second and third motor means to change said control pressure quantitively in proportion to changes in the value of the variable, the rate of change of the value of said variable and the integral with respect to time of the deviation of the value of said variable from a predetermined value, and means for adjusting the value of the first proportioning band and the second proportioning band while maintaining this ratio constant.

12. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through a resistance and capacity to the control pressure and in conjunction with said responsive means operating said valve means in accordance with a second proportioning band, third motor means proportionally responsive in opposite sense through resistance and capacity to the control pressure and in conjunction with said responsive means operating said valve means in accordance with a proportioning band equal to the sum of the first and second proportioning bands, said valve means being immediately and continuously responsive to the combined action of said responsive means and said first, second and third motor means to change said control pressure quantitively in proportion to changes in the value of the variable, the rate of change of the value of said variable and the integral with respect to time of the deviation of the value of said variable from a predetermined value, and means for adjusting the value of the first proportioning band and the second proportioning band while maintaining this ratio constant and maintaining the value of the third proportioning band equal to the sum of the first two proportioning bands.

13. In control apparatus for establishing a control force, in combination, responsive means continuously and proportionally responsive to the value of a variable, valve means for controlling application of energy to establish said control force, first control means immediately and proportionally responsive to the control force and in conjunction with said responsive means operating said valve means in accordance with a first proportioning band, second control means proportionally responsive in the same sense through a first resistance and capacity to said control force and in conjunction with said responsive means operating said valve means in accordance with a second proportioning band, third control means proportionally responsive in opposite sense through said first resistance and capacity and through a second resistance and capacity to said control force and in conjunction with said responsive means operating said valve means in accordance with a third proportioning band equal to the sum of the said first and second proportioning bands, said valve means being immediately and continuously responsive to the combined action of said responsive means, and said first, second and third control means to change quantitively said control force in proportion to change of the value of said variable, the rate of change of the value of said variable and to the integral with respect to time of the deviation of the value of said variable from a predetermined value.

14. In control apparatus for establishing a control force, in combination, responsive means continuously and proportionally responsive to the value of a variable, valve means for controlling application of energy to establish said control force, first control means immediately and proportionally responsive to the control force and in conjunction with said responsive means operating said valve means in accordance with a first proportioning band, second control means proportionally responsive in the same sense through a first resistance and capacity to said control force and in conjunction with said responsive means operating said valve means in accordance with a second proportioning band, third control means proportionally responsive in opposite sense through said first resistance and capacity and through a second resistance and capacity to said control force and in conjunction with said responsive means operating said valve means in accordance with a third proportioning band equal to the sum of the said first and second proportioning bands, said valve means being immediately and continuously responsive to the combined action of said responsive means, and said first, second and third control means to change quantitively said control force in proportion to change of the value of said variable, the rate of change of the value of said variable and to the integral with respect to time of the deviation of the value of said variable from a predetermined value, and means for changing the value of the proportioning bands without changing the ratio of the first and second proportioning band.

15. In control apparatus for establishing a pneumatic control pressure, in combination, responsive means freely movable without opposing force in continuous and proportional response to the value of a variable, valve means controlling a supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows being spring-loaded and having a common fixed end and having a common movable end, freely movable differential lever mechanism interconnecting said common movable end, said responsive means, and said valve means to permit said responsive means and said movable end to operate continuously said valve means in opposite sense to establish a pneumatic feed-back action to change quantitively said output pressure in proportion to changes in the value of, and the rate of change of, the value of the variable.

16. In control apparatus for establishing a pneumatic control pressure, in combination, responsive means continuously and proportionally responsive to the value of a variable, valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows being spring-loaded and having a common fixed end and having a common movable end, and adjustable means interconnecting said valve means with said common movable end and said responsive means to establish a pneumatic feed-back action to change quantitively said output pressure in proportion to changes in the value of, and the rate of change of, the value of the variable, said adjustable means serving to adjust the proportionalities of the respective actions of the movable end and the responsive means on said valve means.

17. In control apparatus for establishing a pneumatic control pressure, in combination, responsive means continuously and proportionally responsive to the value of a variable, valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows being spring-loaded and having a common fixed end and having a common movable end, a third spring-loaded bellows connected through resistance and capacity with the output pressure of said valve means and having a fixed end and having a movable end opposing said common movable end of said inner and outer bellows, the effective area of said third bellows being equal to the sum of the effective areas of said inner and outer bellows, and said movable ends acting with said responsive means to operate continuously said valve means in a pneumatic feed-back action to change quantitively said output pressure in proportion to changes in the value of the variable, the rate of change of the value of the variable and the integral with respect to time of the deviation of the value of the variable from a neutral value determined by the position of said movable ends with equal pressures in the bellows.

18. In control apparatus for establishing a pneumatic control pressure, in combination, responsive means continuously and proportionally responsive to the value of a variable, valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows being spring-loaded and having a common fixed end and having a common movable end, a third spring-loaded bellows connected through said resistance and capacity and through a second resistance and capacity with the output pressure of said valve means and having a fixed end and having a movable end opposing said common movable end of said inner and outer bellows, the effective area of said third bellows being equal to the sum of the effective areas of said inner and outer bellows, and said movable ends acting with said responsive means to operate continuously said valve means in a pneumatic feed-back action to change quantitively said output pressure in proportion to changes in the value of the variable, the rate of change of the value of the variable and the integral with respect to time of the deviation of the value of the variable from a neutral value determined by the position of said movable ends with equal pressures in the bellows.

19. In control apparatus for establishing a pneumatic control pressure, in combination, responsive means continuously and proportionally responsive to the value of a variable, valve means controlling the supply of air, the output pressure of which is said control pressure, a spring-loaded bellows connected with the output pressure of said valve means and having a fixed end and having a movable end, a frame supported by said movable end, a lever pivotally supported at one end by said frame and pivotally supported at another point by said responsive means, and a proportioning link extending from said lever to operate said valve means by the combined action of said responsive means and said bellows to establish a proportioning pneumatic feed-back action such that a change in the position of said responsive means produces a proportionate change in said control pressure, and means for shifting said link along said lever to change the value of the proportioning action, said means being free of mechanical connection with said link except when acting to shift the link.

20. In control apparatus for establishing a pneumatic control pressure, in combination, responsive means continuously and proportionally responsive to the value of a variable, valve means controlling the supply of air, the output pressure of which is said control pressure, a spring-loaded bellows connected with the output pressure of said valve means and having a fixed end and having a movable end, an arc lever pivotally supported at one end by said movable end and pivotally supported at its other end by said responsive means, and a proportioning link effectively pivoted at one end about an axis, its other end extending from said arc lever intermediate its ends, the pivoted end of said proportioning link operating said valve means by the combined action of said responsive means and said bellows to establish a proportioning pneumatic feed-back action such that a change in the position of said responsive means produces a proportionate change in said control pressure, said link being adjustable along said arc lever to change the value of the proportioning action, and said arc lever being so curved that when in a predetermined neutral position the center of its curve coincides with the said axis of said proportioning link.

21. In control apparatus for establishing a pneumatic control pressure, in combination, responsive means freely movable without opposing force in continuous and proportional response to the value of a variable, valve means for controlling supply of air to establish said control pressure, first motor means immediately and proportionally responsive to the control pressure and through direct mechanical connection with said responsive means operating said valve means in accordance with a first proportioning band, second motor means proportionally responsive in the same sense through resistance and capacity elements to said control pressure and through direct mechanical connection with said responsive means operating said valve means in accordance with a second proportioning band, whereby said valve means is immediately and continuously responsive to the combined action of said responsive means and said first and second motor means to change quantitively said control pressure in proportion to changes in the value of said variable and to the rate of change of the value of said variable, said resistance and capacity elements having minimum unadjustable values such that their combined effect has at least a minimum value necessary to obtain damped oscillation or aperiodic operation of the two motor means per se, and one of said elements being adjustable to raise the combined effect above said minimum value, thereby to change the effect of the rate of change of the value of said variable on said control pressure.

22. In control apparatus for establishing a pneumatic control pressure, in combination, responsive means continuously and proportionally responsive to the value of a variable, valve means for controlling suply of air to establish said control pressure, first motor means immediately and proportionally responsive to the control pressure and in conjunction with said responsive means operating said valve means in accordance with a first proportioning band, second motor means proportionally responsive in opposite sense through resistance and capacity to said control pressure and in conjunction with said responsive means operating said valve means in accordance with a second proportioning band, whereby said valve means is immediately and continuously responsive to the combined action of said responsive means and said first and second motor means to change quantitively said control pressure in proportion to changes in the value of said variable and to the integral with respect to time of the deviation of the value of said variable from a predetermined value, and said resistance and capacity having such unadjustable minimum values that their product has a minimum value greater than a critical value determined by the effective time constant of the process to which the control apparatus is applied, and making said resistance adjustable above said minimum value to adjust the effective integrating action of the control apparatus.

23. The method of establishing a control pressure in response to a variable comprising the steps of utilizing a pneumatic feed-back circuit to maintain said control pressure, making said feed-back circuit continuously responsive to the variable through a first proportioning action having a relatively narrow proportioning band, making the feed-back circuit continuously responsive in the same sense to the variable through a second proportioning action having a relatively wide proportioning band and affected by the first proportioning action through a leg, and making the feed-back circuit continuously responsive in the opposite sense to the variable through a third proportioning action affected by the second proportioning action through a lag and in accordance with a third proportioning band equal to the sum of the first and second proportioning bands, and adjusting the value of the first proportioning band to change the effect of the variable on the control pressure without changing the ratio between the first and second proportioning bands and without changing the relationship between the third proportioning band and the sum of the first and second proportioning bands.

24. In control apparatus for establishing a pneumatic control pressure, in combination, responsive means continuously and proportionally responsive to the value of a variable, valve means including a nozzle-baffle pilot valve and a relay valve continuously responsive to movements of said baffle when said nozzle and baffle are held in juxtaposition to control with negligible time function the supply and waste of air to establish said control pressure, a spring-loaded bellows having a fixed end and a movable end, a lever pivotally supported at one end by said movable end and pivotally supported at another point by said responsive means, and a proportioning link connected at one end to said baffle and at its other end to said lever, said bellows being connected with and responsive to the output pressure of said relay valve and acting through said lever and proportioning link to maintain said baffle juxtaposed to said nozzle and thereby to change said control pressure in proportion to changes in position of said lever caused by said responsive means.

25. In control apparatus for establishing a pneumatic control pressure, in combination, responsive means continuously and proportionally responsive to the value of a variable, valve means including a nozzle-baffle pilot valve and a relay valve continuously responsive to movements of said baffle when said baffle and nozzle are held in juxtaposition to control with negligible time function the supply and waste of air to establish said control pressure, a spring-loaded bellows having a fixed end and a movable end, a lever pivotally supported at one end by the movable end of said bellows and pivotally supported at its other end by said responsive means, and a proportioning link connected at one end to said baffle and at its other end to said lever intermediate the ends thereof, said bellows being connected with and responsive to the output pressure of said relay valve and acting through said lever and proportioning link to maintain said baffle juxtaposed to said nozzle and thereby to change said control pressure in proportion to changes in position of said lever caused by said responsive means, said lever being so arced that when in a predetermined position the center of said arc coincides with the connection between the proportioning link and baffle, and said proportioning link being slidable along said acred lever to change the proportioning action.

26. In control apparatus for establishing a pneumatic control pressure, in combination, responsive means continuously and proportionally responsive to the value of a variable, valve means including a nozzle-baffle pilot valve and a relay valve continuously responsive to movements of said baffle when said baffle and nozzle are held in juxtaposition to control with negligible time function the supply and waste of air to establish said control pressure, a spring-loaded bellows having a fixed end and a movable end, a second spring-loaded bellows having a fixed end and a movable end, a lever pivotally supported at one end by said movable ends and pivotally supported at another point by said responsive means, and a proportioning link connected at one end to said baffle and at its other end to said lever, said second bellows being connected through a resistance and capacity with the output pressure of said relay valve, said first bellows being directly connected to the output pressure and acting through said lever and link to keep the baffle and nozzle in juxtaposition to change the output pressure in proportion to change of position of the lever by said responsive means, and at a rate proportional to the pressure difference existing between said two bellows.

27. In control apparatus for establishing a pneumatic control pressure, in combination, responsive means continuously and proportionally responsive to the value of a variable, valve means including a nozzle-baffle pilot valve and a relay valve continuously responsive to movements of said baffle when said baffle and nozzle are held in juxtaposition to control with negligible time function the supply and waste of air to establish said control pressure, a spring-loaded bellows having a fixed end and a movable end, a second spring-loaded bellows having a fixed end and a movable end, a lever pivotally supported at one end by said movable ends and pivotally supported at its other end by said responsive means, and a proportioning link connected at one end to said baffle and at its other end to said lever intermediate the ends thereof, said second bellows being connected through a resistance and capacity with the output pressure of said relay valve, said first bellows being directly connected to the output pressure and acting through said lever and link to keep the baffle and nozzle in juxtaposition to change the output pressure in proportion to change of position of the lever by said responsive means, and at a rate proportional to the pressure difference existing between said two bellows, and said link being adjustable along said lever to change the proportioning action of said first and second bellows.

28. In apparatus for establishing a pneumatic control pressure, in combination, responsive means proportionally and continuously responsive to the value of a variable, valve means including a pilot baffle-nozzle valve and a relay valve responsive to movement of the baffle when held juxtaposed to said nozzle, a reversing lever pivoted about an axis and provided with oppositely disposed symmetrically arranged arms and movable by said responsive means, a floating arc lever, a downwardly extending connecting link connecting one of the arms of said reversing lever with one end of said floating arc lever at a point normally symmetrically arranged with respect to said oppositely disposed arms, a bellows assembly connected with and responsive to the output of said relay valve and pivotally supporting the other end of said floating lever, and a proportioning link extending upwardly from said floating arc lever intermediate its ends to operate said baffle, said bellows assembly operating to maintain said baffle juxtaposed to said nozzle to cause the output pressure of said relay valve to change in proportion to changes of the position of the floating arc lever by said connecting link as it is positioned by said responsive means, and said connecting link being shiftable from one of said opposing arms of said reversing lever to the other to change the sense of the control action.

29. In control apparatus for establishing a control force, in combination, responsive means continuously and proportionally responsive to the value of a variable, valve means for controlling application of energy to establish said control force, first control means immediately and proportionally responsive to the control force and in conjunction with said responsive means operating said valve means in accordance with a first proportioning band, second control means proportionally responsive in the same sense through a first resistance and capacity to said control force and in conjunction with said responsive means operating said valve means in accordance with a second proportioning band, third control means continuously responsive in opposite sense through resistance and capacity to said control force and continuously tending to assume a value proportional to the value of said control force, said third control means in conjunction with said responsive means operating said valve means in accordance with a third proportioning band.

30. In control apparatus for establishing a control force, in combination, responsive means continuously and proportionally responsive to the value of a variable, valve means for controlling the application of energy to establish said control force, said valve means being directly operated by said responsive means in one sense, first control means proportionally responsive through a first resistance and capacity to said control force and operating said valve means in accordance with a first proportioning band and in opposite sense to said responsive means, second control means proportionally responsive through said first capacity and resistance and through a second capacity and resistance to said control force and operating said valve means in accordance with a second proportioning band and in opposite sense to said first control means, said valve means being immediately and continuously responsive to the combined action of said responsive means and said first and second control means to change quantitively said control force in proportion to change of the value of said variable, the rate of change of the value of said variable and to the integral with respect to time of the deviation of the value of said variable from a predetermined value.

31. In control apparatus for establishing a pneumatic control pressure, in combination, responsive means continuously and proportionally responsive to the value of a variable, valve means for controlling supply of air to establish said control pressure, said valve means being directly operated by said responsive means in one sense, first motor means proportionally responsive through a first resistance and capacity to said control pressure and operating said valve means in accordance with a first proportioning band and in opposite sense to said responsive means, and second motor means proportionally responsive through said first resistance and capacity and through a second resistance and capacity to said control pressure and operating said valve means in accordance with a second proportioning band and, in opposite sense to said first motor means, said valve means being immediately and continuously responsive to the combined action of said responsive means and said first and second motor means to change quantitively said control pressure in proportion to change of the value of said variable, rate of change of the value of said variable and to the integral with respect to time of the deviation of the value of said variable from a predetermined value.

32. In control apparatus for establishing a pneumatic control pressure, in combination, responsive means continuously and proportionally responsive to the value of a variable, valve means for controlling supply of air to establish said control pressure, said valve means being directly operated by said responsive means in one sense, first motor means proportionally responsive through a first resistance and capacity to said control pressure and operating said valve means in accordance with a first proportioning band and in opposite sense to said responsive means, and second motor means proportionally responsive through said first resistance and capacity and through a second resistance and capacity to said control pressure and operating said valve means in accordance with a second proportioning band and in opposite sense to said first motor means, said valve means being immediately and continuously responsive to the combined action of said responsive means and said first and second motor means to change quantitively said control pressure in proportion to change of the value of said variable, rate of change of the value of said variable and to the integral with respect to time of the deviation of the value of said variable from a predetermined value, and said first and second motor means comprising respectively spring-loaded opposing bellows.

33. In control apparatus for establishing a pneumatic control pressure, in combination, responsive means continuously and proportionally responsive to the value of a variable, valve means controlling the supply of air, the output pressure of which is said control pressure, a spring-loaded bellows connected with the output pressure of said valve means and having a fixed end and having a movable end, an arc lever pivotally supported at one end by the movable end of said bellows and pivotally supported at its other end by said responsive means, and a proportioning link effectively pivoted at one end about an axis, its other end extending from said arc lever intermediate its ends, the pivoted end of said proportioning link operating said valve means by the combined action of said responsive means and said bellows to establish a proportioning pneumatic feed-back action such that a change in the position of said responsive means produces a proportionate change in said control pressure, said link being adjustable along said arc lever to change the value of the proportioning action, and said arc lever being so curved that when in a predetermined neutral position the center of its curve coincides with the said axis of said proportioning link.

34. Control apparatus such as described in claim 15, and wherein the valve means comprises a nozzle-baffle valve and a relay valve whose output pressure is the control pressure, and said relay valve being responsive to the operation of the nozzle-baffle valve which is conjointly operated by said bellows and said responsive means.

35. Control apparatus such as described in claim 2, and wherein the valve means comprises a nozzle-baffle valve and a relay valve whose output pressure is the control pressure, and said relay valve being responsive to the operation of the nozzle-baffle valve which is conjointly operated by said bellows and said responsive means.

36. In a control apparatus for establishing a pneumatic control pressure, in combination, responsive means freely movable without opposing force in continuous and proportional response to the value of a variable, valve means for controlling supply of air to establish said pressure, first pneumatic motor means mechanically connected to said valve means and having a relatively small ratio of effective movement to pressure change, and immediately, continuously, and proportionately responsive to the control pressure and in accordance with such response and through direct mechanical connection with said responsive means operating said valve means in accordance with a relatively narrow proportioning band, second pneumatic motor means mechanically connected to said valve means and having a relatively larger ratio of effective movement to pressure change, and continuously proportionately responsive in the same sense through resistance and capacity to said control pressure and in accordance with such response and through direct mechanical connection with said responsive means operating said valve means in accordance with a relatively wide proportioning band, whereby said valve means is immediately and continuously responsive to the combined action of said responsive means and said first and second pneumatic motor means to change quantitatively said control pressure in proportion to changes in the value of said variable and to the rate of change of the value of said variable.

37. In apparatus for establishing a pneumatic control pressure, in combination, responsive means continuously responsive to the value of a variable, valve means including a nozzle-baffle pilot valve and a relay valve responsive to movement of the baffle when held juxtaposed to said nozzle, a reversing lever pivoted about an axis and provided with oppositely disposed symmetrically arranged arms and movable by said responsive means, a floating lever, a downwardly extending connecting link connecting one of the arms of said reversing lever with a point on said floating lever, said point being normally symmetrically arranged with respect to said oppositely disposed arms, a bellows assembly connected with and responsive to the output of said relay valve and pivotally supporting one end of said floating lever, means connecting said baffle and floating lever at a point on said lever removed from the said end and said first-mentioned point, said bellows assembly operating through said floating lever to maintain said baffle juxtaposed to said nozzle to cause the output pressure of said relay valve to change in proportion to changes in position of the floating lever by said connecting link as it is positioned by said responsive means, and said connecting link being shiftable from one of said opposing arms of said reversing lever to the other to change the sense of the control action.

CLESSON E. MASON.

REFERENCES CITED

The following references are of record in the file of this patent:

UNITED STATES PATENTS

| Number | Name | Date |
|---|---|---|
| Re. 20,092 | Mason | Sept. 1, 1936 |
| 1,416,210 | Jung | May 16, 1922 |
| 1,459,218 | Knaak | July 19, 1923 |
| 1,549,745 | Church | Aug. 18, 1925 |
| 1,565,086 | Gallagher | Dec. 8, 1925 |
| 1,717,291 | Weingartner | June 11, 1929 |
| 1,851,422 | Durando | Mar. 29, 1932 |
| 1,869,144 | Green | July 26, 1932 |
| 1,956,061 | Doeg | Apr. 24, 1934 |
| 1,985,829 | Hubbard | Dec. 25, 1934 |
| 1,987,200 | Mabey | Jan. 8, 1935 |
| 2,005,773 | De Florez | June 25, 1935 |
| 2,020,847 | Mittereff | Nov. 12, 1935 |
| 2,069,917 | Fischer | Feb. 9, 1937 |
| 2,072,921 | Mallory | Mar. 9, 1937 |
| 2,117,800 | Harrison | May 17, 1938 |
| 2,119,061 | Stein | May 31, 1938 |
| 2,125,081 | Moore | July 26, 1938 |
| 2,125,109 | Harrison | July 26, 1938 |
| 2,211,317 | Brown | Aug. 13, 1940 |
| 2,220,974 | Moore | Nov. 12, 1940 |
| 2,246,169 | Eriscson | June 17, 1941 |